US006638317B2

(12) United States Patent
Nakao

(10) Patent No.: US 6,638,317 B2
(45) Date of Patent: Oct. 28, 2003

(54) APPARATUS AND METHOD FOR GENERATING DIGEST ACCORDING TO HIERARCHICAL STRUCTURE OF TOPIC

(75) Inventor: Yoshio Nakao, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/176,197

(22) Filed: Oct. 21, 1998

(65) Prior Publication Data

US 2002/0184267 A1 Dec. 5, 2002

(30) Foreign Application Priority Data

Mar. 20, 1998 (JP) .......................................... 10-072724

(51) Int. Cl.[7] .............................................. G06F 15/00
(52) U.S. Cl. ....................... 715/530; 715/500; 715/514; 707/3; 707/4
(58) Field of Search ................................ 707/514, 500, 707/531, 529, 3–4; 715/514, 500, 530, 529

(56) References Cited

U.S. PATENT DOCUMENTS

| | | | | |
|---|---|---|---|---|
| 5,384,703 A | * | 1/1995 | Withgott et al. | ............. 707/531 |
| 5,442,781 A | * | 8/1995 | Yamagata | ....................... 707/3 |
| 5,689,716 A | * | 11/1997 | Chen | ............................. 707/500 |
| 5,768,580 A | * | 6/1998 | Wical | ........................... 707/102 |
| 5,832,495 A | * | 11/1998 | Gustman | .................... 707/102 |
| 5,848,191 A | * | 12/1998 | Chen et al. | ................. 382/229 |
| 5,892,842 A | * | 4/1999 | Bloomberg | ................. 382/173 |
| 5,907,836 A | * | 5/1999 | Sumita et al. | .................. 707/2 |
| 5,983,216 A | * | 11/1999 | Kirsch et al. | ................... 707/2 |
| 6,067,539 A | * | 5/2000 | Cohen | ............................. 707/2 |
| 6,205,456 B1 | * | 3/2001 | Nakao | .......................... 707/531 |
| 6,233,575 B1 | * | 5/2001 | Agrawal et al. | ................ 707/6 |
| 6,460,036 B1 | * | 10/2002 | Herz | ............................ 707/10 |

FOREIGN PATENT DOCUMENTS

| | | |
|---|---|---|
| JP | 2-254566 | 10/1990 |
| JP | 7-36896 | 2/1995 |
| JP | 7-160711 | 6/1995 |
| JP | 8-297677 | 11/1996 |

OTHER PUBLICATIONS

Lea et al., An associative file store using fragments for run–time indexing and compression, ACM 1980, pp. 280–295.*

Pirolli, Computational Models of Information Scent–Following in a Very Large Browsable Text Collection, ACM 1997, pp. 3–1.*

M. Kameda, "Extraction of Major Keyword and Key Sentence by Pseudo–Keyword Correlation Method", *The Association for Natural Language Processing*, (Mar. 26, 1996), pp. 97–101.

M. Hearst, "Multi–Paragraph Segmentation of Expository Text", *Proceedings of the Conference*, (Jun. 27, 1994), p. 9.

* cited by examiner

*Primary Examiner*—Heather R. Herndon
*Assistant Examiner*—Cong-Lac Huynh
(74) *Attorney, Agent, or Firm*—Staas & Halsey LLP

(57) ABSTRACT

A digest generator apparatus calculates a lexical cohesion degree at each position in a document using a plurality of windows having different sizes, and calculates the candidate section of a topic boundary for each topic level corresponding to the size of a window. Then, by unifying the candidate section of different levels, the digest generator apparatus detects the topic boundary for each level. Then, based on the relation between a summarization-target topic passage and a long topic passage containing the summarization-target topic passage the digest generator apparatus extracts key sentences and generates a digest.

16 Claims, 67 Drawing Sheets

（1）WWW検索サービスの概要

（3）書き換え規則, Two-level モデル

（4）形態素解析, 構文解析

（5）まとめ

4．4．3　情報フィルタリング技術の動向

（1）内容に基づくフィルタリング (content-based filtering)

（2）協調フィルタリング (collaborative filtering)

INPUT SENTENCE　　　東京都は大都市だ

| HEADWORD (STEM OF WORD) | PART OF SPEECH |
|---|---|
| 東 | NOUN |
| 東京都 | NOUN |
| 京都 | NOUN |
| は | PARTICLE 「は」 |
| 大 | PREFIX |
| 都市 | NOUN |
| だ | AUXILIARY VERB 「だ」 |

(CANDIDATE WORD labels the rows above)

FIG. 12

INPUT SENTENCE  Tokyo is the Japanese capital.

CANDIDATE WORD

| headword | base(root) form | part of speech |
|---|---|---|
| Tokyo | Tokyo | proper noun |
| is | be | be verb (the third person singular present form) |
| the | the | definite article |
| Japanese | Japanese | proper noun |
| Japanese | Japanese | adjective |
| capital | capital | noun |

| | |
|---|---|
| WINDOW WIDTH | 40 WORDS |
| MEASUREMENT POSITION OF COHESION DEGREE | 40 (WORDS) |
| NUMBER OF A VOCABULARY IN A LEFT WINDOW (W1) (NUMBER OF DIFFERENT WORDS) | 29 WORDS |
| NUMBER OF A VOCABULARY IN A RIGHT WINDOW (W2) (NUMBER OF DIFFERENT WORDS) | 29 WORDS |
| NUMBER OF A COMMON VOCABULARY (NUMBER OF DIFFERENT WORDS) | 6 WORDS (いる、問題/、調査/する、情報/、関わる、技術的/) |

FIG. 19

| NUMBER OF TERMS | | a1 | a2 | a3 | a4 | a5 | a6 | a7 | a8 | a9 | a10 | a11 |
|---|---|---|---|---|---|---|---|---|---|---|---|---|
| 4-TERM AVERAGE (c1~c4) | LEFT WINDOW | 1 | 2 | 3 | 4 | 3 | 2 | 1 | 0 | 0 | 0 | 0 |
| | RIGHT WINDOW | 0 | 0 | 0 | 0 | 1 | 2 | 3 | 4 | 3 | 2 | 1 |
| 3-TERM AVERAGE (c1~c3) | LEFT WINDOW | 1 | 2 | 3 | 3 | 2 | 1 | 0 | 0 | 0 | 0 | |
| | RIGHT WINDOW | 0 | 0 | 0 | 0 | 1 | 2 | 3 | 3 | 2 | 1 | |
| 2-TERM AVERAGE (c1, c2) | LEFT WINDOW | 1 | 2 | 2 | 2 | 1 | 0 | 0 | 0 | 0 | | |
| | RIGHT WINDOW | 0 | 0 | 0 | 0 | 1 | 2 | 2 | 2 | 1 | | |

NUMBER OF TIMES OF USE OF DOCUMENT AREA

FIG. 22

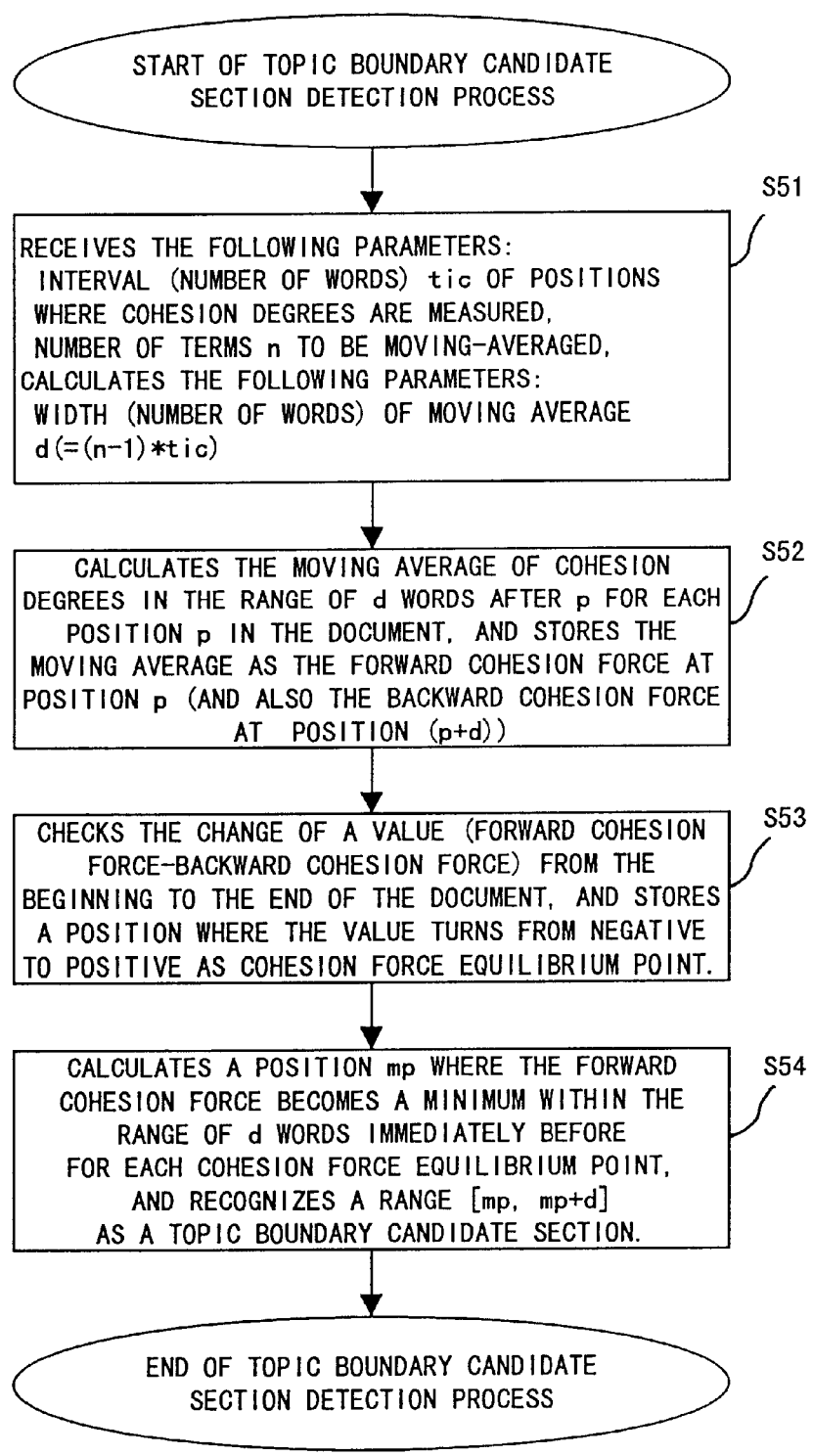
F I G. 2 3

| WINDOW WIDTH | NUMBER OF DETECTED BOUNDARIES | INTERVAL OF TOPIC BOUNDARY (WORDS) | | |
|---|---|---|---|---|
| | | MEAN VALUE | MAXIMUM | MINIMUM |
| 2,560 | 4 | 3,563 | 6,145 | 1,310 |
| 1,280 | 9 | 1,782 | 3,010 | 851 |
| 640 | 17 | 990 | 2,185 | 375 |
| 320 | 38 | 457 | 1,000 | 205 |
| 160 | 74 | 238 | 475 | 40 |
| 80 | 160 | 111 | 245 | 35 |
| 40 | 322 | 55 | 165 | 15 |

FIG. 31

| WINDOW WIDTH | NUMBER OF SECTION BOUNDARIES | NUMBER OF COINCIDENCE | RECALL RATIO | PRECISION RATIO |
|---|---|---|---|---|
| 2,560 | 2 | 1 | 50.0% | 25.0% |
| 1,280 | 3 | 2 | 66.7% | 22.2% |
| 640 | 12 | 5 | 41.7% | 29.4% |
| 320 | 18 | 6 | 33.3% | 15.8% |
| 160 | 33 | 11 | 33.3% | 14.9% |
| 80 | 43 | 15 | 34.9% | 9.4% |
| 40 | 45 | 18 | 40.0% | 5.6% |

F I G. 3 2

| WINDOW WIDTH | NUMBER OF SECTION BOUNDARIES | NUMBER OF COINCIDENCE | RECALL RATIO | PRECISON RATIO |
|---|---|---|---|---|
| 2,560 | 3 | 1 | 33.3% | 25.0% |
| 1,280 | 12 | 4 | 33.3% | 44.4% |
| 640 | 18 | 6 | 33.3% | 35.3% |
| 320 | 38 | 8 | 24.2% | 21.1% |
| 160 | 43 | 13 | 39.2% | 17.6% |
| 80 | 45 | 15 | 33.3% | 9.4% |
| 40 | 46 | 19 | 41.3% | 5.9% |

FIG. 33

| WINDOW WIDTH | NUMBER OF SECTION BOUNDARIES | INTERVAL OF TOPIC BOUNDARY (WORDS) | | |
|---|---|---|---|---|
| | | MEAN VALUE | MAXIMUM | MINIMUM |
| 2,560 | 3 | 4,454 | 6,270 | 2,535 |
| 1,280 | 10 | 1,620 | 2,535 | 805 |
| 640 | 17 | 990 | 1,345 | 605 |
| 320 | 30 | 575 | 1,100 | 170 |
| 160 | 70 | 251 | 470 | 85 |
| 80 | 147 | 120 | 290 | 40 |
| 40 | 308 | 58 | 165 | 10 |

FIG. 34

| WINDOW WIDTH | NUMBER OF SECTION BOUNDARIES | NUMBER OF COINCIDENCE | RECALL RATIO | PRECISION RATIO |
|---|---|---|---|---|
| 2,560 | 2 | 1 | 50.3% | 33.3% |
| 1,280 | 3 | 2 | 66.7% | 20.0% |
| 640 | 12 | 5 | 41.7% | 29.4% |
| 320 | 18 | 7 | 38.9% | 23.3% |
| 160 | 33 | 13 | 39.4% | 18.6% |
| 80 | 43 | 18 | 41.9% | 12.2% |
| 40 | 45 | 21 | 46.7% | 6.8% |

FIG. 35

| WINDOW WIDTH | NUMBER OF SECTION BOUNDARIES | NUMBER OF COINCIDENCE | RECALL RATIO | PRECISION RATIO |
|---|---|---|---|---|
| 2,560 | 3 | 1 | 33.3% | 33.3% |
| 1,280 | 12 | 4 | 33.3% | 40.0% |
| 640 | 18 | 7 | 38.9% | 41.2% |
| 320 | 38 | 10 | 30.3% | 33.3% |
| 160 | 43 | 14 | 32.6% | 20.0% |
| 80 | 45 | 18 | 40.0% | 12.2% |
| 40 | 46 | 21 | 45.7% | 6.8% |

FIG. 36

| DOCUMENT PATTERN | BOUNDARY LEVEL |
|---|---|
| ^\d+ [ 。] +$ | 0 |
| ^\d+\. \d+\. [ 。] +$ | 1 |
| ^\d+\. \d+\. \d+\. [ 。] +$ | 2 |
| ^(\d+) [ 。] +$ | 3 |
| ^$ | 4 |

FIG. 37

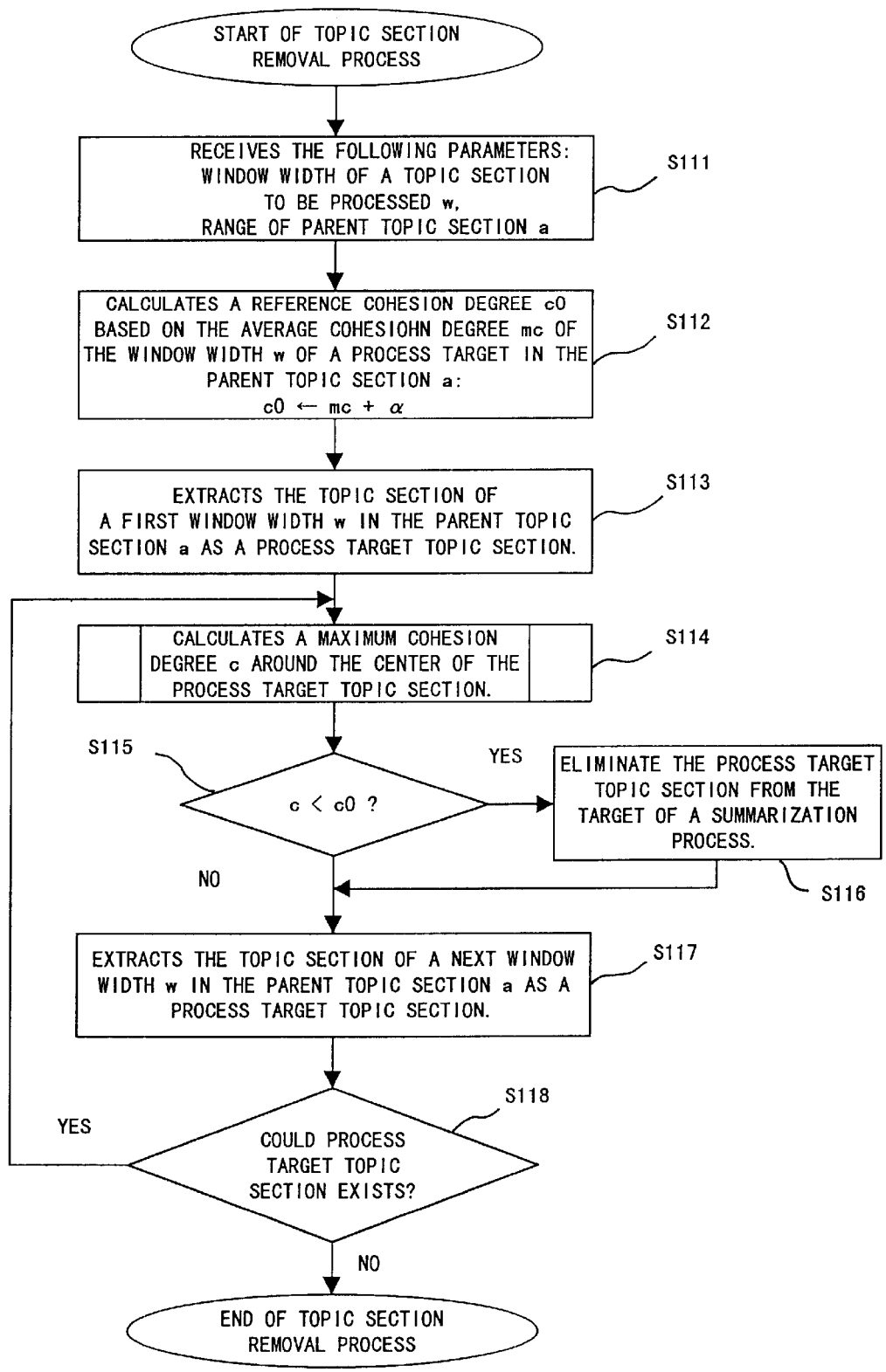
F I G. 4 1

話題区間中に含まれている見出し

| |
|---|
| 4．1　調査の概要 |
| 4．2　ネットワークアクセスのインタフェース |
| 4．2．1　提言：10年後のネットワークアクセスインタフェースはこうなる |
| （1）ネットワーク情報への多様なアクセス |
| （2）個人向けインタフェースを支えるエージェント技術 |
| （3）セキュリティ・個人認証の今後 |
| （4）機械翻訳と多国語 |

FIG. 48

| KEYWORD t | LIKELIHOOD RATIO L | USE FREQUENCY IN SECTION $F_{bt}$ | USE FREQUENCY IN PARENT SECTION $F_{at}$ |
|---|---|---|---|
| 処理 / する | 35.6 | 21 | 23 |
| 技術 / | 34.7 | 38 | 53 |
| な / る | 28.4 | 34 | 49 |
| 調査 / する | 27.3 | 15 | 16 |
| アクセス / する | 21.2 | 32 | 50 |
| インターネット / | 21.1 | 23 | 32 |
| 関わ / る | 20.4 | 9 | 9 |
| 翻訳 / する | 18.1 | 8 | 8 |
| 予想 / する | 15.9 | 7 | 7 |
| 進展 / する | 15.9 | 7 | 7 |
| 自然言語 / | 14.7 | 9 | 10 |
| インタフェース / | 13.7 | 14 | 19 |
| ネットワーク / | 12.5 | 21 | 34 |
| 情報 / | 11.6 | 51 | 106 |
| 量 / | 11.3 | 5 | 5 |
| 家庭 / | 11.3 | 5 | 5 |
| パスワード / | 11.3 | 5 | 5 |
| 重要 / | 10.6 | 7 | 8 |
| サービス / する | 9.75 | 8 | 10 |
| 管理 / する | 9.71 | 8 | 10 |
| 国語 / | 9.08 | 4 | 4 |
| 母国語 / | 9.08 | 4 | 4 |
| 資源 / | 9.08 | 4 | 4 |
| 発展 / する | 9.08 | 4 | 4 |
| 現状 / | 8.66 | 6 | 7 |

…Dexter モデルは、ユーザに近い方から Run-time層、Storage層、Within-Component層の3層構造である。…

(2) インタフェースを支えるネットワークプログラム技術

Java はアプレットと呼ばれる Java プログラムをサーバからクライアントにダウンロードし、これを解釈して実行すると言うメカニズムを持っている。…

… tf・idf方式とは、単語に分割された文章の各単語の重要度を、その単語が文書中に出現する頻度tfと、その単語を含む文書集合中に出現する頻度の逆数idfの積によってその単語の重要さを数値化する手法である。

…[Brill, 92] のタガーは、規則ベースでありながら規則の自動獲得と適用 順序の学習により縮小ベースのものと同等 レベルの耐性と精度が得られ、かつ、よりコンパクトであるという特長があるものの、規則が多くなるにつれ処理速度が低下する。…

FIG. 57

TITLE: SGML Type Document Managing Aparatus and Managin Method

Background of the Invention (Bg)

Field of the Invention

Description of the Related Art

Summary of the Invention

Brief Description of Drawings

Description of Preferred Embodiment (Preferred Embodiment)

[1] Partial editing DTD (<1>)

[2] Revision history information (<2>)

What is claimed is: (Claims)

FIG. 58

SGML Type Document Managing Apparatus and Managing Method
Background of the Invention Field of the Invention The present invention relates to an SGML (Standard Generalized Markup Language) document managing apparatus for allowing users to collaboratively create, edit, and revise a large SGML document sequence, such as a manual.

FIG. 59

SGML[SGML] Type[type] Document[document] Managing[managing] Apparatus[apparatus] and Managing[managing] Method[method]
Background[background] of the Invention[invention] Field[field] of the Invention[invention]
The present[present] invention[invention] relates[relates] to an SGML[SGML] (Standard[standard] Generalized[generalized] Markup[markup] Language[language]) document[document] managing[managing] apparatus[apparatus] for allowing[allowing] users[users] to collaboratively[collaboratively] create[create], edit[edit], and revise[revise] a large[large] SGML[SGML] document[document] sequence[sequence], such as a manual[manual].

FIG. 60 a, after, against, all, along, already, also, although, always, among, an, and, and/or, another, any, anywhere, are, as, at, be, because, been, before, before/after, being, belonging, belongs, below, between, both, but, by, can, cannot, corresponding, do, does, each, either, else, especially, even, every, for, forth, from, further, has, have, he/she, his/her, however, if, in, into, is, it, its, just, later, least, mainly, may, more, moreover, most, much, namely, next, no, not, of, on, once, one, only, or, other, others, otherwise, out, part, previous, same, should, since, so, some, someone, such, than, that, the, their, them, then, there, thereafter, thereof, these, they, this, those, through, thus, to, too, two, types, under, unless, unlike, until, up, usually, was, well, were, what, when, where, whereby, wherein, whether, which, while, who, whole, whose, why, will, with, with/without, without, yes

FIG. 61

| DOCUMENT PATTERN | BOUNDARY LEVEL |
|---|---|
| ^[A-Z] | 0 |
| ^␣*\[ | 1 |

FIG. 62

SGML Type Document Managing Apparatus and Managing Method

∴ ,

...In addition, SGML documents have been widely used for fields that handle large and long-life documents such as network communications, electronic trading, and databases such as electronic libraries. ...

∴

The present invention is mainly intended to provide an SGML type document managing apparatus and an SGML type document managing method that allow collaborative creating and editing works to be effectively performed. ...

∴

Brief Description of Drawings

∴

Figure 1:
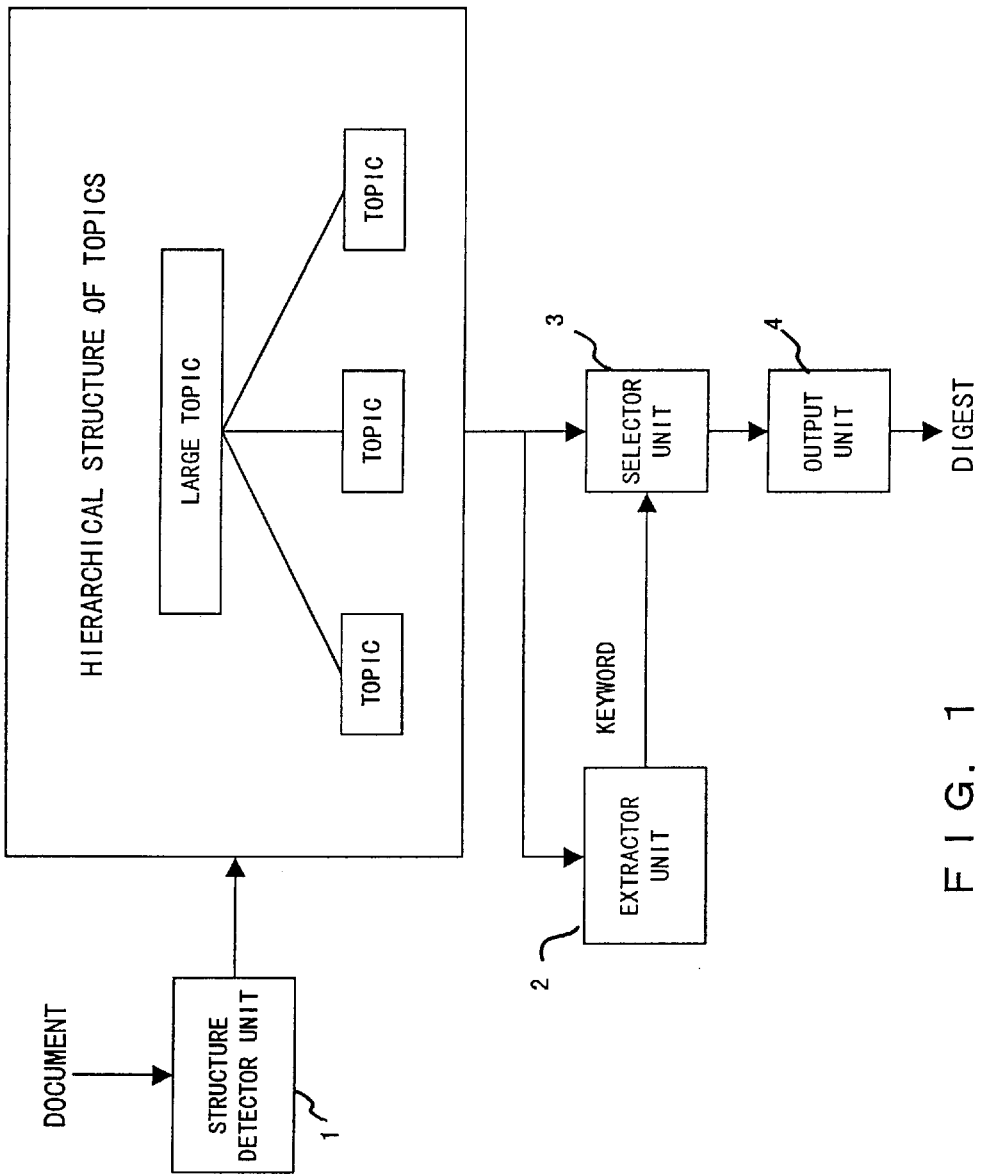

Fig. 2A is a block diagram showing the structure of the client 2 of the information processing system in the case the structure shown in Fig. 1 is accomplished by software.

∴

FIG. 65

The CPUs 100-1 and 100-2 of the client 2 and the server 3 execute software that is stored in the main storing units 400-1 and 400-2, the software being read from the auxiliary storing unit 200-1 or the input/output units 500-1 and 500-2, or the software being obtained from the connecting network through the network connecting units 300-1 and 300-2, respectively...

...

At step S71, the SGML document accessing unit 30 adds the fist item of the repeatable model group without a head, namely the removable instance number and a generic identifier/model group with a occurence indicator, and "(" to the top of the extracted extended content model.

...

At step S160, the SGML document editing unit 10 removes the identifiers (the document identifier and the element identifier) of the element stored in the register from the deleted element attribute (deletions) of the parent element of the paste destination.

...

FIG. 66

What is claimed is:

...

15. The document managing apparatus as set forth in claim 14, further comprising:¡br¿edited result output means for outputting the electric document to be edited corresponding to the edited result to said database means when the determined result of said editing consistency examining means is satisifed.

...

FIG. 67

APPARATUS AND METHOD FOR GENERATING DIGEST ACCORDING TO HIERARCHICAL STRUCTURE OF TOPIC

BACKGROUND OF THE INVENTION

1. Field of the Invention

The present invention relates to an apparatus and method for summarizing machine-readable documents written in a natural language, etc., and mainly intends to generate a digest of rather long manuals, reports, etc. and to support the selection and reading processing of documents.

2. Description of the Related Art

As a prime technology related with the present invention there are two technologies of generating a digest by extracting sentences using keywords in a document as a clue, and detecting topic passages in the document. Here, these conventional technologies are described below.

First, the digest generation technology is described below. Roughly speaking, in the conventional digest generation technology, there are two methods. The first method detects major parts in a document and generates a digest by extracting the major parts. The major parts are usually extracted in units of logical elements such as sections, paragraphs, sentences, etc. These are represented by a word "sentence" as described below.

The second method prepares in advance patterns of information to be extracted for a digest, and generates a digest by extracting phrases and words in the document meeting the requirements of one of the patterns, or generates a digest by using sentences matching the pattern.

The first method is further classified into several methods according to with what clue the importance of sentences is evaluated. As typical methods there are the following three methods.

(1) A method of utilizing the use frequency and distribution of words in a document as clues.
(2) A method of utilizing the rhetorical structure and used position of sentences as clues.
(3) A method of evaluating the importance of sentences based on the sentence structure.

Method (1) first evaluates the importance of words (phrases) contained in a document, and then evaluates the importance of sentences according to how many keywords are contained in a sentence. Then, a digest is generated by selecting key sentences based on the evaluation result.

There are several well-known methods of evaluating the importance of words as follows: a method of utilizing the use frequency of words in a document, a method of weighing the use frequency of words with differences between the use frequency of words in the document and that in a more general sentence collection, and a method of weighing the use frequency of words with the used position of words, for example, by setting higher importance to a word in titles or headings.

Here, usually the target words are limited to independent words (particularly nouns) only in the case of Japanese, and content words in the case of English. The independent word and the content word are both words with a substantial meaning, such as nouns, adjectives, verbs, etc., and are distinguished from words used to play a structural role only, such as particles, prepositions, formal nouns, etc. Although the formal definition of an independent word in Japanese is a word which itself can compose an independent clause, here the independent word is defined using the above distinction.

These digest generation methods include, for example, the following. In the Japanese Laid-open Public Patent Publication No. 6-259424 "Document Display Apparatus and Digest Generator Apparatus, and Digital Copying Apparatus" and a document by the inventor of that invention (Masayuki Kameda, "Extraction of Major Keywords and Key Sentences by Pseudo-Keyword Correlation Method", in the Proceedings of the Second Annual Meeting of Association for Natural Language Processing, pp.97 to 100, March 1996), a digest is generated by extracting parts including many words appearing in the headings as important parts relating to the headings.

In the Japanese Laid-open Public Patent Publication No. 7-36896 "Method and Apparatus for Generating Digest", major expression seeds are selected based on the complexity (length of a word, etc.) of an expression (word, etc.) used in a document, and a digest is generated by extracting sentences including more seeds having a high importance.

In the Japanese Laid-open Public Patent Publication No. 8-297677 "Method of Automatically Generating a Digest of Topics", topical terms are detected based on the use frequency of words in a document, and a digest is generated by extracting sentences containing many major topical terms.

In the Japanese Laid-open Public Patent Publication No. 2-254566 "Automatic Digest Generator Apparatus", words having a high use frequency are detected as keywords, and a digest is generated by extracting parts where the keywords are used in the first place, or parts containing many keywords, sentences which are used at the beginning of semantic paragraphs automatically detected, etc.

Next, the method of detecting topic passages in a document is described below. Roughly speaking, there are the following two methods.

(1) A method based on the lexical cohesion of a topic due to words repeatedly used in a document
(2) A method of determining a rhetorical structure based on the coherence relation between sentences indicated by conjunctions, etc.

For method (1) based on the lexical cohesion, first, the Hearst method (Marti A. Hearst, "Multi-paragraph Segmentation of Expository Text", in the Proceedings of the 32nd Annual Meeting of Association for Computational Linguistics, pp.9 to 16, 1994) is briefly described below.

This method (hereinafter called "Hearst method") is one of those automatically detect a break of a topic flow based on the linguistic phenomenon that an identical word is used repeatedly in related parts of text (lexical cohesion). The Hearst method, first, calculates the lexical similarity of every pair of adjacent blocks of text, which are set up before and after a certain position in a document to be of fixed size about a paragraph (approximately 120 words). The lexical similarity is calculated by a cosine measure as follows:

$$sim(b_l, b_r) = \frac{\sum_t W_{t,bl} W_{t,br}}{\sqrt{\sum_t W_{t,bl}^2 \sum_t W_{t,br}^2}} \quad (1)$$

where $b_l$ and $b_r$ indicate a left block (a block on the backward side of a document) and a right block (a block on the forward side of the document), respectively, and $W_{t,bl}$ and $W_{t,br}$ indicate the use frequency of a word t in the left and right blocks, respectively. $\Sigma_t$ in the right hand side of equation (1) is a summation operator about different words t.

The more vocabulary common to both the blocks there is, the greater the similarity score of equation (1) becomes (maximum 1). Conversely, if there is no common vocabulary, the similarity score becomes the minimum values 0. That is, a greater value of the similarity score indicates a higher possibility that a common topic is handled in both the blocks, while a smaller value of the similarity score indicates a higher possibility that the point between the blocks is a topic boundary.

The Hearst method compares the value of equation (1) from the beginning of a document until the end at certain intervals (20 words), and recognizes a position having a minimal value as a topic boundary. At this time, the following adjustment is performed in order to neglect the fine fluctuations of the similarity score. First, a part surrounding the point mp having a minimal value (hereinafter called a "minimal point") is extracted so that the part includes both a part where the similarity score decreases monotonously on the left side of the minimal point and a part where the similarity score increases monotonously on the right side of the minimal point.

Then, based on the similarity scores $C_{lp}$, $C_{mp}$ and $C_{rp}$ at the start point lp, the minimal point, and end point rp, respectively, of the extracted part, a value ds (depth score), which indicates the fluctuation steepness of the similarity score at the minimal point, is calculated as follows:

$$ds = (C_{lp} - C_{mp}) + (C_{rp} - C_{mp}) \qquad (2)$$

Then, only when ds exceeds a threshold h calculated as follows, is the minimal point recognized as a topic boundary.

$$h = C_0 - \sigma/2 \qquad (3)$$

where $C_0$ and $\sigma$ are the mean value and the standard deviation of the similarity, respectively, of an entire document. According to this method, it is considered that the more steeply the similarity of a part decreases, the higher the possibility of being the boundary of a topic the part has. Hearst also shows another method of detecting a topic boundary by keeping track of active chains of repeated terms so that a point at which the bulk of one set of chains ends and another set of chains begins should be identified with a topic boundary.

For another method of detecting topic passages, a method of using a sentence beginning with a clause with a topic-marking particle "wa" in Japanese as a clue is also widely known (Japanese Laid-open Patent Publication No.7-160711 "Topic Structure Detection Method and Apparatus for Written Language Text"). A method using this method and a method similar to the second version of Hearst method together is also widely known (Gen Mochizuki, Takeo Honda and Manabu Okumura, "Text Segmentation Using a Multiple Regression Analysis and a Cluster Analysis", in the Proceedings of the Second Annual Meeting of the Association of Natural Language Processing, pp.325 to 328, March 1996).

However, the conventional digest generation methods have the following problems.

For such a method as of determining the keywords of a document and generating a digest of the document by extracting sentences having many keywords, it is difficult to generate a digest of a long document, especially one that is composed of several parts of text concerning different topics. Since different sets of keywords are required for those parts concerning different topics, simple keyword extraction based on the use frequency of a term in an entire document is not appropriate. If a digest is generated based on a set of keywords that are used frequently in one part of text but infrequently in another part, the resulting digest may include sentences of no importance extracted from the part where the keywords used infrequently.

In order to solve this problem, it is necessary to detect topic passages in a document. However, there is no method of directly detecting large topic passages based on lexical cohesion, which is another problem.

In the conventional technologies, when topic passages are detected based on lexical cohesion, in a similar manner to Hearst method, only topic passages having several paragraphs or at most one article of a newspaper are tried to be detected. Topic passages larger than those were detected using document patterns such as chapters with a clue of characteristic patterns in the physical appearance of document, such as characteristic layout of chapters, etc. (hereinafter called "document pattern").

For example, in the Japanese Laid-open Patent Publication No. 2-254566, a series of formal paragraphs (paragraphs formally separated by indentations, etc.) having close contextual relation are automatically detected as semantic paragraphs, and a digest is generated based on two types of keywords: keywords extracted based on use frequency in an entire document and those extracted based on the use frequency in each semantic paragraph. However, in this method, the semantic paragraphs never go beyond the breaks of a larger logical element of a document, such as a chapter, clause, etc. This is because breaks of a larger logical element, which are detected by a document pattern, are given priority over dividing points of semantic paragraphs, and there is no more process to combine larger logical elements.

Even in the detection of topics, since the major clue in the detection of semantic paragraphs is a term repeatedly used in the range of adjacent two formal paragraphs, it is difficult to detect a larger topic passage. Although the position information of a term used in the first place is also used, it is not sufficient to judge a lexical cohesion due to terms repeatedly used at long intervals, etc.

Clauses belonging to the same chapter sometimes have different semantic cohesion. In this case, a method of precisely detecting larger topic passages is required. In addition, since a document pattern is a rule regarding a specific kind of document, in order to apply this to the summarization of various kinds of documents, an empirical rule has to be prepared for each kind of a document, which is another problem.

SUMMARY OF THE INVENTION

It is an object of the present invention to provide a general-purpose digest generator apparatus and a method of automatically detecting the topic structure of a document based on phenomena observed in a general documentation such as lexical cohesion, and generating a digest corresponding to the topic structure.

In the first aspect of the present invention, the digest generator apparatus comprises a structure detection unit, an extractor unit, a selector unit and an output unit.

The structure detection unit detects the hierarchical structure of topics in a given document, and the extractor unit extracts keywords regarding each detected topic. The selector unit selects key sentences from topic passages based on the use condition of the keywords, and generates a digest using the key sentences. The output unit outputs the generated digest.

In the second aspect of the present invention, the digest generator apparatus comprises an extractor unit, a generator unit and an output unit.

The extractor unit evaluates whether or not a word is characteristic of a process target topic passage based on both the use frequency of the word in the process target topic passage in a given document and the use frequency of the word in a longer topic passage containing the process target topic passage, and extracts keywords from the target topic passage based on the evaluation result. The generator unit generates a digest based on the use condition of the extracted keywords, and the output unit outputs the generated digest.

In the third aspect of the present invention, the digest generator apparatus comprises an extractor unit, a generator unit and an output unit.

The extractor unit extracts local keywords from a topic passage for digest generation, and extracts global keywords from a longer topic passage containing the input topic passage. The generator unit generates a digest based on the use condition of both the extracted local keywords and global keywords. The output unit outputs the generated digest.

In the fourth aspect of the present invention, the digest generator apparatus comprises a cohesion calculator unit, a major part specifying unit, a generator unit and an output unit.

The cohesion calculator unit calculates a lexical cohesion in the neighborhood of each position in a given document, and the major part specifying unit removes areas having a lower cohesion from a process target, and extracts areas having a higher cohesion as major parts. The generator unit generates a digest using the major parts, and the output unit outputs the generated digest.

BRIEF DESCRIPTION OF THE DRAWINGS

FIG. 1 shows the principle of the digest generator apparatus of the present invention.

Figure 2:
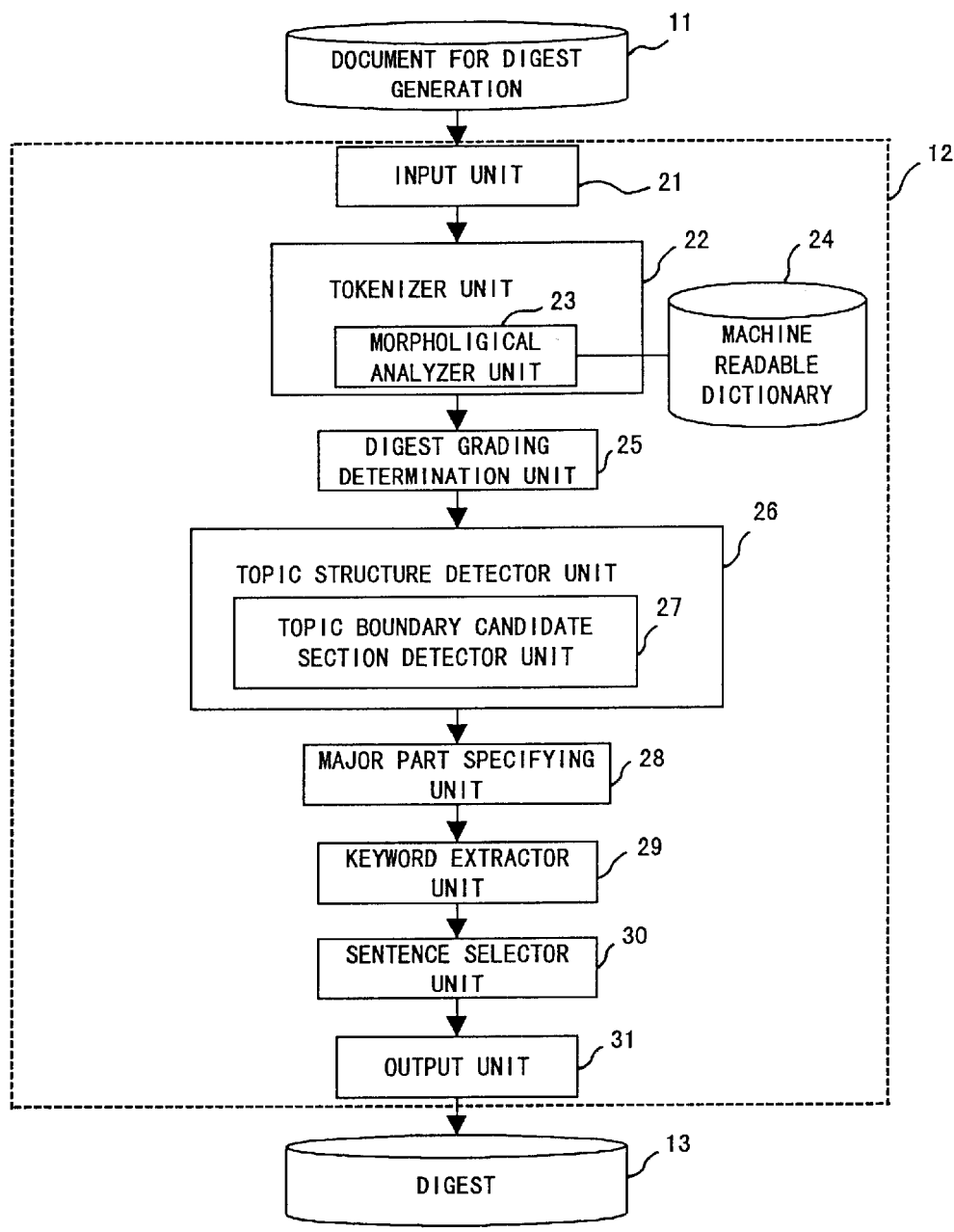

FIG. 2 shows the configuration of the digest generator apparatus of the present invention.

Figure 3:
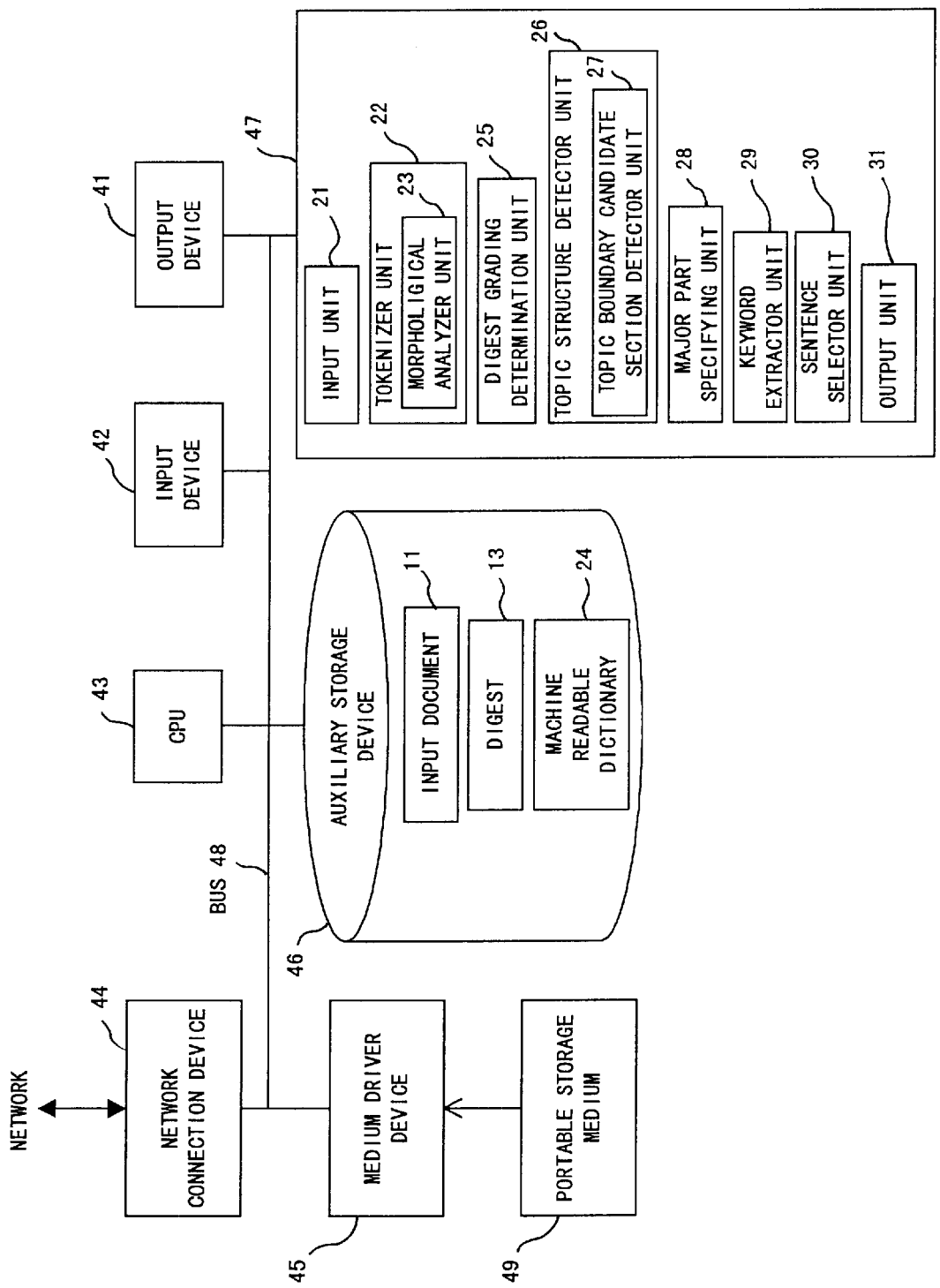

FIG. 3 shows the configuration of an information processing device.

Figure 4:
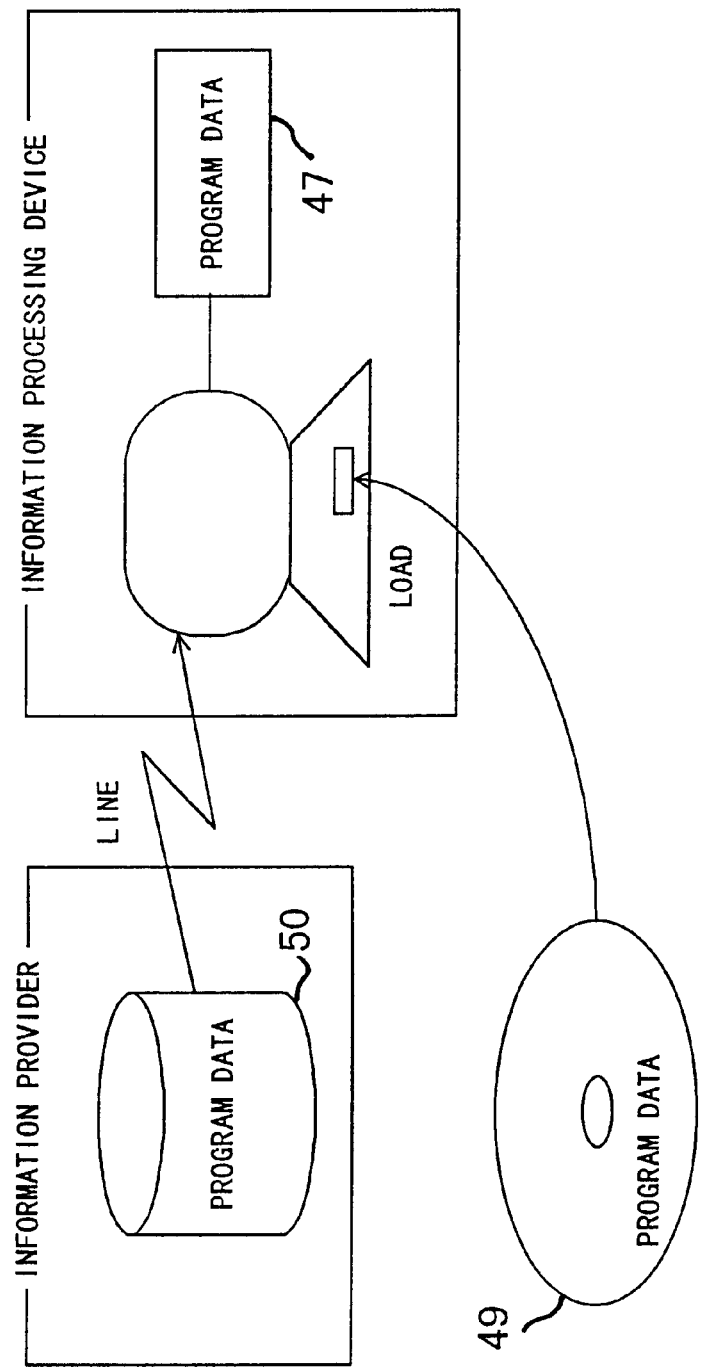

FIG. 4 shows storage media.

FIG. 5 shows headings in a first document for digest generation (No.1).

FIG. 6 shows headings in a first document for digest generation (No.2).

FIG. 7 shows headings in a first document for digest generation (No.3).

Figure 8:
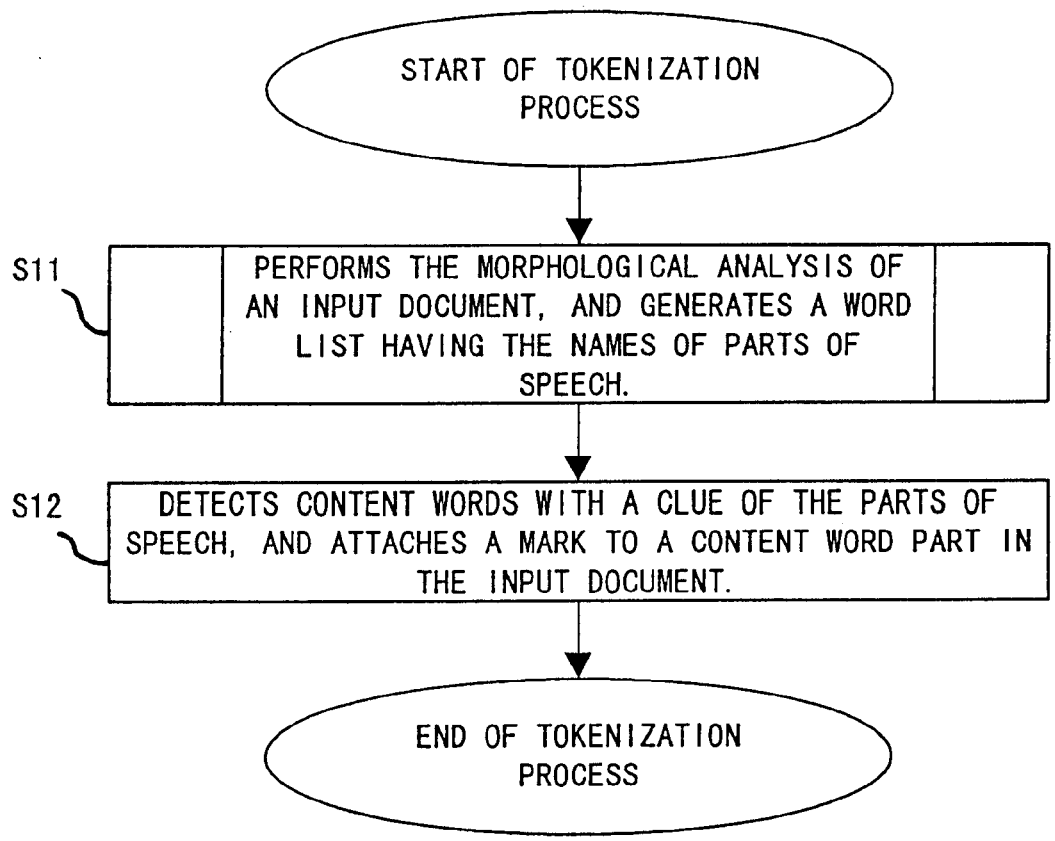

FIG. 8 is a flowchart showing a tokenization process.

Figure 9:
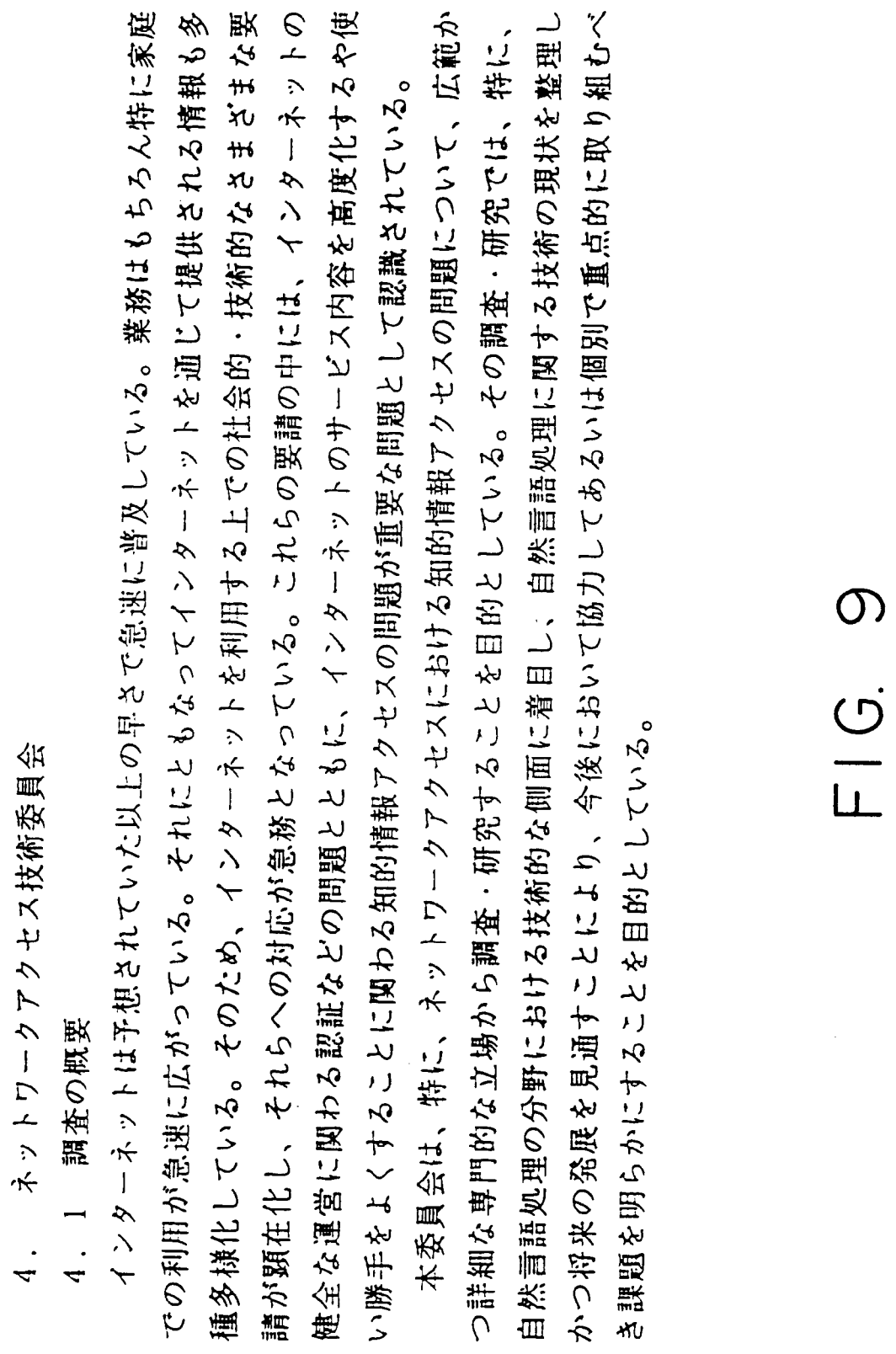

FIG. 9 shows a first input document.

Figure 10:
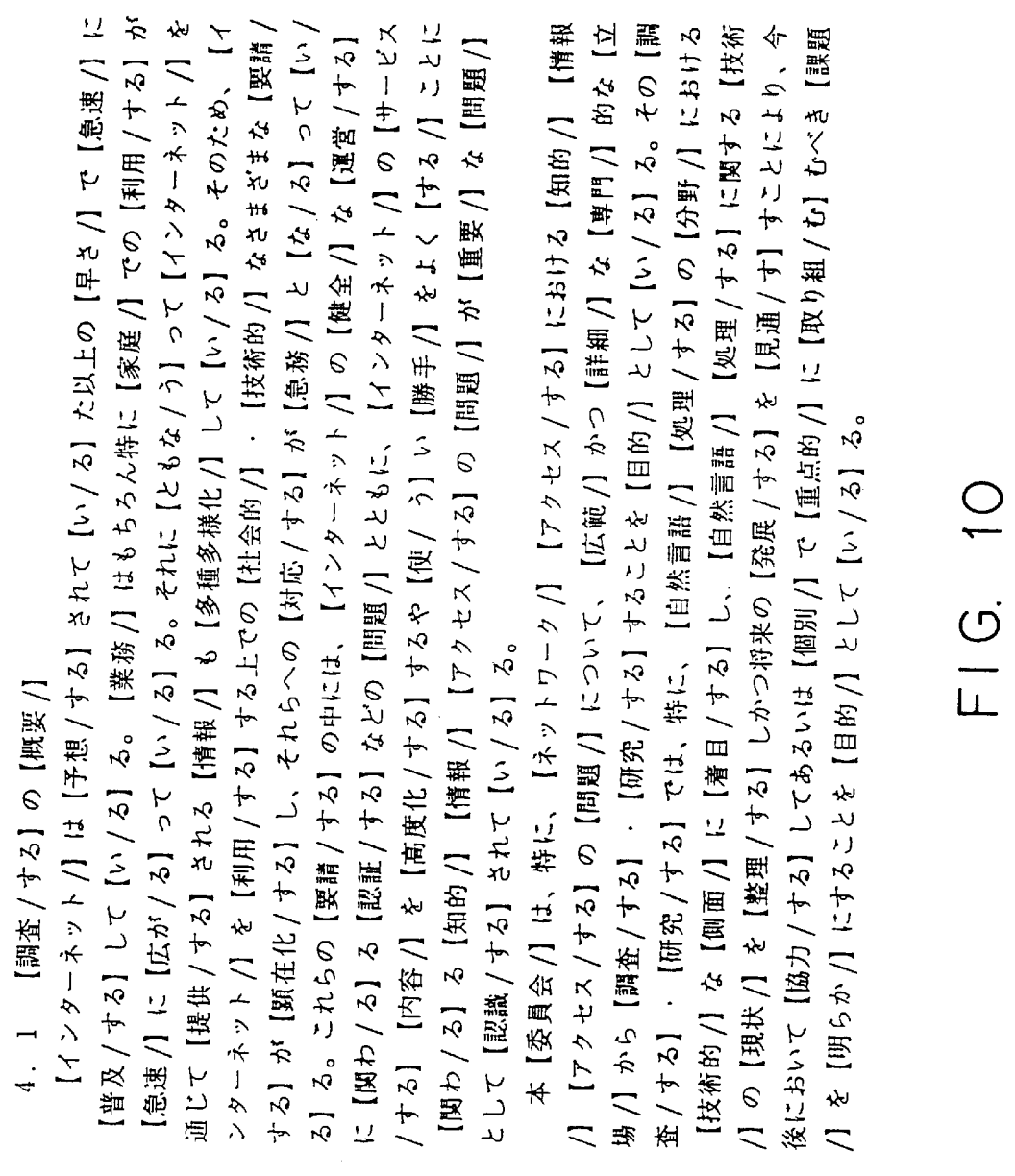

FIG. 10 shows the result of a first tokenization.

Figure 11:
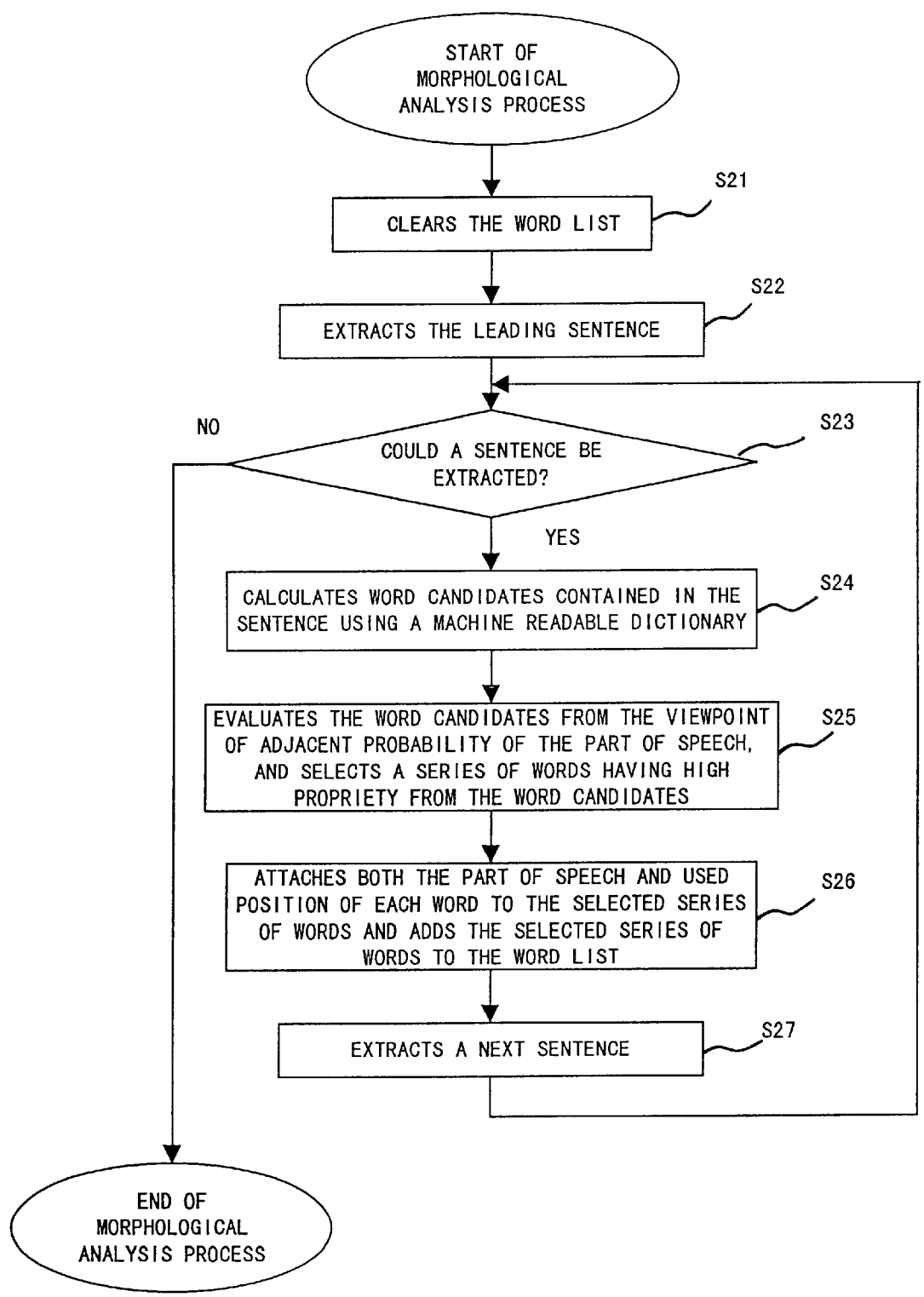

FIG. 11 is a flowchart showing a morphological analysis process.

FIG. 12 shows an example of a dictionary consultation in the case of Japanese.

FIG. 13 shows an example of a dictionary consultation in the case of English.

Figure 14:
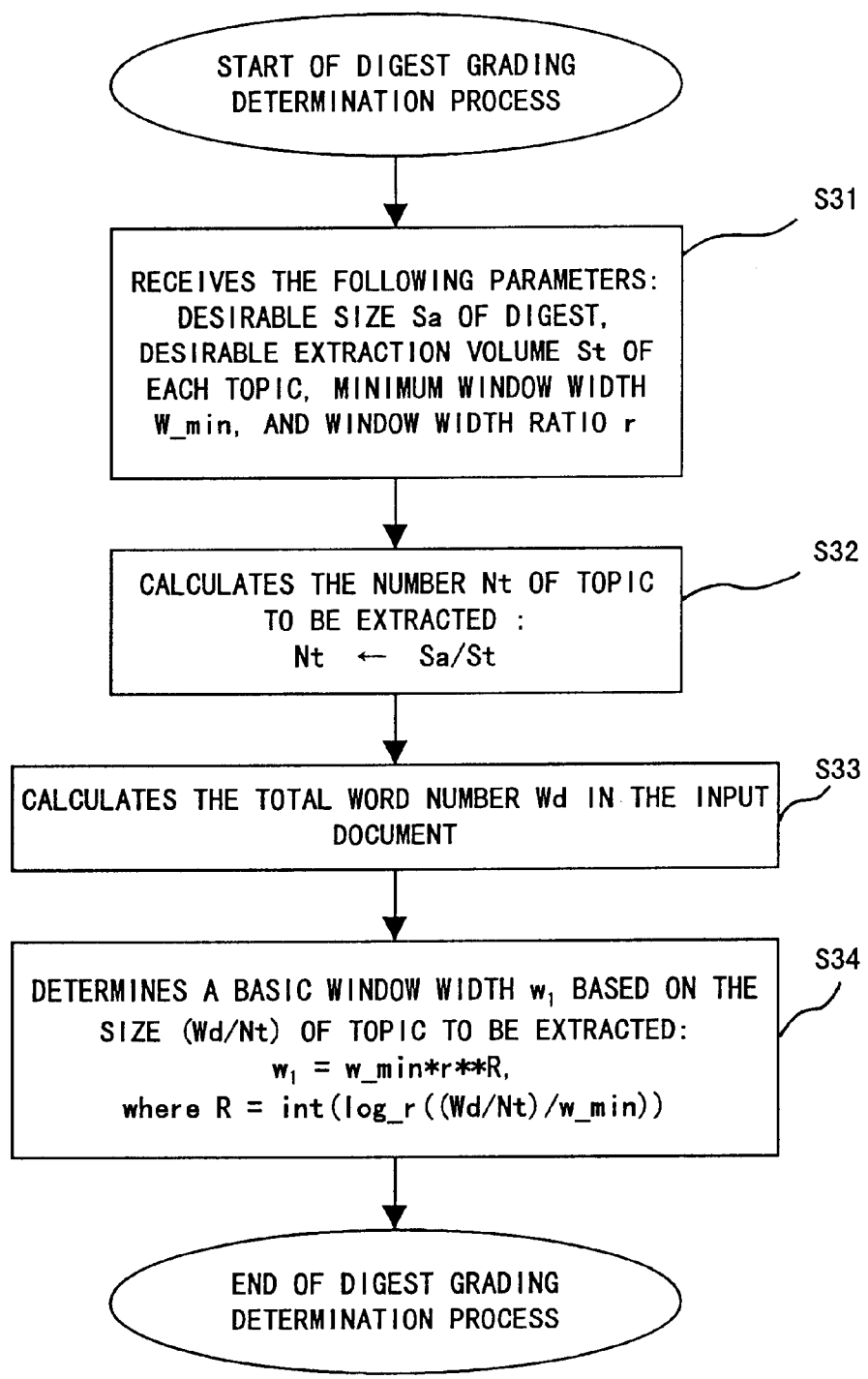

FIG. 14 is a flowchart showing a digest grading determination process.

Figure 15:
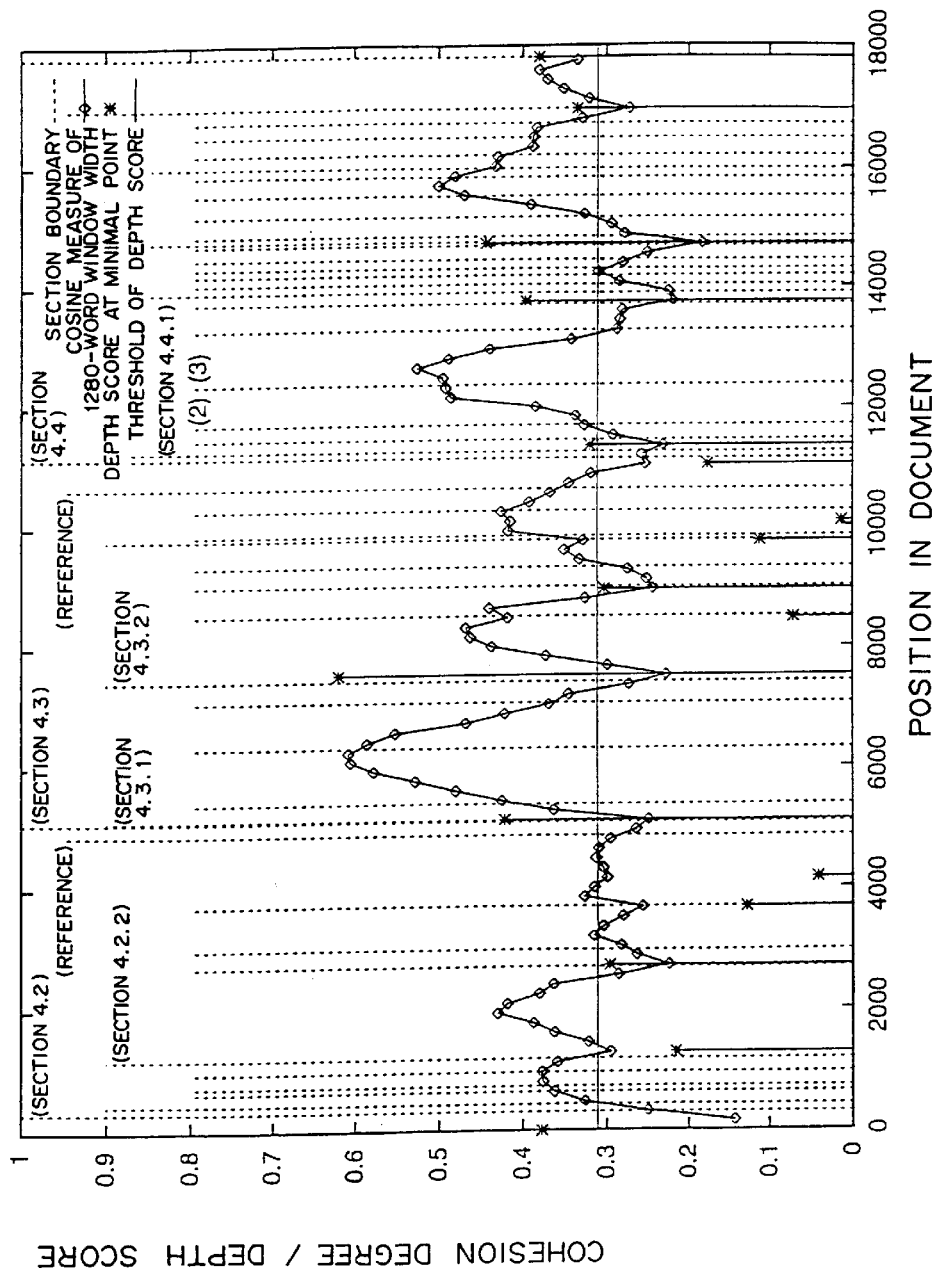

FIG. 15 shows a first cohesion distribution.

Figure 16:
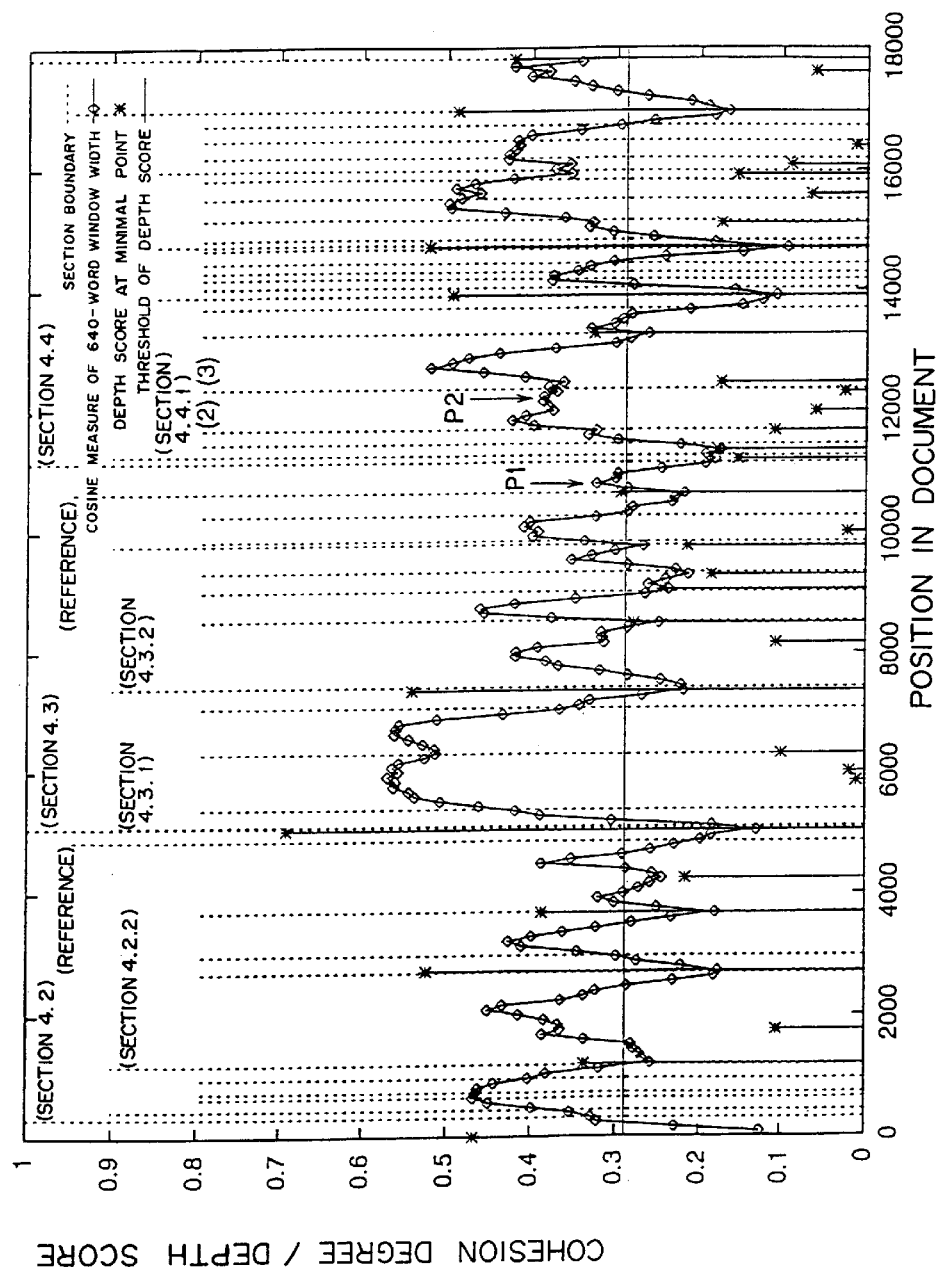

FIG. 16 shows a second cohesion distribution.

Figure 17:
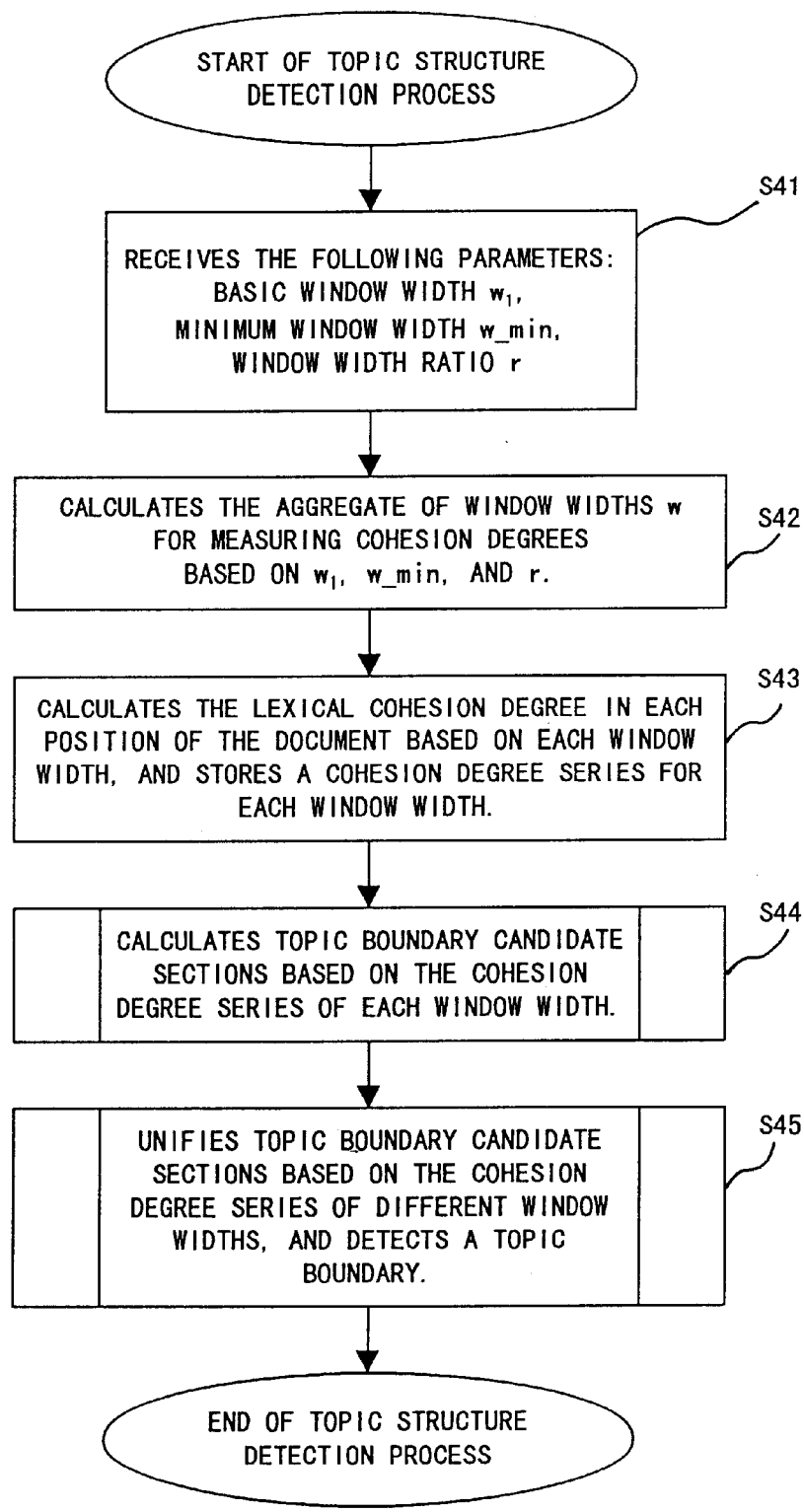

FIG. 17 is a flowchart showing a topic structure detection process.

Figure 18:
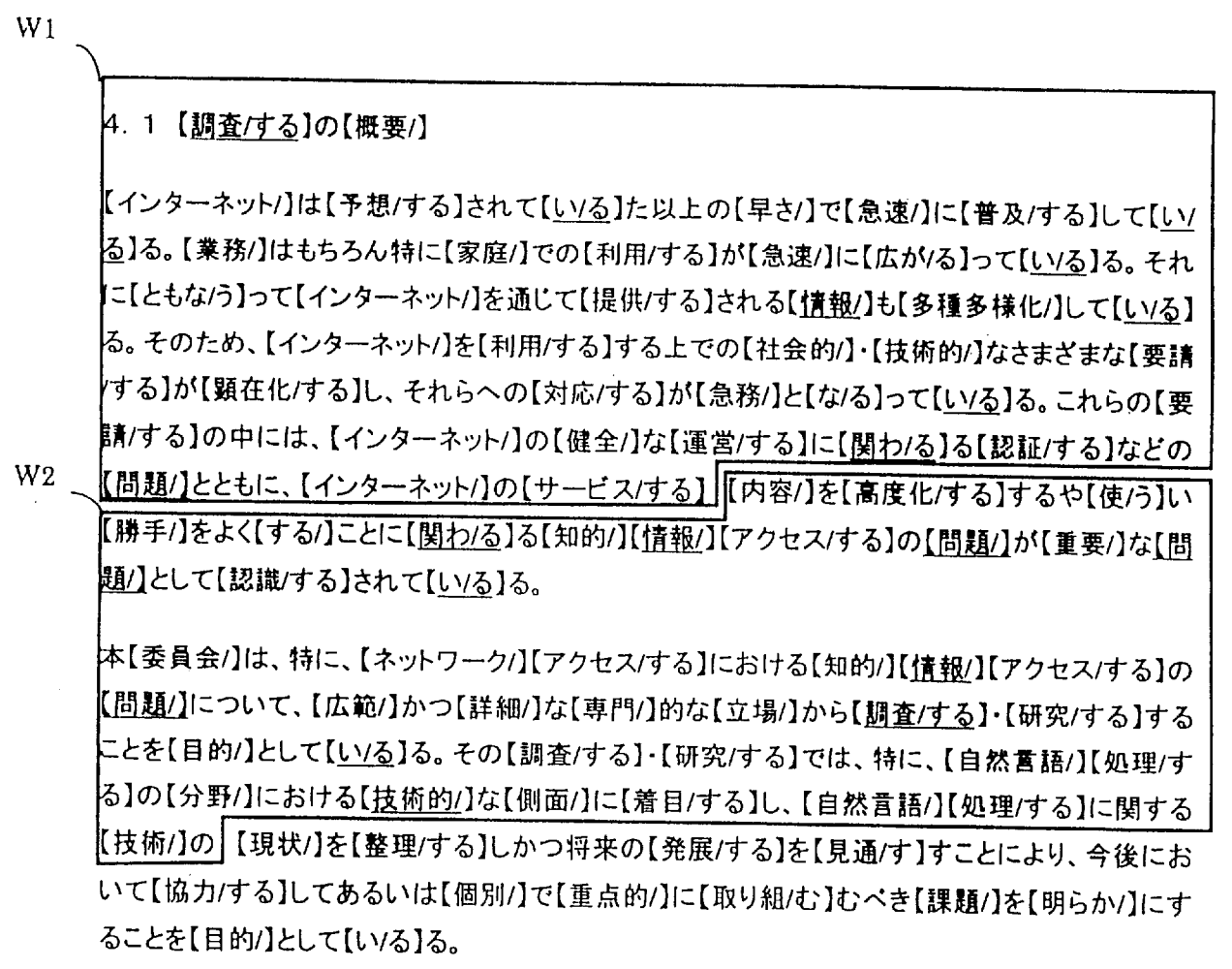

FIG. 18 shows left and right windows.

FIG. 19 shows vocabulary numbers in windows.

Figure 20:
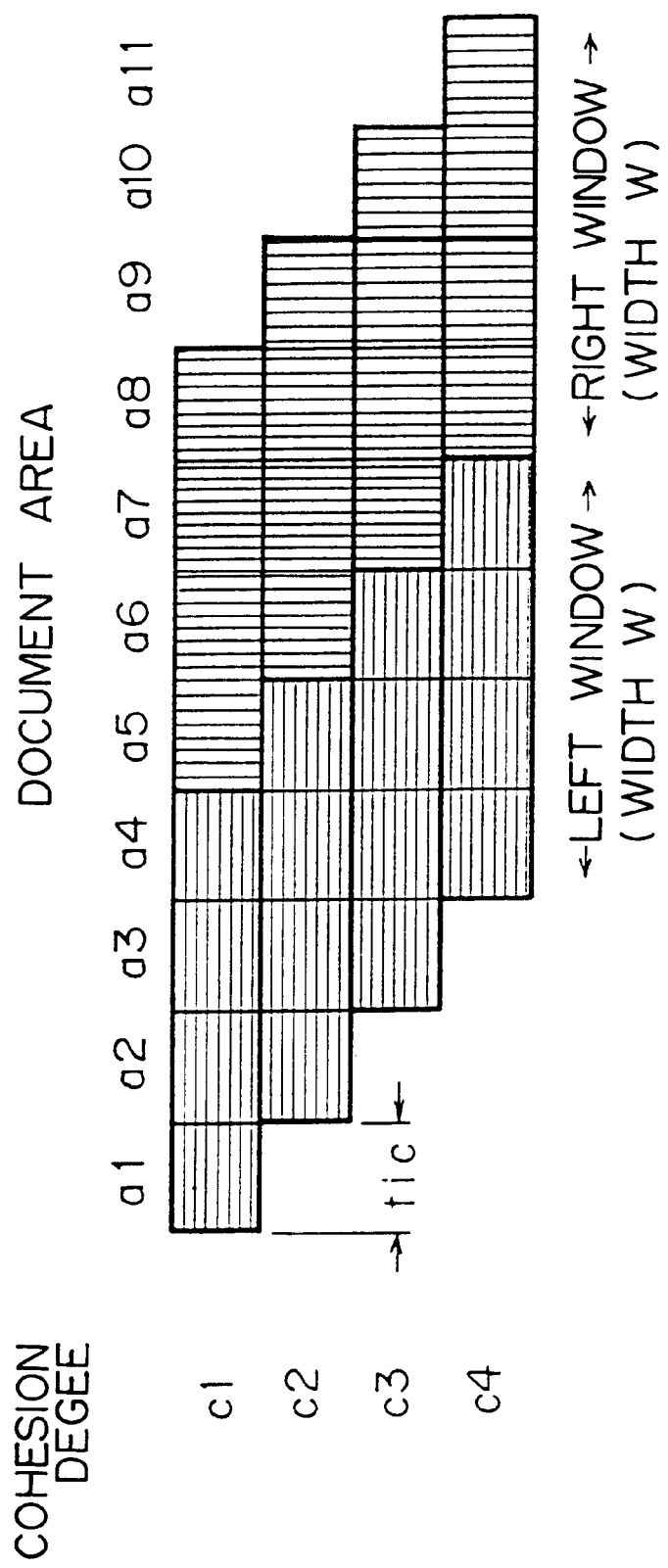

FIG. 20 shows a series of cohesion degrees.

Figure 21:
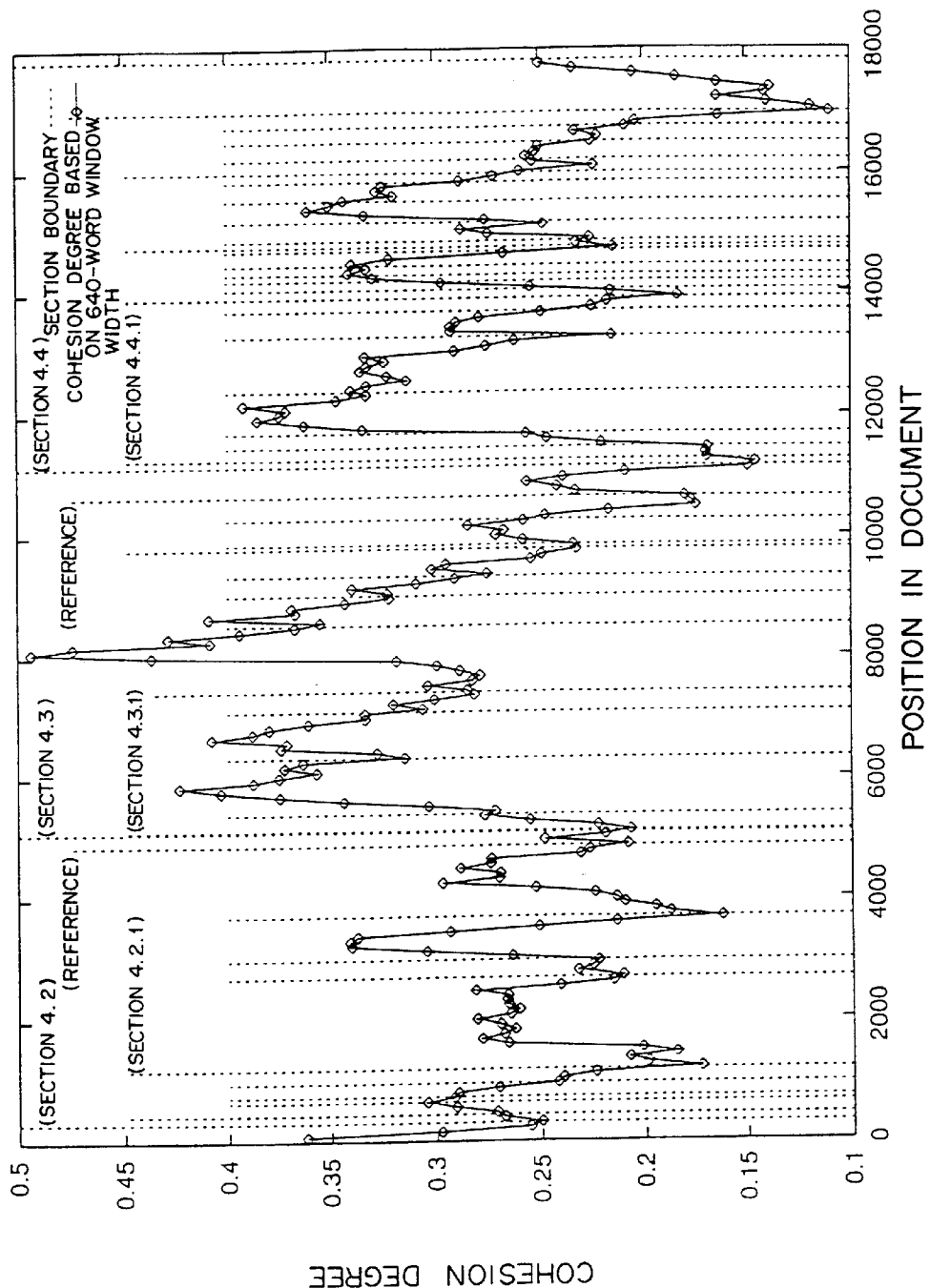

FIG. 21 show a third cohesion distribution.

FIG. 22 shows a relation between a moving average and a document area.

FIG. 23 is a flowchart showing a topic boundary candidate section detection process.

Figure 24:
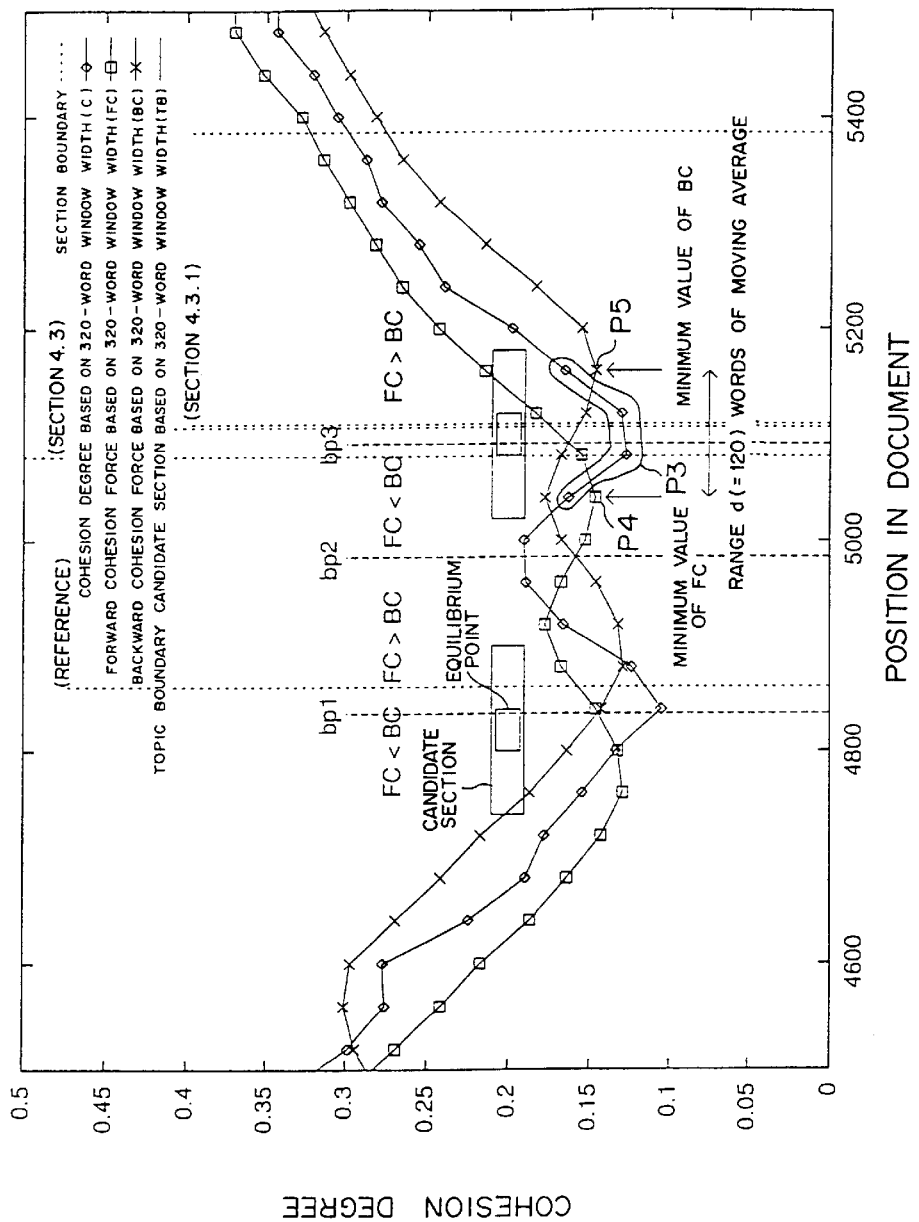

FIG. 24 shows a cohesion force distribution.

Figure 25:
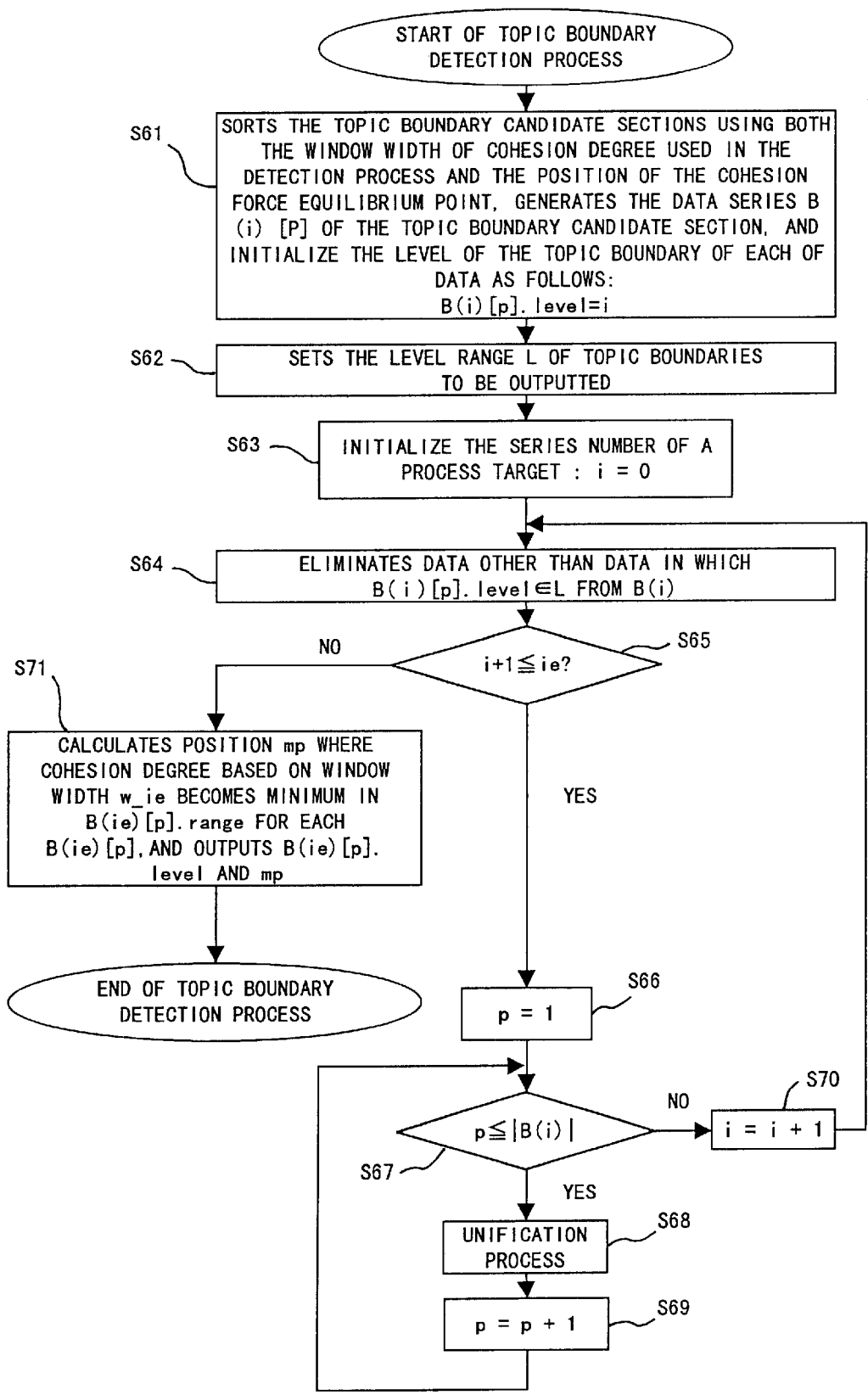

FIG. 25 is a flowchart showing a topic boundary detection process.

Figure 26:
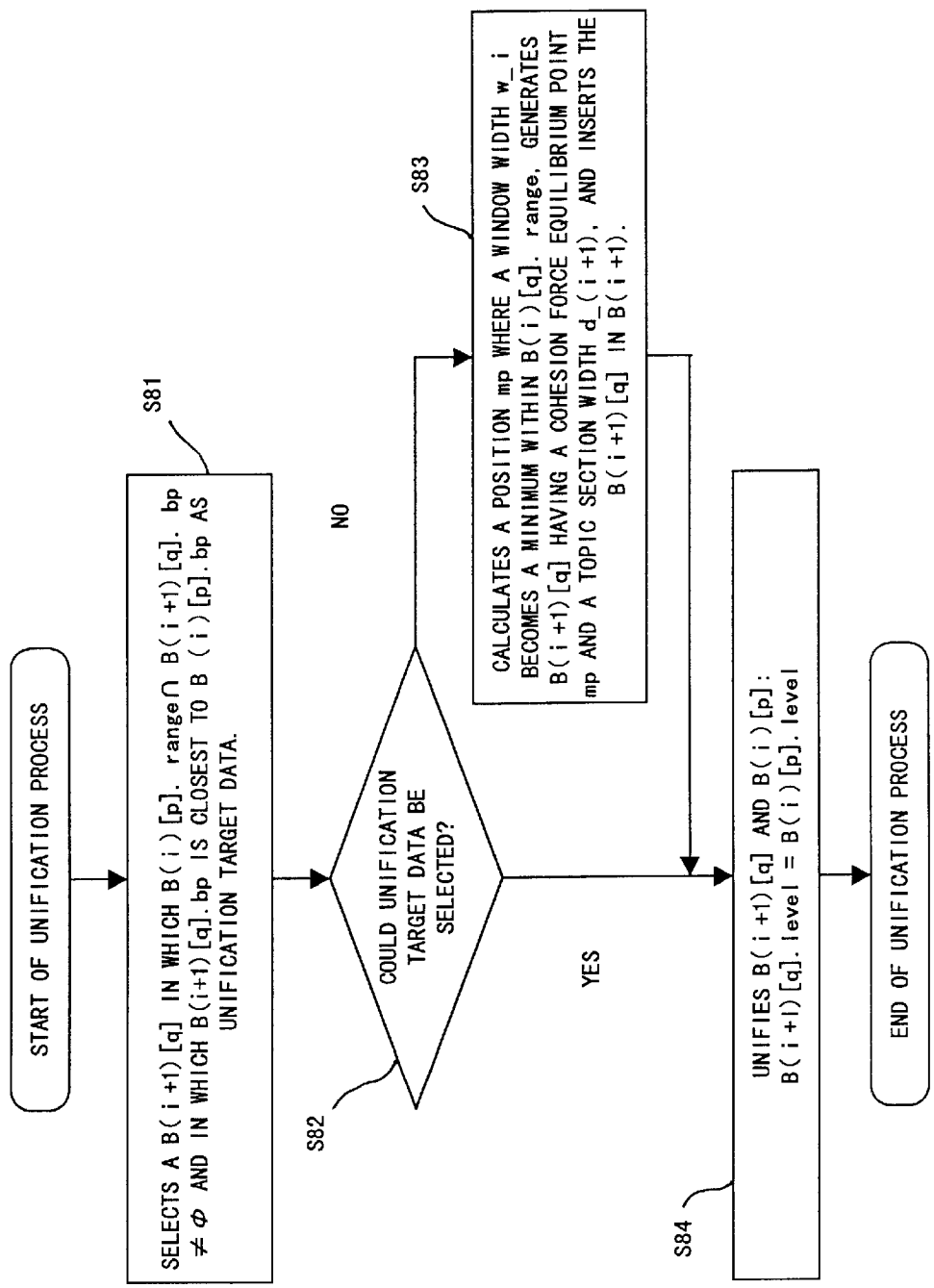

FIG. 26 ia a flowchart showing a first unification process.

Figure 27:
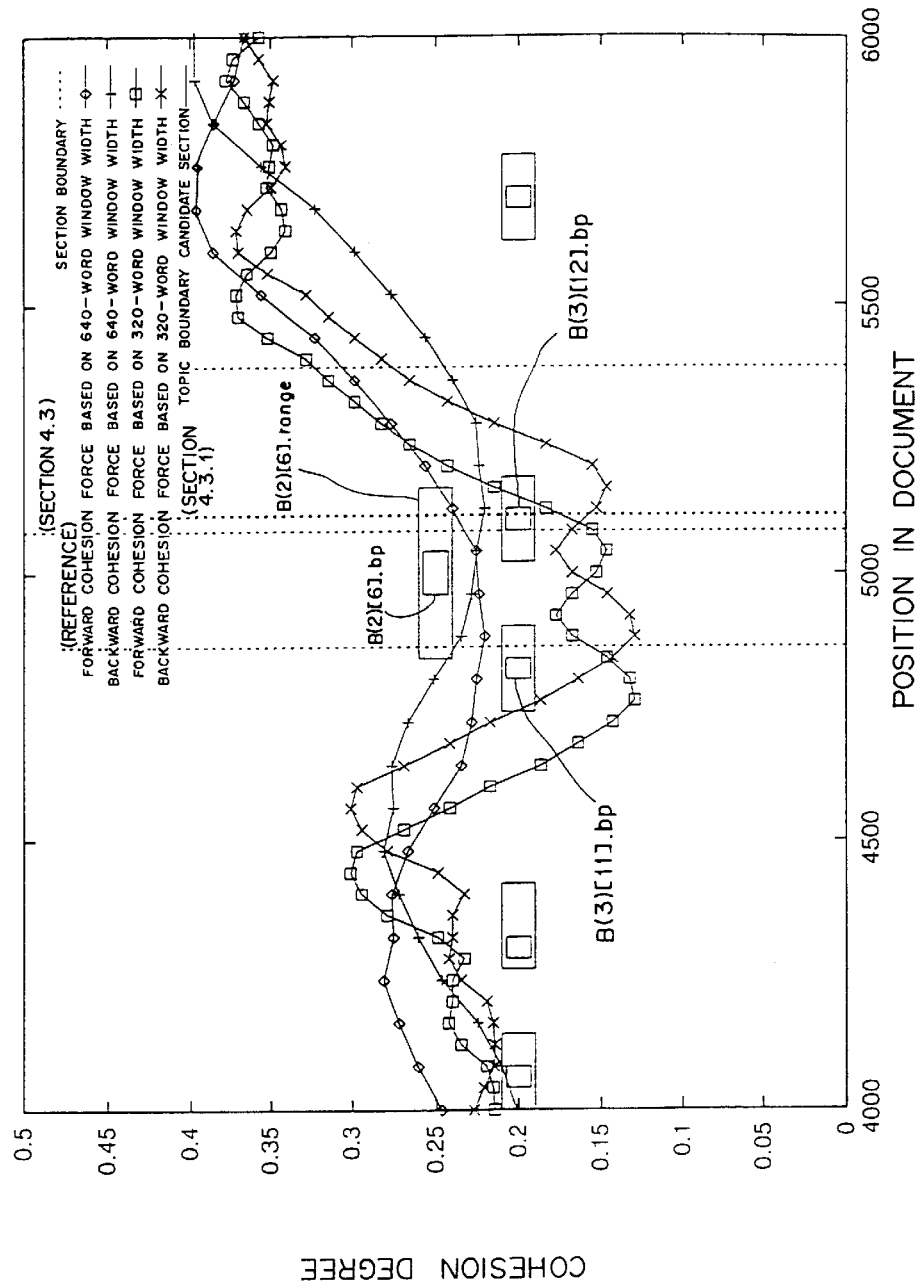

FIG. 27 shows unification target data.

Figure 28:
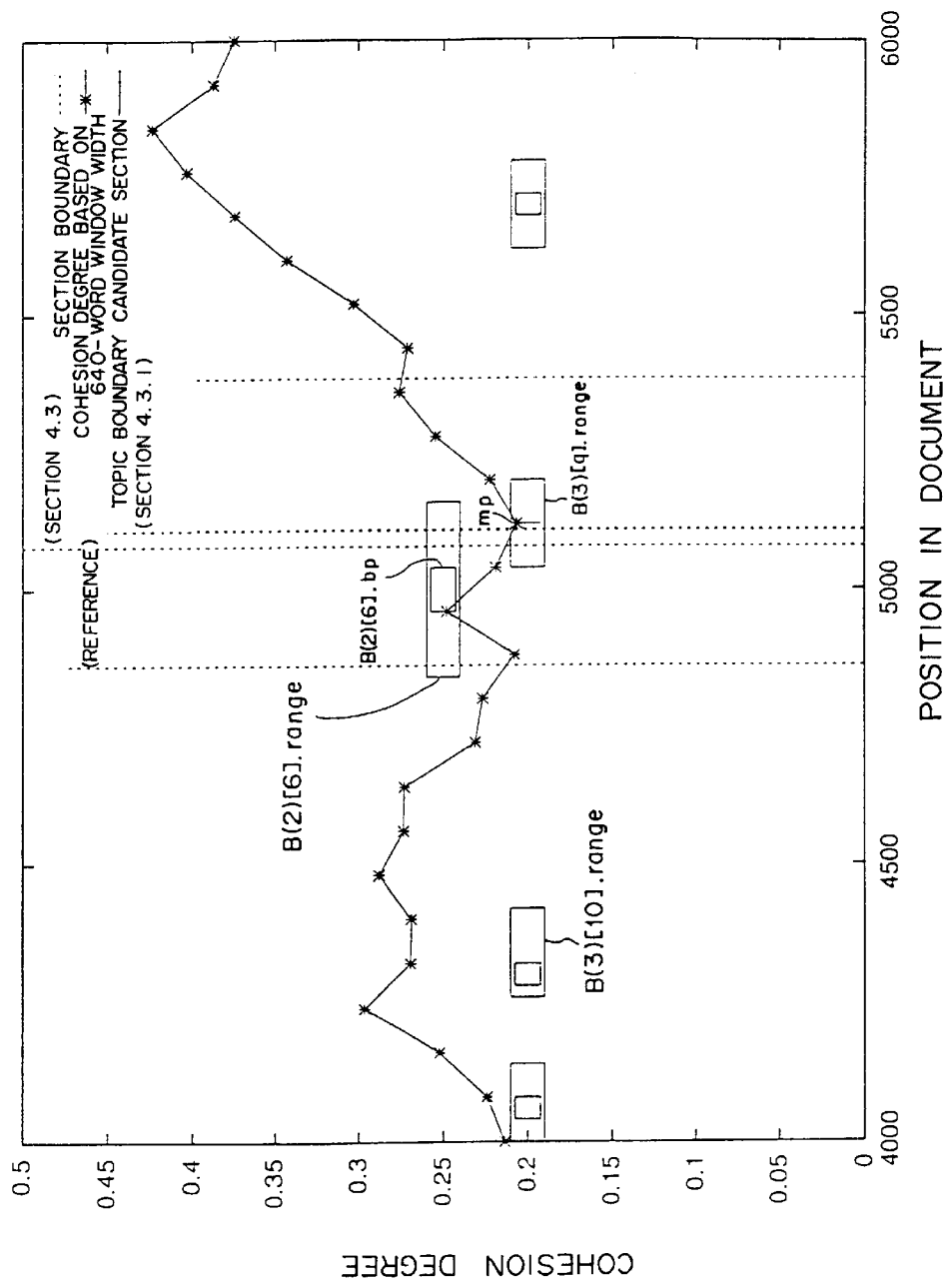

FIG. 28 shows the generation of pseudo-data.

Figure 29:
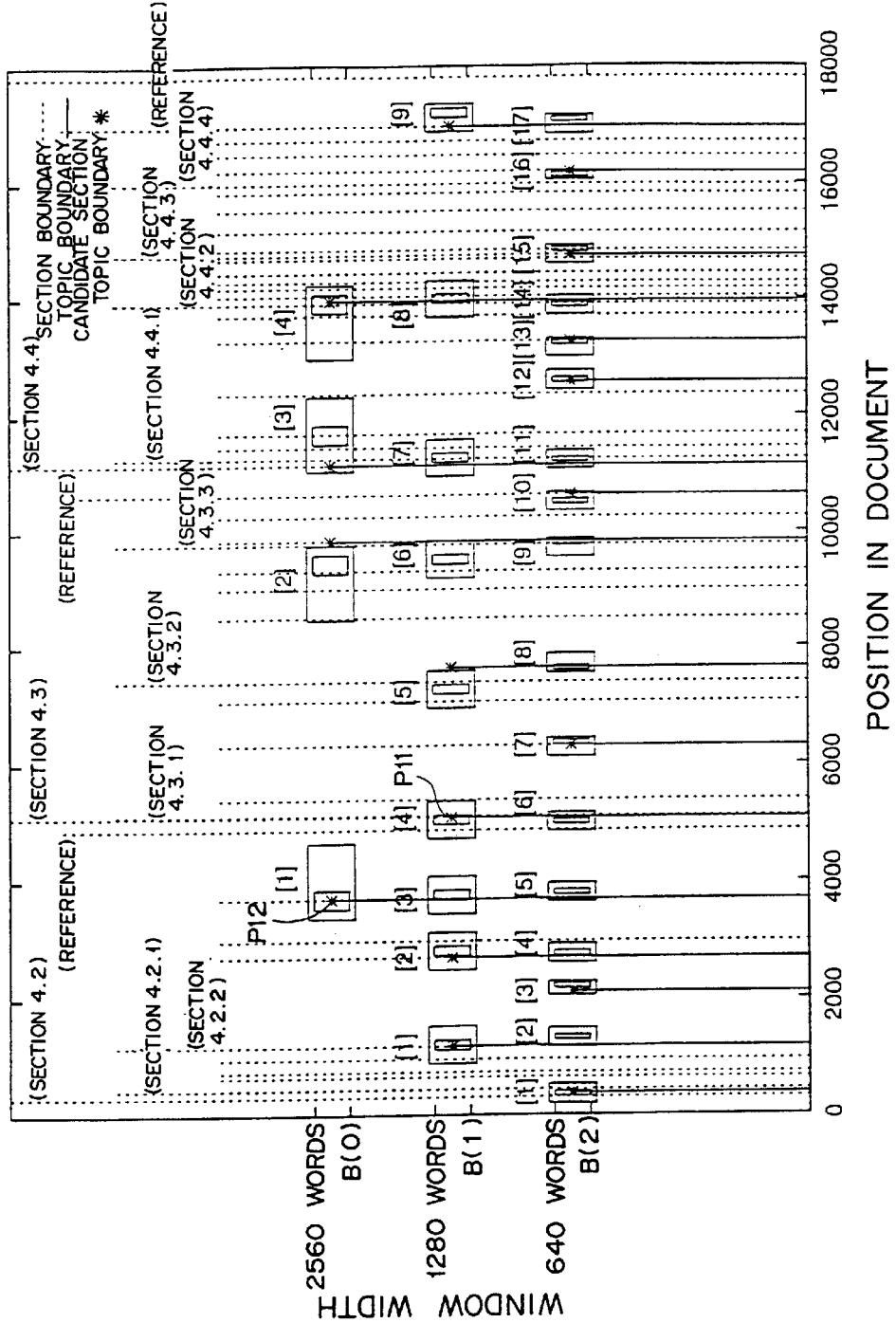

FIG. 29 shows a first detection result of a topic structure.

Figure 30:
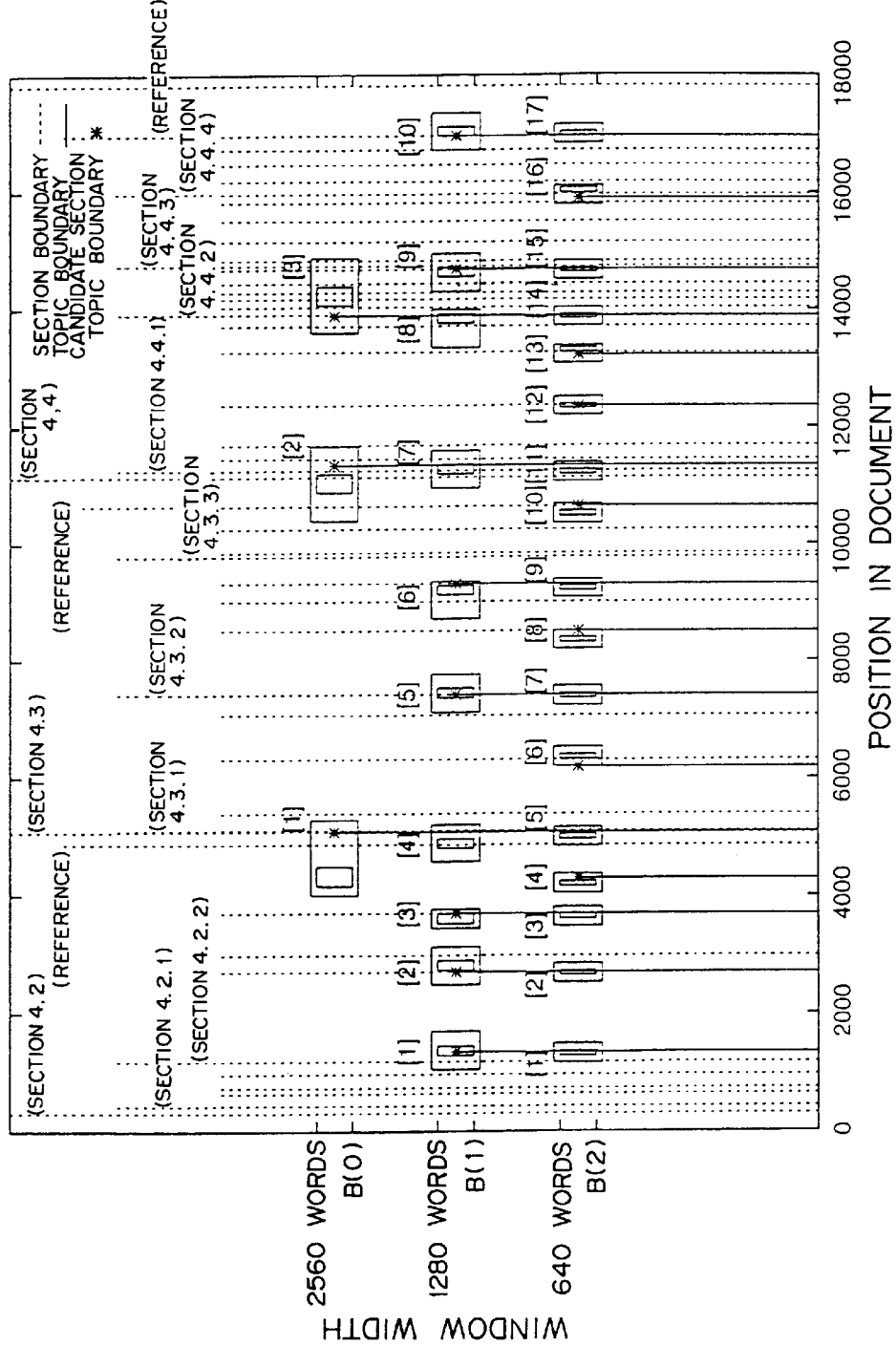

FIG. 30 shows a second detection result of a topic structure.

FIG. 31 shows a first set of intervals of topic boundaries.

FIG. 32 shows a first recall ratio and a first precision ratio.

FIG. 33 shows a second recall ratio and a second precision ratio.

FIG. 34 shows a second set of intervals of topic boundaries.

FIG. 35 shows a third recall ratio and a third precision ratio.

FIG. 36 shows a fourth recall ratio and a fourth precision ratio.

FIG. 37 shows a first set of document patterns and boundary levels.

Figure 38:
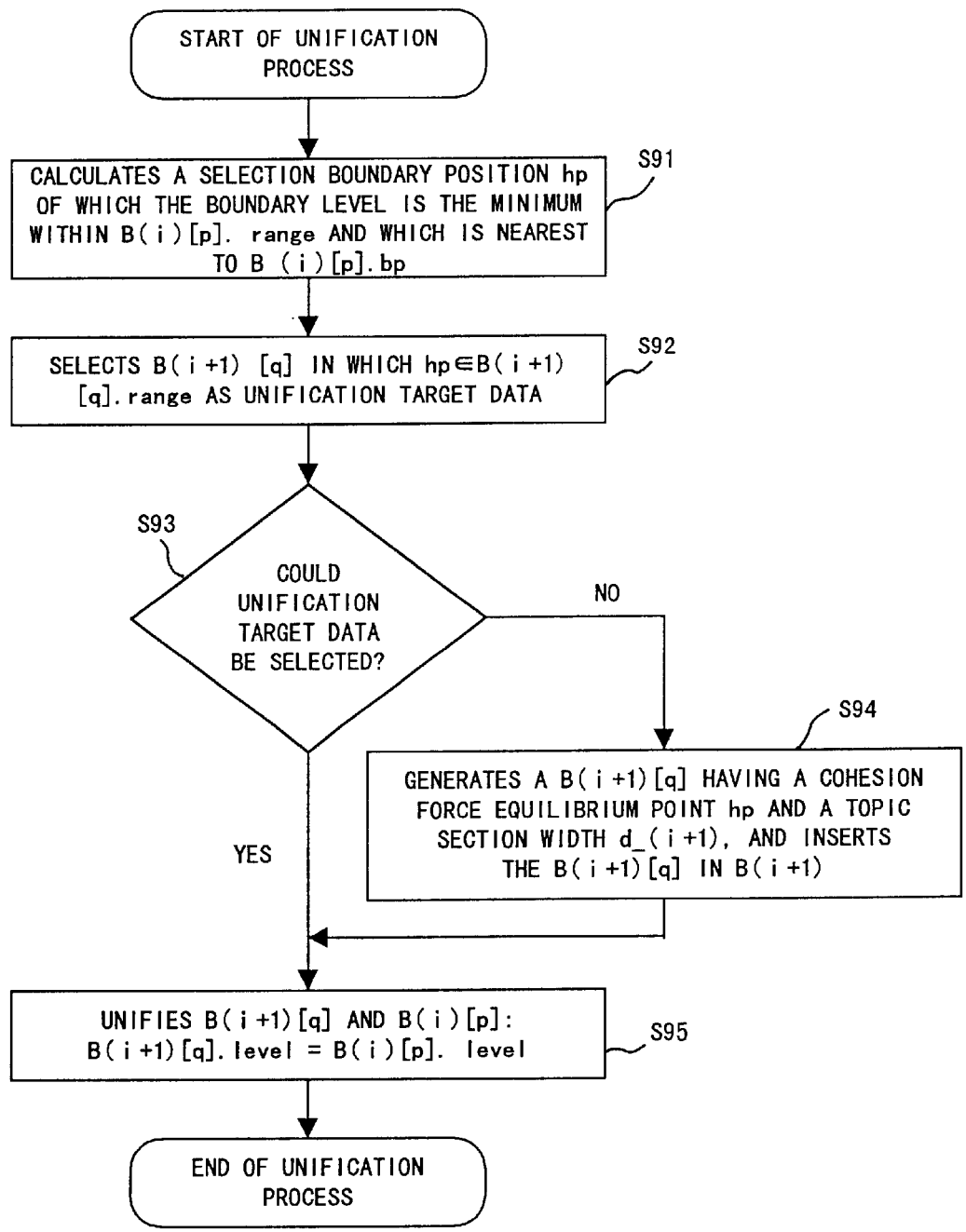

FIG. 38 is a flowchart showing a second unification process.

Figure 39:
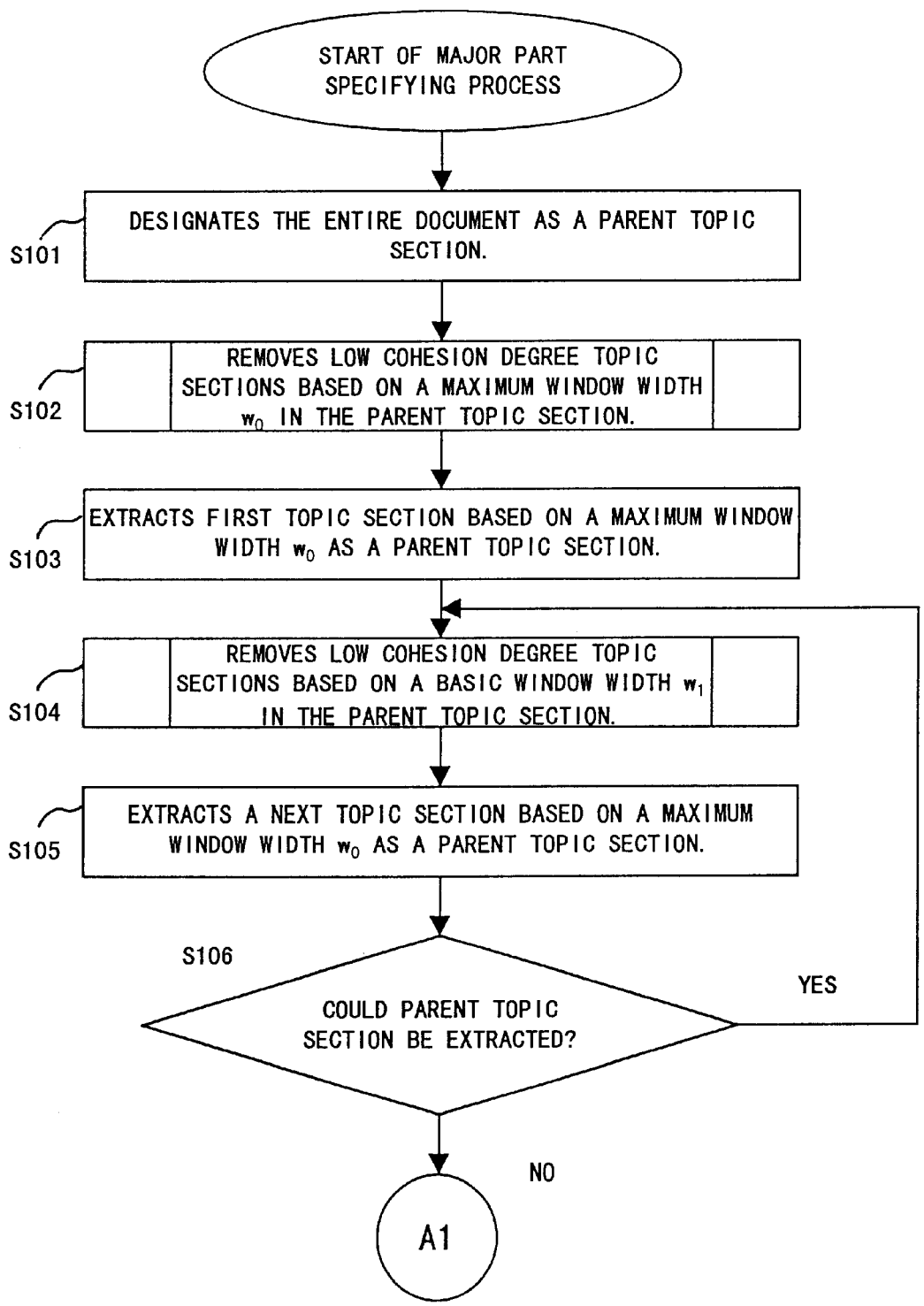

FIG. 39 is a flowchart showing a major part specifying process (No.1).

Figure 40:
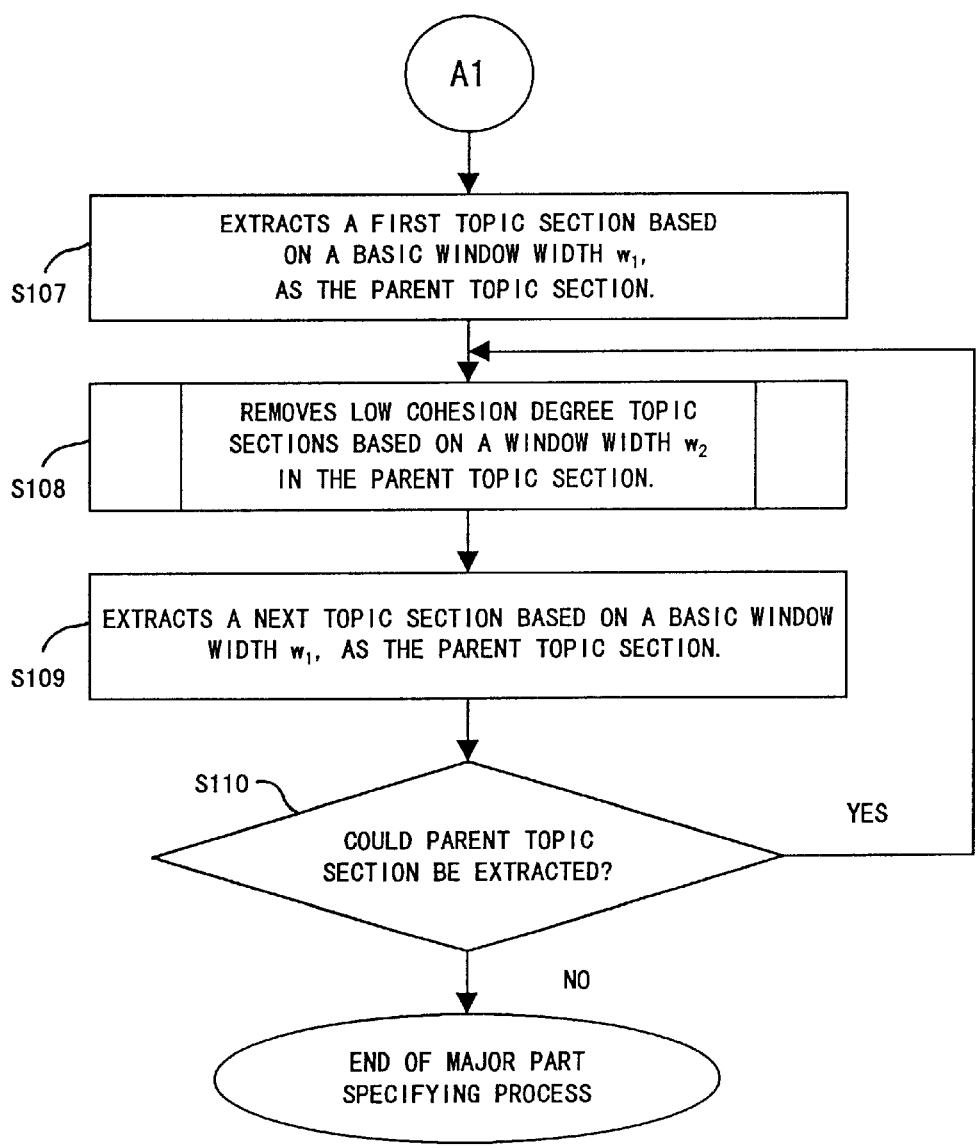

FIG. 40 is a flowchart showing a major part specifying process (No.2).

FIG. 41 is a flowchart showing a topic section elimination process.

Figure 42:
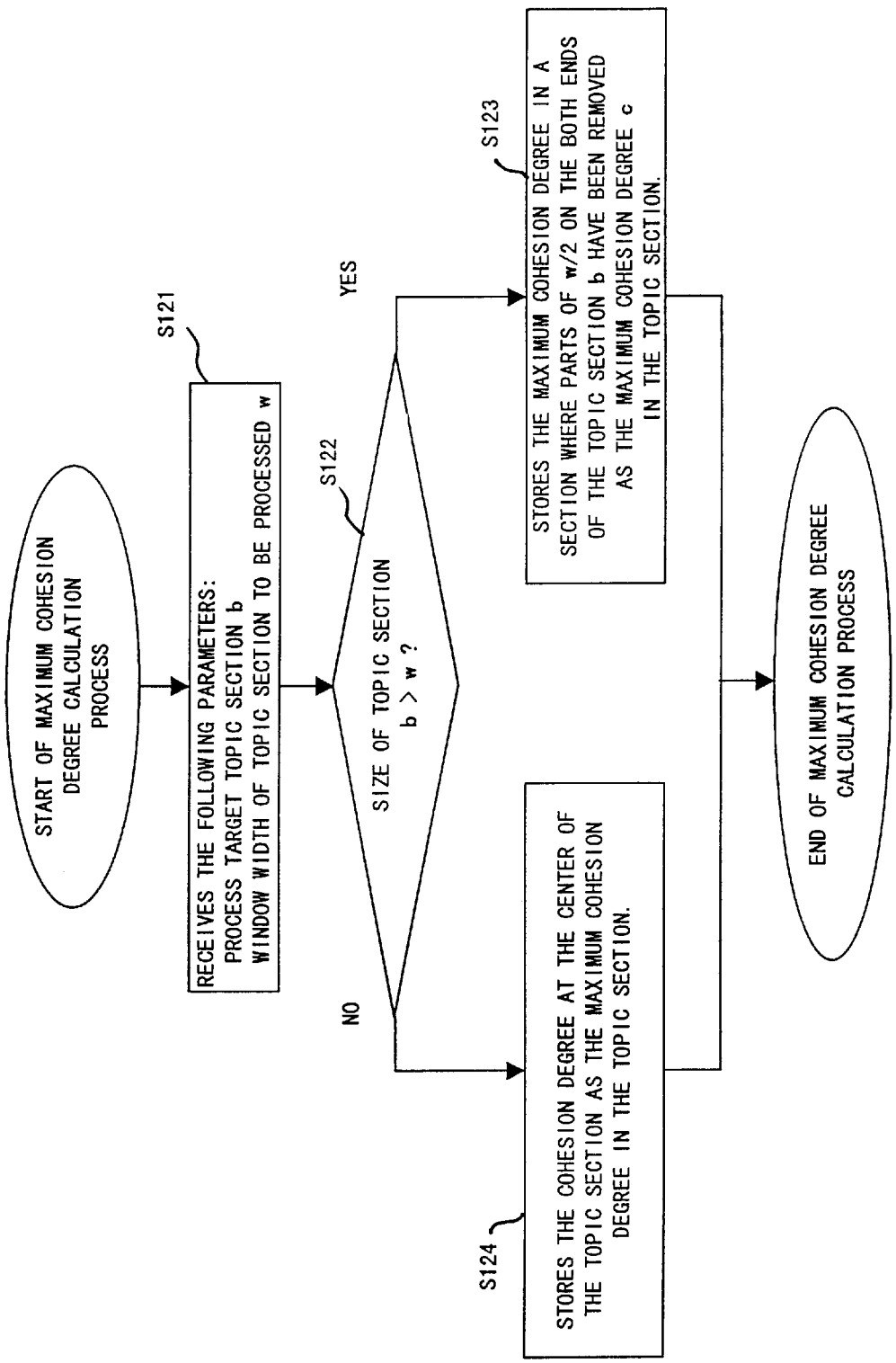

FIG. 42 is a flowchart showing a maximum cohesion calculation process.

Figure 43:
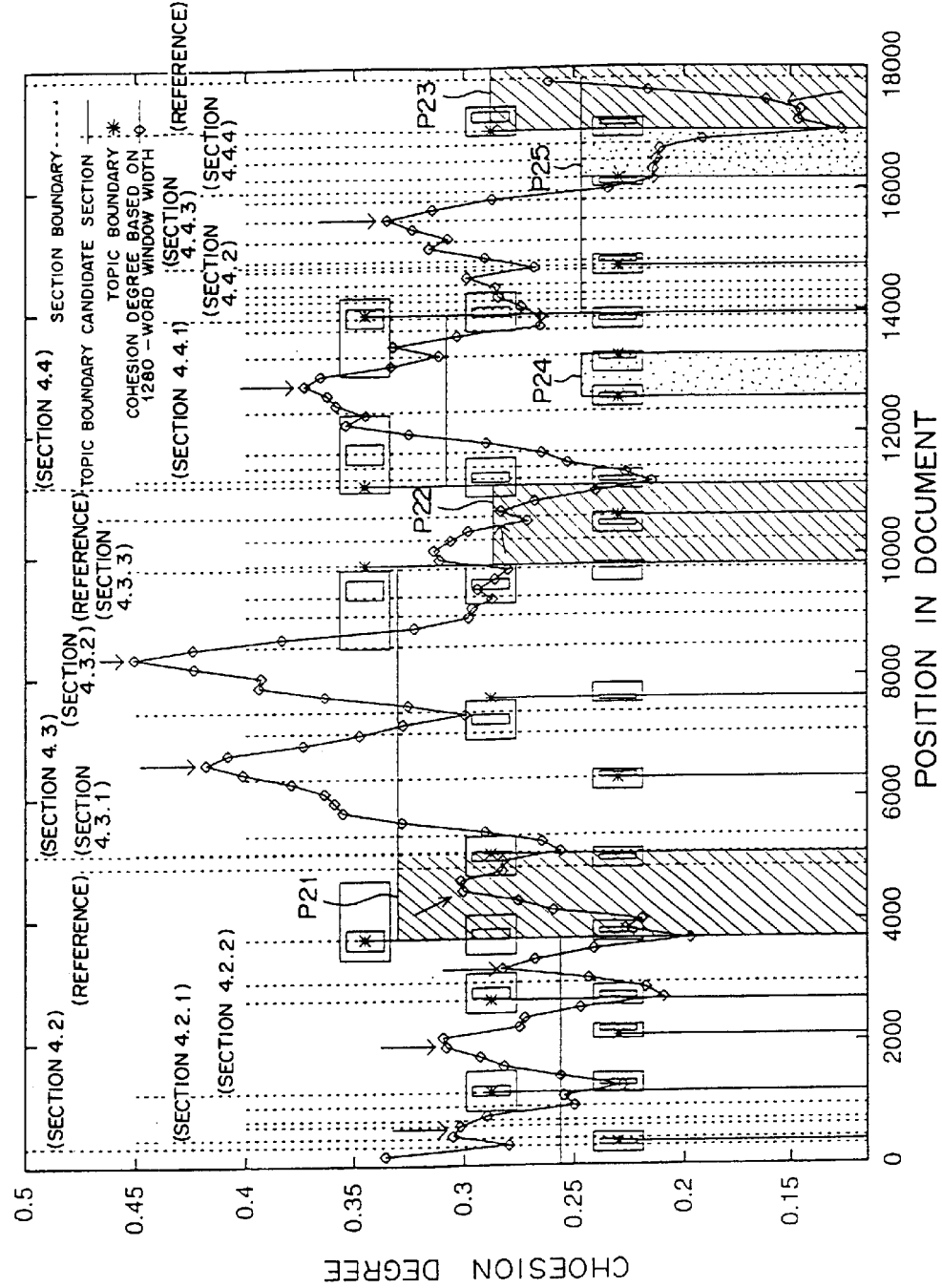

FIG. 43 shows a first specification result of major parts.

Figure 44:
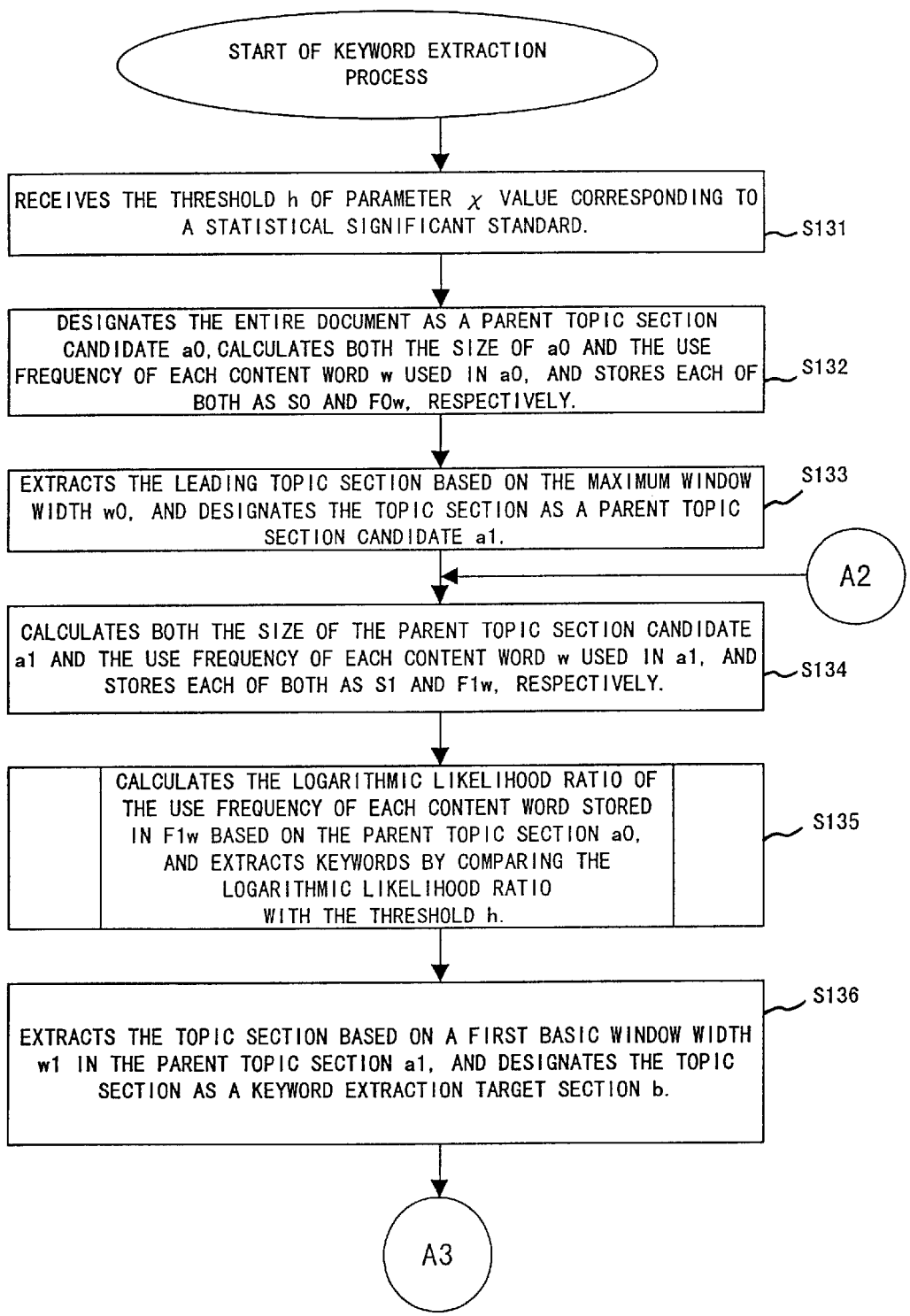

FIG. 44 is a flowchart showing a keyword extraction process (No.1).

Figure 45:
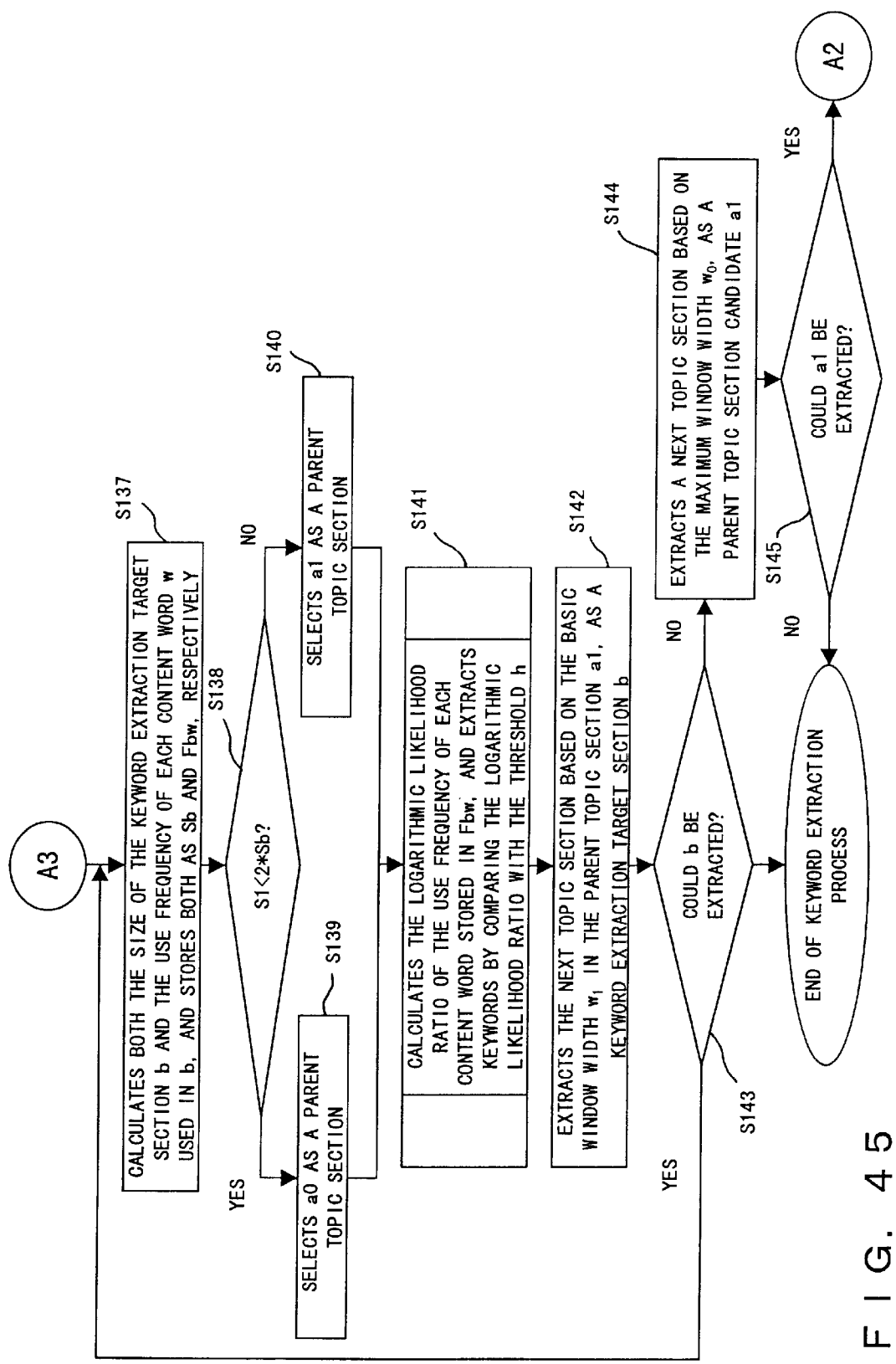

FIG. 45 is a flowchart showing a keyword extraction process (No.2).

Figure 46:
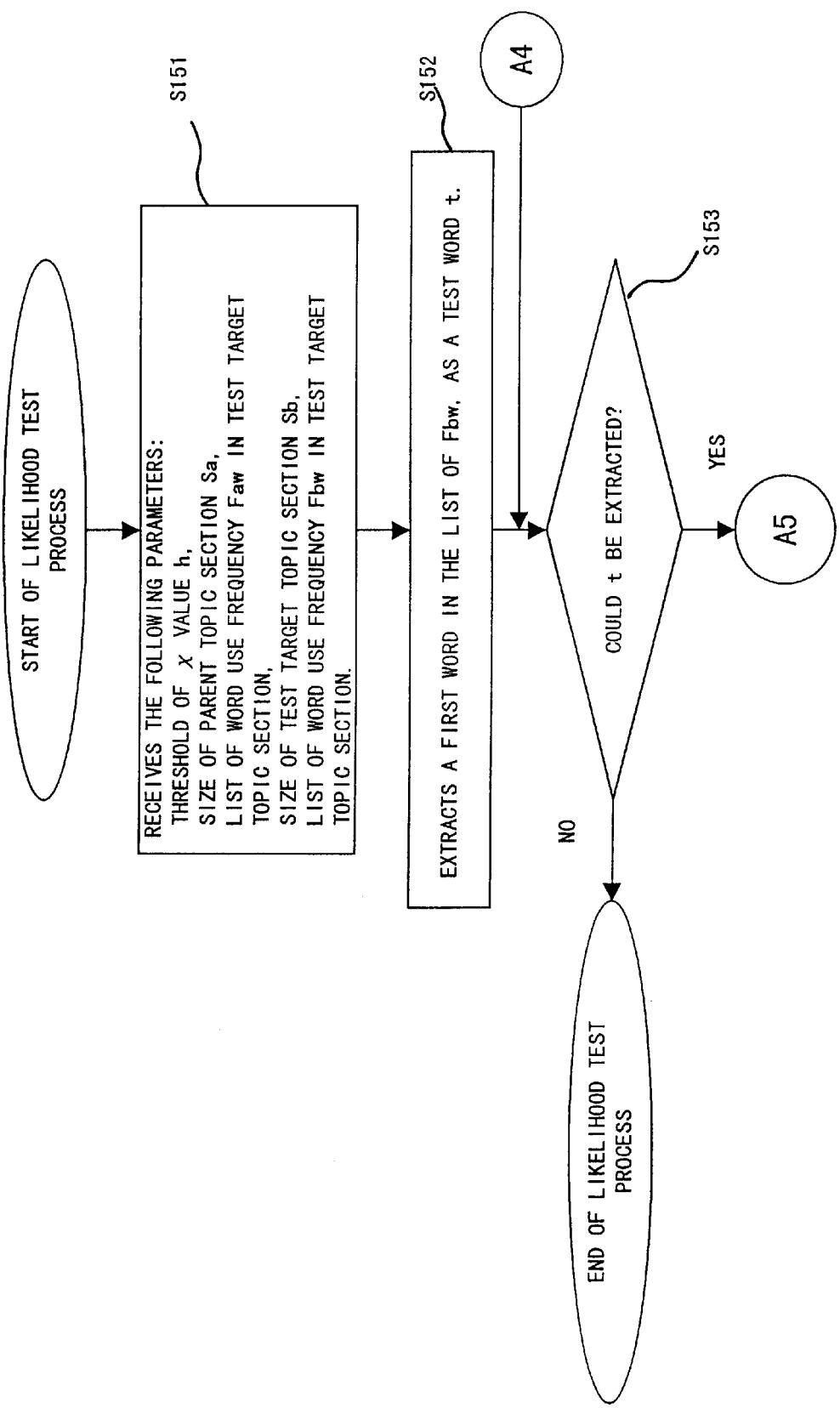

FIG. 46 is a flowchart showing a likelihood ratio test process (No.1).

Figure 47:
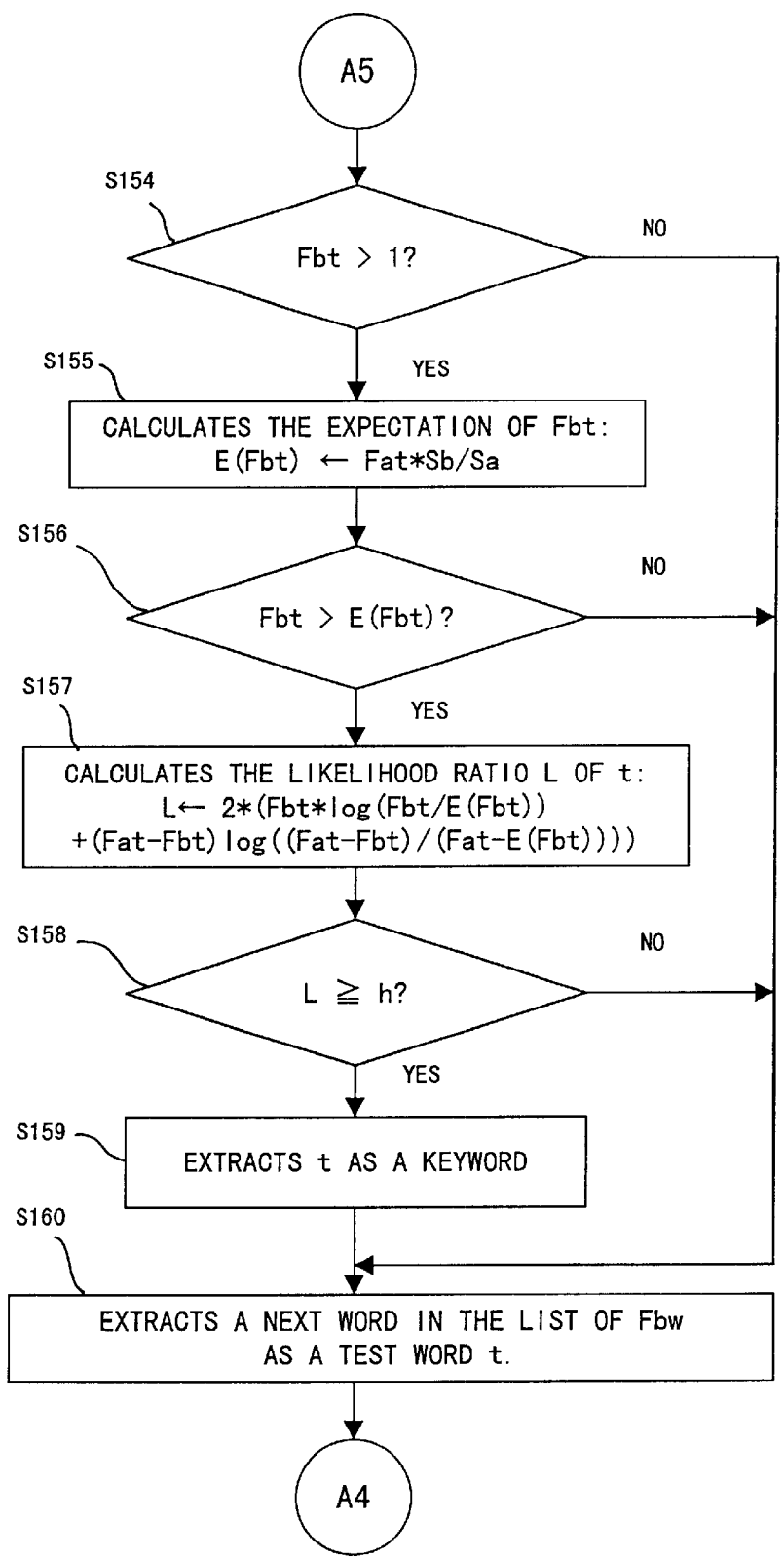

FIG. 47 is a flowchart showing a likelihood ratio test process (No.2).

FIG. 48 shows headings contained in a topic section.

FIG. 49 shows keywords extracted from a topic section.

Figure 50:
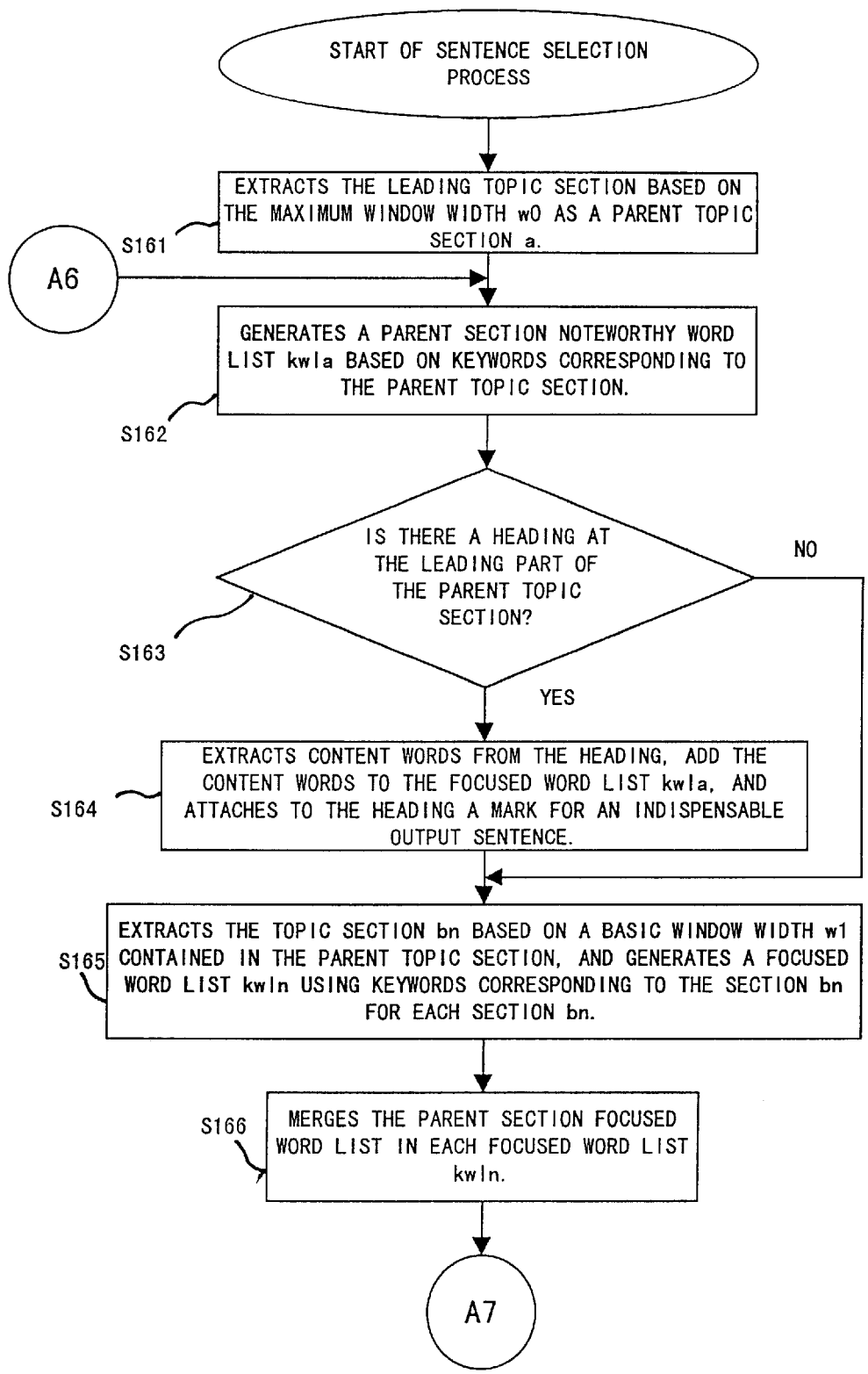

FIG. 50 is a flowchart showing a key sentence selection process (No.1).

Figure 51:
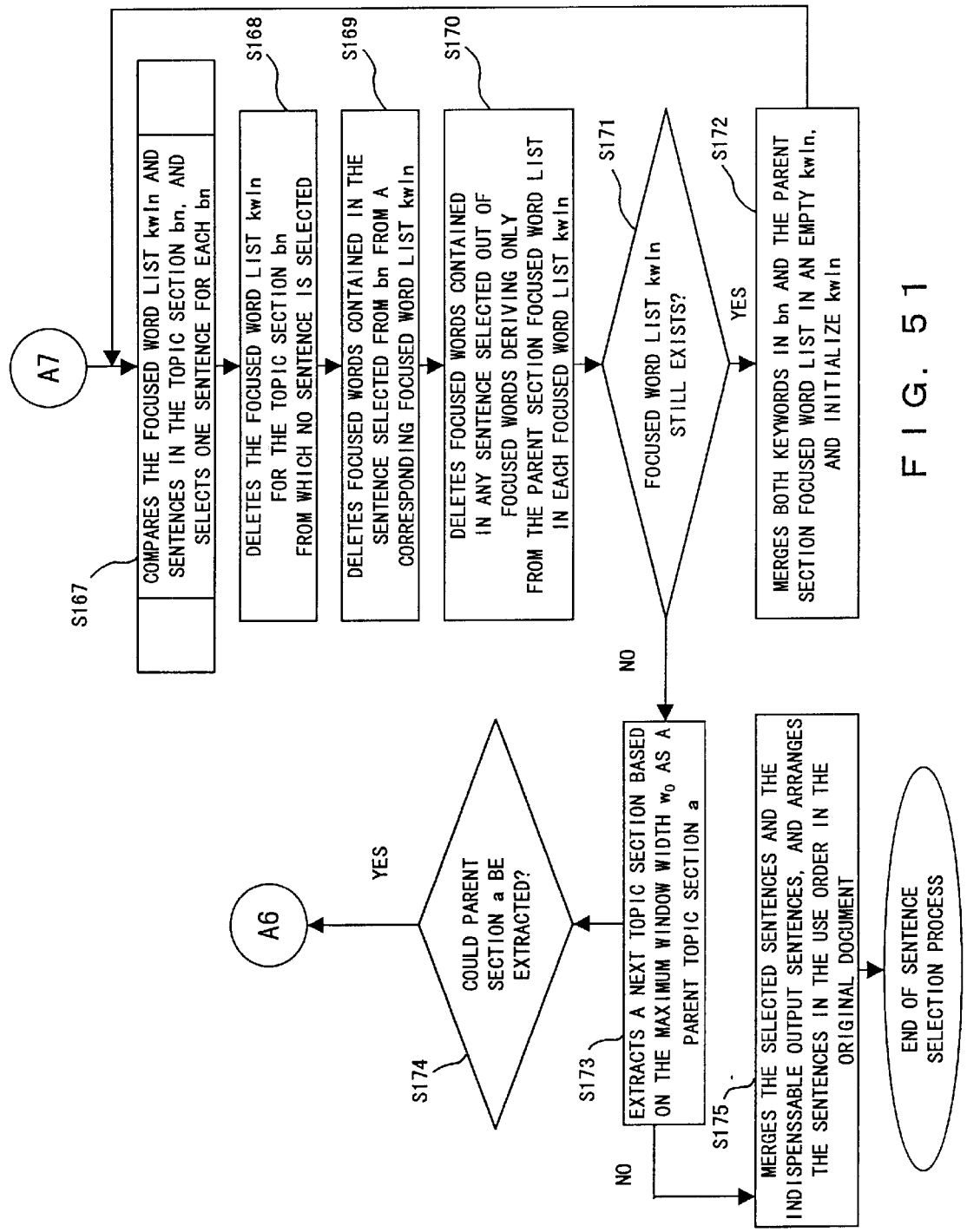

FIG. 51 is a flowchart showing a key sentence selection process (No.2).

Figure 52:
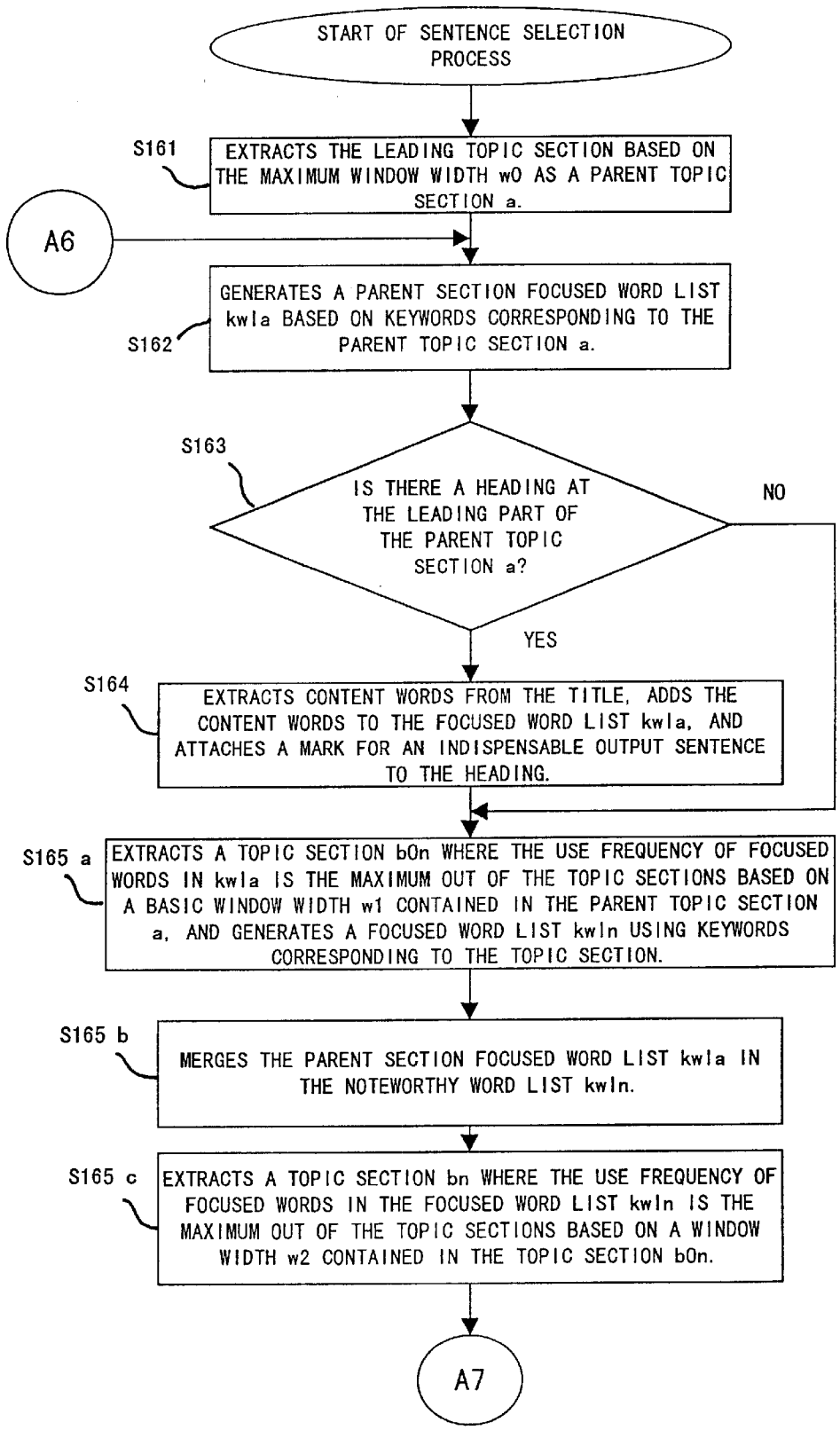

FIG. 52 is a flowchart showing another key sentence selection process.

Figure 53:
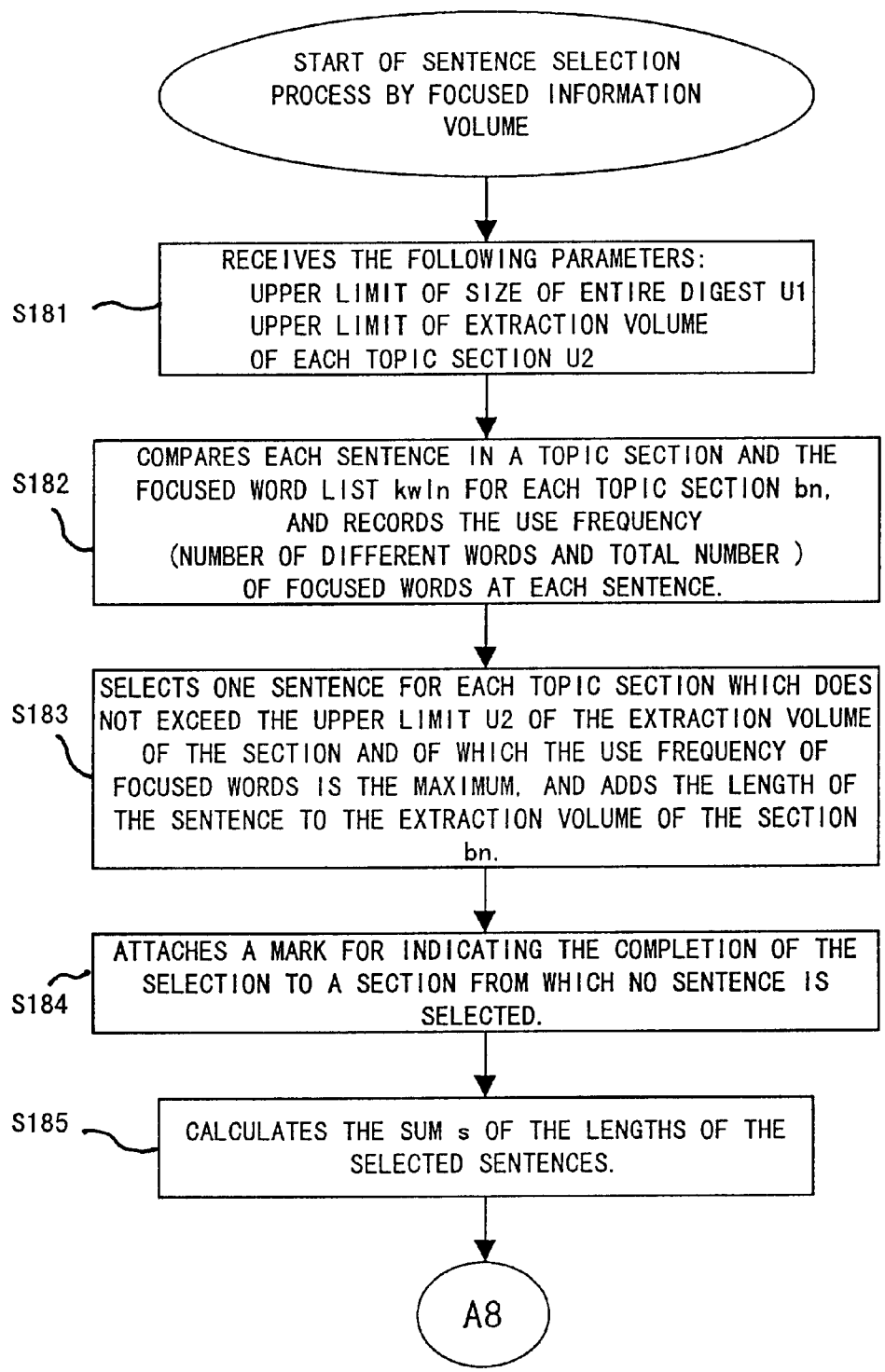

FIG. 53 is a flowchart showing a selection process (No.1).

Figure 54:
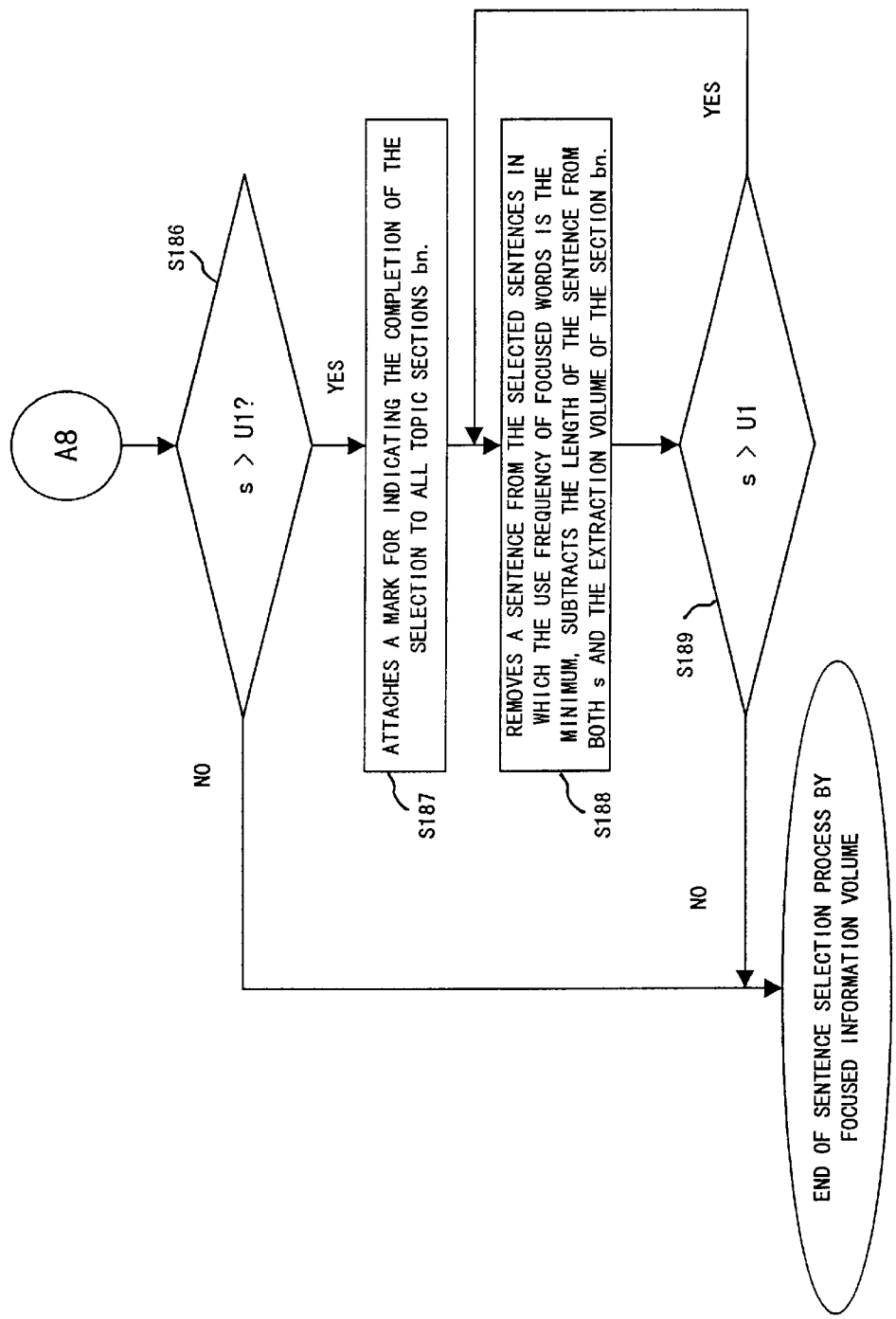

FIG. 54 is a flowchart showing a selection process (No.2).

FIG. 55 shows a first summarization result (No.1).

FIG. 56 shows a first summarization result (No.2).

FIG. 57 shows a first summarization result (No.3).

FIG. 58 shows headings in a second document for digest generation.

FIG. 59 shows a second input document.

FIG. 60 shows a second tokenization result.

FIG. 61 shows stop words.

Figure 62:
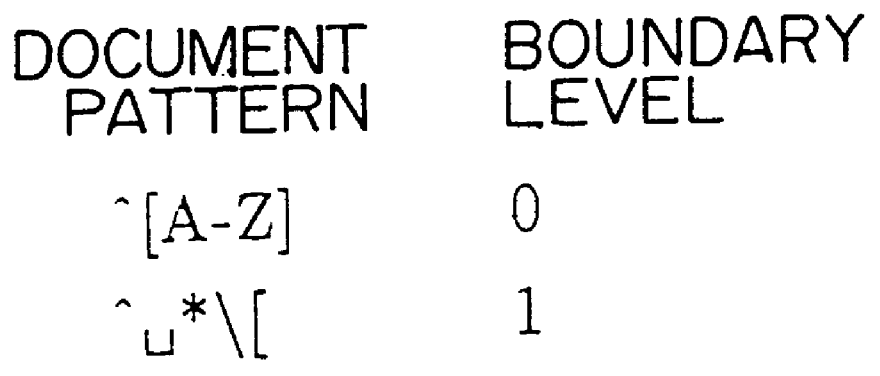

FIG. 62 shows a second set of document patterns and boundary levels.

Figure 63:
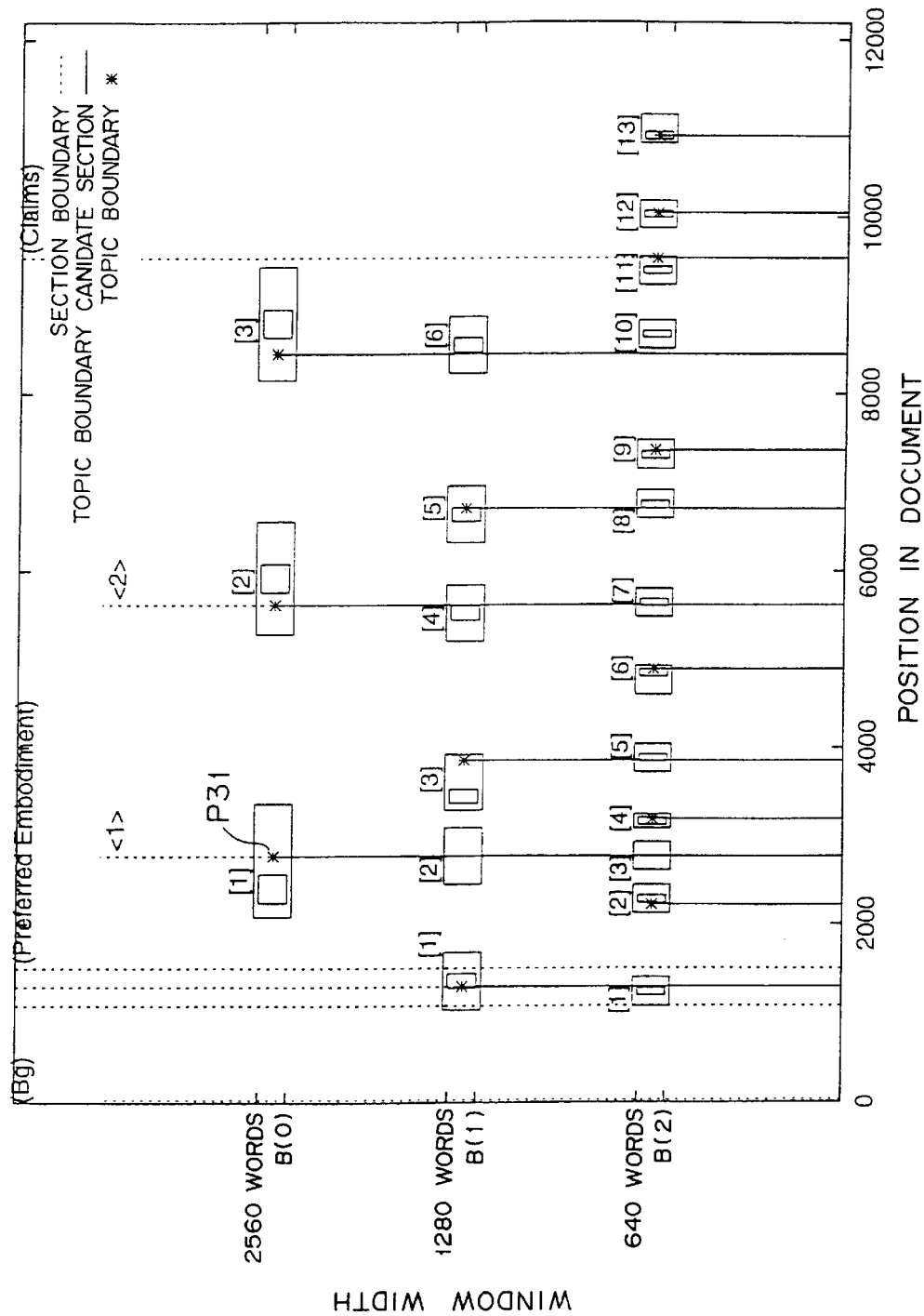

FIG. 63 shows a third detection result of a topic structure.

Figure 64:
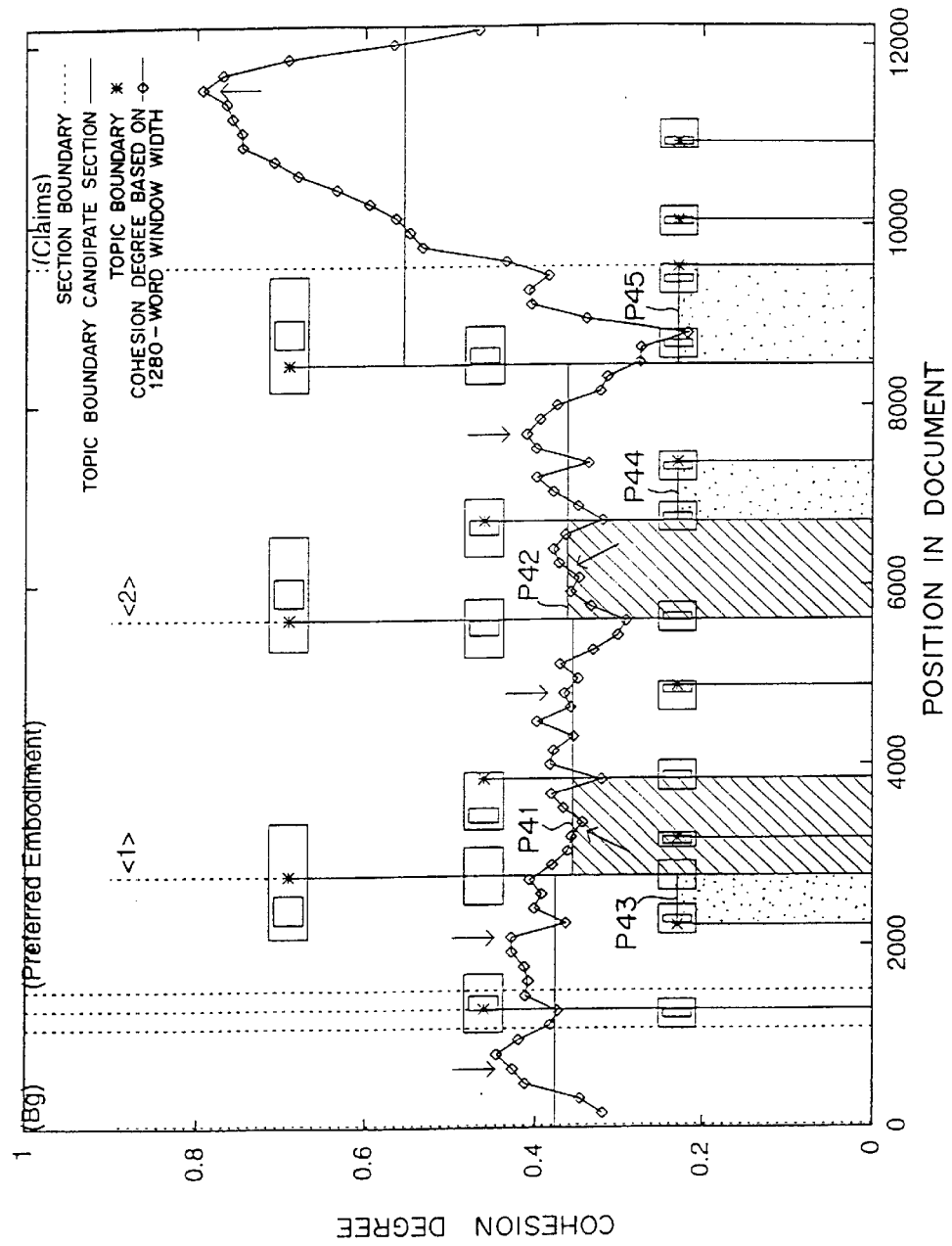

FIG. 64 shows a second specification result of major parts.

FIG. 65 shows a second summarization result (No.1).

FIG. 66 shows a second summarization result (No.2).

FIG. 67 shows a second summarization result (No.3).

DESCRIPTION OF THE PREFERRED EMBODIMENTS

The embodiments of the present invention are described in detail below with reference to the drawings.

FIG. 1 shows the principle of the digest generator apparatus of the present invention. The digest generator apparatus shown in FIG. 1 comprises a structure detector unit 1, an extractor unit 2, a selector unit 3 and an output unit 4.

The structure detection unit 1 detects the hierarchical structure of topics in a given document, and the extractor unit 2 extracts keywords regarding each topic. The selector unit 3 selects key sentences from each topic passage based on the use condition of the keywords, and generates a digest using the key sentences. The output unit 4 outputs the generated digest.

Here, the hierarchical structure of topics means a hierarchical structure having two or more levels of a plurality of topic passages composing a document. This hierarchical structure, for example, corresponds to the inclusion relation between topics in which each of a plurality of long passages composing a document contains one or more short topic passages and each of the short topic passages further contains one or more shorter topic passages.

The structure detector unit 1, for example, sets up window widths having several sizes ranging from ¼ to ⅒ of the entire document to a paragraph, and measures a cohesion degree indicating the strength of lexical cohesion in each window width. Thus, both global cohesion due to words repeated at long intervals, etc. and local cohesion due to words repeated at short intervals can be obtained, and thereby the hierarchical structure of topics in from a large topic passage to a small topic passage can be detected.

The extractor unit 2, for example, evaluates whether or not a word is characteristic of a process-target topic passage comparing the use frequency of the word in the process-target topic passage with the use frequency in a longer topic passage containing the topic passage. The extractor unit extracts keywords from the process-target topic passage based on the evaluation result. In this way, since a word frequently repeated having no relation with the topic is never judged to be a keyword, keywords can be efficiently extracted.

Alternatively, the extractor unit 2, for example, extracts local keywords from a topic passage for digest generation, and extracts global keywords from a longer topic passage containing the topic passage. Then, the selector unit 3 selects key sentences from the topic passage for digest generation based on the use condition of both the local and global keywords, and generates a digest.

In this way, since when key sentences are selected from a topic passage, keywords used in a higher-level topic passage containing the topic passage are also referred to, a digest in which both sentences regarding a local topic and sentences regarding a global topic are balanced, can be generated.

For example, the structure detector unit 1, the extractor unit 2, the selector unit 3 and the output unit 4 shown in FIG. 1 correspond to a topic structure detector unit 26, a keyword extractor unit 29, a key sentence selector unit 30 and an output unit 31 shown in FIG. 26 described later, respectively.

FIG. 2 shows the basic configuration of the digest generator apparatus of the present invention. In FIG. 2, when an input document 11 is inputted as a document for digest generation, a digest generator apparatus 12 generates and outputs a digest 13.

The digest generator apparatus 12 comprises an input unit 21, a tokenizer unit 22, a machine-readable dictionary 24, a digest grading determination unit 25, a topic structure detector unit 26, a major part specifying unit 28, a keyword extractor unit 29, a sentence selector unit 30 and an output unit 31.

The input unit 21 reads the input document 11, and transfers the input document 11 to the tokenizer unit 22. The tokenizer unit 22 comprises a morphological analyzer unit 23, and analyzes the input document 11 linguistically using the morphological analyzer unit 23 and extracts content words (nouns, verbs, adjectives, adjective verbs, etc.) contained in the document 11. At this time, the morphological analyzer unit 23 converts sentences in the document 11 to a word list having part of speech information by referring to the machine-readable dictionary 24. The machine-readable dictionary 24 is a word dictionary for a morphological analysis, and describes a correspondence between the notation character string of a word and information on a part of speech and conjugation, etc.

The digest grading determination unit 25 calculates the number of topics to be extracted for a digest from both the size of the input document 11 and the desirable size of a digest, and determines the size of a topic passage as being a unit of digest generation.

The topic structure detector unit 26 comprises a topic boundary candidate section detector unit 27, and automatically detects document parts describing a common topic (topic passage) using the topic boundary candidate section detector unit 27. The topic boundary candidate section detector unit 27 as a sub-module of the topic structure detector unit 26 detects sections having a low lexical cohesion degree as candidate sections of a topic boundary. A lexical cohesion degree is an index indicating the strength of lexical cohesion in the neighborhood of each position in the input document 11, and for example, is calculated from the similarity of a vocabulary appearing in windows of a certain width set up before and after each position.

The major part specifying unit 28 removes topic passages having a low lexical cohesion degree to suppress the subsequent processes of these passages, and outputs only the major parts of the document for a digest. The keyword extractor unit 29 evaluates whether or not a word used in the topic passage detected by the topic structure detector unit 26 is characteristic of the topic, and extracts only words appearing characteristically as keywords.

The sentence selector unit 30 selects sentences containing many keywords for each topic passage, and arranges the selected sentences in the appearance order in the original document 11. Then, the sentence selector unit 30 inserts marks for indicating the existence of the unselected sentences, paragraph boundaries, etc., if necessary, and generates a digest 13. The output unit 31 outputs the generated digest 13 as the processed result.

According to the digest generator apparatus 12 shown in FIG. 2, the topic structure detector unit 26 detects a part of a document describing a common topic as a topic passage, and the keyword extractor unit 29 extracts words characteristic of each topic passage. For this reason, even in the case of a complex document which is composed of several parts of text regarding different topics, keywords can be accurately extracted. Since the sentence selector unit 30 selects key sentences with a clue of keywords characteristic of a topic passage, and generates a digest for each topic passage, an unnecessary sentence is never extracted under the influence of keywords for another topic.

When detecting topics based on a lexical cohesion degree, the topic structure detector unit 26 uses several kinds of lexical cohesion degrees, ranging from one measured in a large window of ¼ to ¹⁄₁₀ of the entire document to one measured in a small window of about paragraph size, together. In this way, based on both a global cohesion mainly due to words used at long intervals and a local cohesion due to words used at short intervals, the topic structure detector unit 26 can detect all topic passages ranging from a long topic passage to a short topic passage without fail.

Furthermore, the topic boundary candidate section detector unit 27 being the sub-module of the topic structure detector unit 26 handles the moving-average value of the lexical cohesion degrees based on each window width as both a forward cohesion force at the start point of a moving average zone and a backward cohesion force at the end point of the moving average zone, and recognizes the vicinity of a part where the forward and backward cohesion forces balance each other (cohesion force equilibrium point) as a candidate section of the topic boundary.

Small fluctuations of lexical cohesion degrees, that is, fluctuations within a narrow range compared with the size of a moving average zone (a section from which a moving average is calculated) are smoothed by taking a moving average. For this reason, most of the intervals between cohesion force equilibrium points become larger than the size of the moving average section. Since in this way the topic structure detector unit 26 can selectively detect topic passages having almost the same size as a window width (larger than the width of a moving average zone) based on the lexical cohesion degree with each window width, the hierarchical structure of topics can be accurately detected.

The keyword extractor unit 29 recognizes words judged to be significantly used in each topic passage by a statistical test method as keywords. Accordingly, words frequently used regardless of a topic are never incorrectly judged to be keywords, and thereby keywords can be efficiently extracted.

Furthermore, not only local keywords from a topic passage for digest generation but also global keywords from a longer topic passage containing the topic passage can be extracted by the keywords extractor unit 29. For this reason, even when a group of short topic passages constitutes a longer topic passage, appropriate keywords can be extracted. That is, both keywords characteristic of individual small topics (words representing sub-topics) and words characteristic of a large topic common to the small topics (words representing a main topic) can be separately extracted.

The sentence selector unit 30 selects key sentences with a clue of both words representing a main topic and words representing sub-topics, and generates a digest. Accordingly, a well-balanced digest including both a main topic and sub-topics can be generated.

Since the topic structure detector unit 26 detects topic passages having almost the same size as that determined by the digest grading determination unit 25, and both the keywords extractor unit 29 and the sentence selector unit 30 generate a digest in units of these topic passages, as a result, a well-balanced digest that includes almost the same number of topic passages, each of which is of about same size, as topics to be extracted can be extracted.

Furthermore, the major part specifying unit 28 removes sections having a low cohesion degree out of topic passages detected by the topic structure detector unit 26, to suppress the subsequent summarization processes of these sections. Accordingly, parts without detailed information, such as a simple list of names, are never extracted, and thereby a digest with substantial contents can be generated.

The digest generator apparatus 12 shown in FIG. 2, for example, can be configured by using an information processing device shown in FIG. 3 (computer). The information processing device shown in FIG. 3 comprises an output device 41, an input device 42, a CPU (central processing unit) 43, a network connection device 44, a medium driver device 45, an auxiliary storage device 46 and a memory (main storage unit) 47, which are connected with each other by a bus 48.

The memory 47, for example, comprises a ROM (Read-Only Memory), a RAM (Random Access Memory), etc., and stores programs and data used for a digest generation process. In this embodiment, the input unit 21, the tokenizer unit 22, the morphological analyzer unit 23, the digest grading determination unit 25, the topic structure detector unit 26, the topic boundary candidate section detector unit 27, the major part specifying unit 28, the keyword extractor unit 29, the sentence selector unit 30 and the output unit 31 are stored in a form of program modules. The CPU 43 runs the programs using the memory 47, and performs necessary processes.

The output device 41, for example, comprises a display monitor, a printer, etc., and is used to inquire of a user and to output a digest 13, etc. The input unit 42, for example, comprises a keyboard, a pointing device, a touch panel, etc., and is used to input user's instructions and an input document 11.

The auxiliary storage device 46, for example, comprises, a magnetic disk, an optical disk, a magneto-optical disk, etc., and stores information such as an input document 11, a digest 13, a machine-readable dictionary 24, etc. Alternatively, the programs and data can be stored in advance in this auxiliary storage device 46, which can be used by being loaded to the memory 47, as necessary.

The medium driver device 45 drives a portable storage medium 49, and accesses the stored contents. The portable storage medium 49 comprises an arbitrary computer-readable storage medium such as a memory card, a floppy disk, a CD-ROM (Compact Disk Read-Only Memory), an optical disk, a magneto-optical disk, etc. Alternatively, the programs and data can be stored in advance in this portable storage medium 49, which can be used by being loaded to the memory 47, as necessary.

The network connection device 44 communicates with an outside apparatus through an arbitrary network (line) such as a LAN (Local Area Network), etc., and performs data conversion accompanying the communication. Alternatively, the network connection device 44 can receive the programs and data from an outside apparatus, if necessary, which can be used by being loaded to the memory 47.

FIG. 4 shows computer-readable storage media for supplying the information processing device shown in FIG. 3 with the programs and data. The programs and data stored in the portable storage medium 49 and an external database 50 are loaded to the memory 47. The CPU 43 runs the programs using the data, and performs necessary processes.

Next, the operation of each module of the digest generator apparatus 12 shown in FIG. 2 is described in detail below using concrete examples. For the input document in Japanese, Chapter 4 "Activity Report of Network Access Technical Special Committee" (pp.117 to 197) of "Investigative Report on Trend of Natural Language Process System" by the Japan Electronic Industry Development Association (March 1997), is used. In the following embodiment, a digest consisting of one or two sheets of A4 size (approximately 1,500 characters) is tried to be generated from this document.

Conventionally for the size of a digest, approximately ¼ of an original document has been aimed at. It is a good ratio for editorials, newspaper articles, theses of several pages, etc., but is too large for such a long document of several teas of pages as is tried to be summarized here (81 pages). When a document is read online, the maximum number of pages capable of being displayed on a screen at one time is approximately two. Taking these conditions into consideration, the size of the digest has been determined.

Since it is not appropriate to attach the entire input document, only a list of the headings of the input document are shown in FIGS. 5 through 7 for a reference. FIG. 5, FIG. 6 and FIG. 7 show the headings in Section 4.1 and Section 4.2, Section 4.3, and Section 4.4 in the appearance order, respectively.

FIG. 8 is a flowchart showing a tokenization process by the tokenizer unit 22. The tokenizer unit 22 first executes a morphological analysis on the input document, and generates a word list having the names of parts of speech (step S11). Then, the tokenizer unit 22 detects content words (nouns, verbs, adjectives and adjective verbs) with a clue of the parts of speech, attaches a mark in the part of the document corresponding to the content word (step S12), and the process is terminated. FIG. 9 shows the beginning part of the input document, and FIG. 10 shows the corresponding outputs from the tokenizer unit 22.

In step S11 shown in FIG. 8, the morphological analyzer unit 23 performs a morphological analysis process as shown in FIG. 11. The morphological analyzer unit 23 first clears the word list (step S21), tries to extract a sentence having the clue of a period, etc. from the beginning of the document (step S22), and judges whether or not a sentence is extracted (step S23).

After a sentence is extracted, word candidates used in the sentence are then extracted by referring to the machine-readable dictionary 24 (step S24). In the case of Japanese, as shown in FIG. 9, since boundaries between words are not formally clarified, all words corresponding to the partial character string contained in the sentence are extracted as candidates. For example, when a sentence "東京都は大都市だ。" is extracted, as shown in FIG. 12, all partial character strings appearing in this sentence become word candidates.

On the other hand, in the case of English, since boundaries between words are explicitly indicated by a space, the main process is to calculate candidates for parts of speech for words corresponding to character strings separated by a space. For example, when a sentence "Tokyo is the Japanese capital." is extracted, as shown in FIG. 13, the basic form and part of speech of the five words contained by this sentence are calculated.

Then, the morphological analyzer unit 23 selects an appropriate series of words from the viewpoint of adjacent probability of parts of speech (step S25), attaches information of the part of speech and the used position to the selected series of words, and adds the words to the word list in the appearance order (step S26). Then, a subsequent sentence is tried to be extracted (step S27), and the processes in steps S23 and after are repeated. Then, when no sentence can be extracted in step S23, the process is terminated.

In the tokenization result shown in FIG. 10, words put in brackets [ ] are content words detected by the morphological analyzer unit 23. When the content word is a conjugation word (verb or adjective), parts before and after a slash in the brackets [ ] indicate the stem and the conjugated ending in a base-form, respectively. Although these are items of information used to distinguish words in a later process, both the part of speech and the conjugation can also be attached instead of the information. In short, for example, arbitrary information can be used, only if it is identifying information for distinguishing a pair of words which cannot be distinguished only by the stem, such as "い/る" and "い/く".

In step S25, for a method of evaluating the propriety of a series of words, a variety of morphological analysis methods are known, of which any can be used. For example, a method of evaluating the propriety of a series of words using use probability estimated by training data is reported, (Eugene Charniak, "Hidden Markov Models and Two applications", in Statistical Language Learning, Chapter 3, pp.37 to 73, The MIT Press, 1993., Masaaki Nagata, "A Stochastic Japanese Morphological Analyzer Using a Forward-DP backward-A*N-best Search Algorithm", in the Proceedings of COLING '94, pp.201 to 207, 1994, and Masaaki Nagata, "A Stochastic Japanese Morphological Analysis System Using a Forward-DP Backward-A*Algorithm" in Information Study Report NL-101-10, the Information Processing Association, May 1994).

Although in the example shown in FIG. 10, the tokenizer unit 22 extracts all content words, the target to be extracted can also be restricted to only a noun. When an English document is processed as a target, the words can also be extracted from all words separated with a space, by removing a word used anywhere regardless of a topic (functional words such as articles, prepositions, etc. and words used with a particularly high frequency), instead of executing a morphological analysis process. Such a process can be implemented if a stop word list for storing functional words and words used with a particularly high frequency is used instead of the machine-readable dictionary 24.

FIG. 14 is a flowchart showing a digest grading determination process performed by the digest grading determination unit 25. The digest grading determination unit 25 first receives four parameters of a desirable size of digest $S_a$, a desirable extraction volume $S_t$, a minimum window width $w_{min}$, and a window width ratio r from a user (step S31), and calculates a rough number of topics to be extracted $N_t$ by dividing $S_a$ by $S_t$ (step S32).

In FIG. 14, the suffix of a symbol "$w_{min}$" is described with an underline like "w_min" taking ease of viewing the diagram into consideration. The same inscription method is also applied to other suffices.

Then, the digest grading determination unit 25 calculates the total number of words $W_d$ in an input document (step S33). Then, after calculating the rough size of topics to be extracted by dividing $W_d$ by $N_t$, the digest grading determination unit 25 selects the maximum term not exceeding $w_t$ from a geometrical progression with an initial term of $w_{min}$ and a common ratio of r, and designates the maximum term as a basic window width $w_1$ (step S34), and the process is terminated. In this case, $w_1$ is calculated as follows.

$$w_1 = w_{min} * (r ** int(\log_r((W_d/N_t)/w_{min}))) \quad (4)$$

where ** indicates to raise r to the int( )-th power, and int ( ) indicates making of an integer by omitting figures below the decimal point in a parenthesis. Each term of the geometrical progression is used as a window width for a process in each level when detecting the hierarchical structure of topics in a later process.

$w_{min}$ can also be defined by an expression of $w_1*(1/r)**n$ (n is an integer) using the value of int $(W_d/N_t)$ as $w_1$. Furthermore, the window width can also be gradually reduced by an arbitrary other method without using a geometrical progression. However, as described later, it is known that a method of fixing $w_{min}$ and using a geometrical progression with a common ratio r of a power of 2 is desirable from the viewpoint of calculation efficiency.

For example, if it is assumed that $S_a=1,500$ (characters), $S_t=150$ (characters), $w_{min}=40$ (words), r=2 and $W_d=17816$ (words), the number of topics to be extracted $N_t$ becomes 10 (1,500 characters/150 characters). In this case, since the rough size of a topic passage wt becomes approximately 1,800 words (17816 words/10), 1,280 words $(40*2^5)$ not exceeding the 1,800 words are adopted for a basic window width $w_1$.

An empirical knowledge that it is necessary to extract approximately three or more sentences (at least one heading sentence plus two or three sentences: 120 to 150 words) for each topic in order to make the content of a topic understandable, has been obtained by the digest generation experiments on newspapers, etc. The above value of the extraction volume $S_t$ is determined based on such empirical knowledge. The value of the window width $w_{min}$ is also determined based on the average number of words in newspapers, reports, etc.

Next, the process of the topic structure detector unit 26 is described below. In this embodiment, topic passages are detected by extending the Hearst method described earlier. Therefore, the lexical cohesion degree (hereinafter called only "cohesion degree") of each position in a document is measured, and a part having a low cohesion degree is recognized as a topic boundary. The major differences between this embodiment and the Hearst method are as follows:

(1) Difference in a window width for measuring cohesion degree

In this embodiment, several kinds of windows with different widths ranging from a window bigger than that used in the Hearst method (approximately ¼ to ¹/₁₀ of the total word number of an entire input document: 1,280 words in the above example) to almost the same size as a paragraph (several tens of words to approximately 100 words: 40 words in the above example) are used for a window for the measurement of the cohesion degree.

(2) Differences in both the detection procedure of topic boundaries and a topic boundary as a detection target In this embodiment, unlike the Hearst method, a position itself where the cohesion degrees (or similarity degree) measured in different windows becomes minimal, is not always recognized as a topic boundary, but only the boundaries that separate a passage with almost the same size as the window width are recognized as a topic boundary using a moving average of the cohesion degrees.

These differences derive from the fact that in the present invention the hierarchical structure of topics in a document is detected. Here, the hierarchical structure of topics, for example, means a structure having an inclusion relation of topics in which several clauses of minor related topics are contained by a chapter handling a certain topic.

The hierarchical topic structure, where a plurality of minor topic passages constitute a major topic passage, is detected to extract following two kinds of keywords separately: keywords of a minor topic that is characteristic of each minor topic passage and keywords of the major topic that is characteristic of the major topic passage. Then, a well-balanced digest that includes the major topic and minor topics can be generated based on these two kinds of keywords.

In conventional researches it has not been verified whether or not a fluctuation of similarity degree measured using a window of several thousands of words width corresponds to a change in a topic flow of actual text, that is, if the similarity degree can be used to detect a topic passage of actual text.

The reason why this has not been researched is because it is estimated that there was a preconception that if a window of several thousands of words width were used in such a simple measuring method, the measurement result would be only noise and show only meaningless fluctuations.

For example, in Hearst's document described earlier, window width is only briefly mentioned in the description of the implementation of her algorithm, while a possibility that more precise boundary detection is implemented with more sophisticated information such as thesaurus (a dictionary of synonyms), etc., is suggested as a conclusion with various related studies. Therefore, there is no consideration about what will happen with a significantly large window as in this embodiment.

There is a high possibility that Hearst thought the window width of about paragraph size, which seems to have been finely adjusted for each experiment target, was the optimal value in this method, and this method was restricted only to the detection of topic passages having the size of several paragraphs regarding sub-topics in a document. It can also be considered that the aim of Hearst was restricted to the detection of passages having the size of several paragraphs.

For this reason, an experiment for detecting the topic boundaries of the above input document was carried out by the Hearst method in order to confirm whether or not a similarity degree measured using a window width of five to ten times as big as that used in Hearst's document shows a meaningful fluctuation. As a result of plotting similarity degrees obtained by this experiment as cohesion degrees, distributions of cohesion degrees shown in FIGS. 15 and 16 have been obtained.

In these diagrams the "position in a document" on the horizontal axis indicates the total number of content words used between the beginning of the document and each position. Dotted lines indicate the start position of each section of the input document, and the longer a dotted line is, the larger the section it corresponds to. Line charts plotted with the symbol ◇ indicate a series of cohesion degrees obtained in the cosine measure of equation (1), bar charts marked with a symbol * indicate the depth score of equation (2) at the minimal point of the cohesion degree, and a horizontal line indicates the threshold of equation (3).

In the calculation of cohesion degrees a window having a width of 1,280 words and a window having a width of 640 words are used for FIG. 15 and FIG. 16, respectively. A series of cohesion degrees are calculated and plotted at interval widths of ⅛ of each window width (160 or 80 words).

When FIGS. 15 and 16 are observed, depth scores exceeding the threshold are plotted in the neighborhood of the start position of each section indicated by a dotted line, and it is found that cohesion degrees measured using a window width at the level of several thousands of words also show meaningful fluctuations. In this way, if lexical cohesion degrees are measured using a large window width, topic boundaries at the level of a chapter/section can be detected. When FIG. 15 and FIG. 16 are compared, it is also found that a break of a major topic can be detected by using cohesion degrees based on a large window width, and a break of a minor topic can be detected by using cohesion degrees based on a small window width.

However, according to this experiment, it is pointed out that the Hearst method has the following problems.

(1) The correspondence between a topic boundary detected by using a large window width and a topic boundary detected by using a small window width is not clear.

(2) The depth score is not stable since it fluctuates greatly when a minimal value appears in the middle of a cohesion degree increases or decreases monotonously.

These problems are shown, for example, in a process result corresponding to a part ranging from reference materials at the end of Section 4.3 to Section 4.4.1 (1) of the input document. In FIG. 15, this part is one bottom of the cohesion degree on a global survey. This tendency is also seen in FIG. 16.

However, in FIG. 16, a small peak with a narrow width P1 in Section 4.3 (Reference) and a bottom p2 between the middle of Section 4.4.1 (2) and Section 4.4.1 (3) are clearly shown. For this reason, topic boundaries detected using a window with a width of 640 words are much different from topic boundaries detected using a window with a width of 1,280 words, and the difference exceeds the interval width shown in FIG. 15.

When the hierarchical structure of topics is detected, the start position of Section 4.4 should be recognized as a break of a major topic, and the start position of Section 4.3 (Reference), etc. should be recognized as a break of a minor topic. However, since the depth score using the Hearst method are not stable, the depth score cannot be made an index for a topic size corresponding to a topic boundary.

Since the depth scores are not stable, a topic boundary detected by the cohesion degrees measured using a large window width is not always detected by the cohesion degrees measured using a small window width. Furthermore, not only a break of a major topic but also a break of a minor topic are recognized as a topic boundary by the cohesion degrees measured by using a large window width. Thus, the Hearst method cannot be used for a process of detecting the break of a major topic and the break of a minor topic separately.

The topic boundary candidate section detector unit 27 of this embodiment estimates the section of a topic boundary utilizing a moving average method in order to solve these problems. In this case, a value obtained by moving-averaging cohesion degrees is used as both a forward cohesion force at the start point of a moving average zone and a backward cohesion force at the end point of the moving average zone, and the vicinity of the equilibrium point of the forward cohesion force and the backward cohesion force is recognized as a candidate section of a topic boundary.

By using a moving average, small fluctuations in cohesion degrees, that is, fluctuations in the short range compared with the size of a moving average zone, are smoothed. For this reason, most of intervals between the equilibrium points of the cohesion forces become greater than the size of the moving average zone.

Thus, the following detection procedures of the hierarchical structure of topics are implemented in the topic structure detector unit 26.

(1) Selectively detects only a topic boundary corresponding to a major topic using a large window width.

(2) Calculates a topic boundary candidate section where a topic boundary probably exists for all boundaries detected by a window of any width, and identifies a topic boundary by comparing the topic boundary candidate sections of a large window and of a small window.

FIG. 17 is a flowchart showing the topic structure detection process of the topic structure detector unit 26. The topic structure detector unit 26 first receives three parameters of a basic window width $w_1$, a minimum window width $w_{min}$, and a window width ratio r from the digest grading determination unit 25 (step S41), and calculates a set of window widths, W, for measuring the cohesion degrees (step S42). The set of window widths, W, is calculated from a geometrical progression with an initial term $w_0$ of $w_1*r$ and a common ratio of 1/r by selecting terms having a size equal to or greater than $w_{min}$ from the geometrical progression. In this case, a maximum window width of W becomes $w_0=w_1*r$.

As described earlier, the set of window widths, W, can also be calculated by methods other than this. However, it is desirable to fix $w_{min}$ and to use a power of 2 for r from the viewpoint of calculation efficiency.

If $w_1$=1,280 (words), $w_{min}$=40 (words) and a window width ratio r=2, a maximum window width $w_0$ becomes 2,560 words (1,280*2).

Then, the topic structure detector unit 26 calculates the cohesion degree of each position in a document, in which all content words are marked up as shown in FIG. 10, for each window width in W, and stores the cohesion degrees as a cohesion degree series (step S43).

Here, first, the topic structure detector unit 26 compares a vocabulary (content words here) used in two windows set up before and after each position (reference point) of the document, calculates a value which becomes larger, the more common vocabulary there are, and designates the value as the cohesion degree of the position. Then, the topic structure detector unit 26 repeats the calculation of cohesion degrees while sliding the positions of the windows from the beginning of the document toward the end at certain interval widths tic, and stores the calculated cohesion degrees as a series going from the beginning of the document toward the end.

Although any value can be used for the interval width tic if the value is smaller than the window width, it is efficient to set the value proportional to the window width, for example, ⅛ of the window width. This tic value can be designated by a user.

FIG. 18 shows the two windows set up as the result of the tokenization process shown in FIG. 10. Here, both left and right windows with a window width of 40 words are set up before and after the reference point between the 40th content word "サービス/する" and the 41st content word "内容" The cohesion degree at this position is calculated as follows.

First, as shown in FIG. 19, the total number of different content words used in both the left window W1 and the right window W2 (number of used vocabulary in the windows) is counted. In FIG. 18, the number of used vocabulary in W1 and W2 are both 29 words. Then, the total number of different content words used in both the left window W1 and the right window W2 (the number of common vocabulary) is counted. In FIG. 18, six underlined words in W1 and W2 are the common vocabulary.

Lastly, the arithmetical mean of a forward cohesion degree, which is a ratio of the number of common vocabulary to the number of used vocabulary of left window W1, and a backward cohesion degree, which is a ratio of the number of common vocabulary to the number of used vocabulary of a right window W2, is calculated as a cohesion degree at the reference point. Here, the following results are obtained.

Forward cohesion degree=number of common vocabulary/number of used vocabulary in left window=6/29=0.207 (5)

Backward cohesion degree=number of common vocabulary/number of used vocabulary in right window=6/29=0.207 (6)

Cohesion degree=(forward cohesion degree+backward cohesion degree)/2=0.207 (7)

Each cohesion degree obtained by equations (5), (6) and (7) has the following meaning. If a word contained in a certain window is also used in a part on the right side (direction toward the end of a document), the greater is the number of the words, the closer connection is considered to exist between the part in the window and the part on the right side. This index is the forward cohesion degree of equation (5). In the same way, the backward cohesion degree of equation (6) is an index for indicating the closeness of the connection between a certain window and a part on the left side (direction toward the beginning of a document). A mean of these two kinds of indexes for the closeness of the connection at the reference point is the cohesion degree of equation (7).

For the cohesion degree, any appropriate index for indicating the strength of a lexical cohesion in the neighborhood of each position in a document can also be used instead of the value of equation (7). For example, like in the Hearst method, a cosine measure indicating the similarity of a vocabulary in the left and right windows can also be used for the cohesion degree.

The number of words used more than a certain number of times in the neighborhood of each position of a document can also be used for the cohesion degree without dividing the neighborhood into two windows. Actually, an example in which a value corresponding to the use ratio of words related in meaning such as synonyms, related words, etc. (for example, "waiter" and "restaurant") in the neighborhood of each position is used for the cohesion degree is reported (Hideki Kozima and Teiji Furugori, "Text Segmentation Based on Lexical Cohesion", the Institute of Electronics, Information and Communication Engineers Technical Report NLC93-7, May 1993).

However, the calculation of the cohesion degree by Equation (7) is simpler and more easily understandable. When it is necessary to distinguish the cohesion degree calculated by equation (7) from other cohesion degrees in the following description, the cohesion degree calculated by equation (7) is called a "cohesion degree calculated by a common vocabulary ratio".

FIG. 20 shows a series of cohesion degrees stored in step S43. Here, ¼ of a window width w is used for the interval width tic, and document areas a1 to all are areas with a width corresponding to the interval width tic. c1 indicates the cohesion degree of a window width w calculated using a boundary between a4 and a5 in the document as the reference point. That is, c1 is a cohesion degree calculated using a part of document areas a1 to a4 and a part of a5 to a8 as the range of left and right windows, respectively.

c2 indicates a cohesion degree calculated after the window is slid rightward by a fixed width tic, and is the cohesion degree of a window width w with a boundary between a5 and a6 as the reference point. In this way, each of c1, c2, c3, c4, . . . calculated after the window is repeatedly slid by a fixed width tic is called the cohesion degree series of the window width w going from the beginning of a document toward the end.

FIG. 21 is a graph on which the cohesion degree series of a window width of 640 words are plotted with the total number of content words used between the beginning of a document and each reference point on the horizontal axis. For example, in the case of cohesion degree c2 shown in FIG. 20, the total number of content words in areas a1 to a5 becomes the position of a reference point in the document. Here, cohesion degrees are calculated from the beginning of the document toward the end using ⅛ of a window width of 640 words (80 words) as an interval width tic.

The reason why it is desirable to fix $w_{min}$ and to use a power of 2 for a window width ratio r from the viewpoint of calculation efficiency is described below.

The reason why it is desirable to use a power of 2 for a window width ratio r is as follows. In the calculation of the cohesion degree of each window width it is necessary to check a vocabulary used in three areas, which include the two areas in two windows set up before and after each position in a document and one area where the two areas in the two windows are combined. For example, if a cohesion degree calculated by a common vocabulary ratio is used, it is necessary to total the number of different words used in these three kinds of areas, while if a cohesion degree calculated by a cosine measure is used, it is necessary to total the use frequency of a vocabulary used in these three kinds of areas.

In FIG. 19, although the number of a vocabulary in each of left and right windows, and the number of vocabulary common to both windows are calculated, the number of a vocabulary in the combined area of these two windows coincides with the result of subtracting the number of common vocabulary from the sum of the number of a vocabulary in the left window and the number of a vocabulary in the right window. Accordingly, the total in FIG. 19 is the same value as that in a process of totaling a vocabulary used in the three kinds of areas described above, and the calculation volume is also almost the same.

Here, if r is set to a power of 2, the number of a vocabulary (or use frequency) totaled for the calculation of the cohesion degrees of small window widths can also be used for the calculation of the cohesion degrees of large window widths. For example, if 2 is used for r, the number of a vocabulary (or use frequency) totaled in the combined area of the windows before and after in the calculation of the cohesion degree of a window width $w_1$ can also be used for the number of a vocabulary (or use frequency) in either of windows in the calculation of the cohesion degree of a window width $w_0$.

The reason why it is desirable to fix $w_{min}$ is as follows. If $w_{min}$ is fixed, a power of 2 is used for a window width ratio r, and the interval width tic of the cohesion degree calculation is set to 1/n of each window width (n is an integer), a document can be divided into $w_{min}/n$ areas and converted to a form convenient for the calculation of a cohesion degree series when the digest grading determination unit 25 scans through the entire document to count $w_d$.

For example, each used vocabulary can be converted (digitized) to a vocabulary number for distinguishing different vocabulary by using a hash table, etc., and both the vocabulary number of the used vocabulary and the use frequency can be recorded corresponding to each of the $w_{min}/n$ areas. By doing this, since there is no need for an access to the original document at least in the calculation of the cohesion degree series, the calculation efficiency is improved.

A general-purpose OS (Operating System) usually has a function to easily obtain the physical size (number of bytes)

of the original document without accessing the content of the original document.

In such an OS the rough size (for example, upper limit) of a maximum window width can be estimated from the physical size of the original document in the first place, and the calculation of a cohesion degree series can be simultaneously carried out when the entire document is scanned through to count $W_d$. According to this method, the frequency of accesses to the original document can be reduced even in an environment where the usable capacity of a primary memory is small. Besides, a variety of improvements in the calculation become possible.

Then, the topic structure detector unit 26 analyzes the cohesion degree series of each window width using the topic boundary candidate section detector unit 27 being a sub-module, and recognizes a section having a low cohesion degree as a topic boundary candidate section (step S44).

Although, as shown in FIG. 21, a minimal point in a cohesion degree series often corresponds to an actual topic boundary (boundary of a section indicated by a dotted line), all minimal points do not always correspond to the topic boundaries. The topic boundary candidate section detector unit 27 detects only a boundary that separates a topic passage having almost the same size as the window width of each cohesion degree series with a clue of the minimal points of a cohesion degree series, and outputs topic boundary candidate sections where these boundaries possibly exist by each window width. In this embodiment, this process is implemented by a moving average method.

Then, the topic structure detector unit 26 unifies topic boundary candidate sections calculated based on the cohesion degree series of different window widths, and separately outputs boundaries of a major topic obtained from the cohesion degree series of large window widths and boundaries of minor topics obtained only from the cohesion degree series of small window widths (step S45). Thus, the topic structure detection process is terminated.

Here, a final topic boundary to be outputted is detected by using the topic boundary candidate section of the smallest window width, that is, the minimum window width $w_{min}$, of the unified topic boundary candidate sections. The reason why the final topic boundary is determined based on the topic boundary candidate section of the minimum window width is because the cohesion degree series of a large window width is insensitive to the shift of a window position, and if the final topic boundary is determined by using only the cohesion degree series of large window widths, a sufficiently accurate boundary position cannot be obtained.

Next, the topic boundary candidate section detection process in step S44 shown in FIG. 17 is described with reference to FIGS. 20 and 21. A moving average method used here is widely used to catch a more general tendency eliminating fine fluctuations in a time series analysis being the statistical analysis of a stock price fluctuation, etc. In this embodiment, the moving average method is used not only to neglect the fine fluctuations of the moving average values of the cohesion degree series, but is also used as a direct clue to detect topic boundary candidate sections (sections having a low cohesion degree) by considering the moving average value of the cohesion degree series as both the forward cohesion force at the start point of a moving average zone and the backward cohesion force at the end point of the moving average zone.

As described earlier, FIG. 20 shows a relation between cohesion degree series $c1$ to $c4$ and document areas $a1$ to $a11$. The moving average value of a cohesion degree series is a value obtained by arithmetically averaging n consecutive values in a cohesion degree series, such as $(c1+c2)/2$ (moving average of two terms), $(c1+c2+c3)/3$ (moving average of three terms), $(c1+c2+c3+c4)/4$ (moving average of four terms), etc.

FIG. 22 shows a relation between an example of the moving average of the cohesion degree series shown in FIG. 20 and a document area. Here, for an example of the moving average, both the moving averages of two, three, and four terms shown in FIG. 20, and the number of times of use of each document area in the cohesion degree calculation of each moving average, are shown.

Underlined values out of these indicate that the corresponding document area is used in all the cohesion degree calculations of the moving average.

For example, "1" in the upper left corner indicates that a document area $a1$ was once handled as a part of a left window in the moving average calculation of four terms of $c1$ to $c4$. A value "2" on the right hand side of it indicates that a document area $a2$ is twice handled as a part of the left window in the moving average calculation of four terms of $c1$ to $c4$. The same also applies to other number of times of use.

Since a cohesion degree is an index for indicating the strength of a relation between parts before and after a boundary, it is considered that a moving average value calculated using a cohesion degree $c1$ obtained with an area $a1$ contained in a left window is also an index for indicating whether or not the area $a1$ is related rightward.

In other words, a moving average value is an index for the strength in which the area in the left window part of moving-averaged cohesion degrees ($a1$ to $a7$ against the four-term average of $c1$ to $c4$) is pulled rightward (forward cohesion force). On the other hand, conversely, it is also an index for the strength in which the area in the right window part of moving-averaged cohesion degrees ($a5$ to all against the four-term average of $c1$ to $c4$) is pulled leftward (backward cohesion force).

Here, when a relation between the index of cohesion force and each document area is considered, the index of cohesion force is more related to an area more frequently used in a window in the calculation of the cohesion degree. Generally speaking, it is considered that the more closely a target word is repeated, the stronger the lexical cohesion is. Therefore, it is also considered that the nearer the reference point of moving-averaged cohesion degrees (boundary position of left and right windows) an area is located, the stronger the relation between the moving average value and the area become.

For example, in the moving average of four terms shown in FIG. 22 the reference points of a cohesion degree are four of a boundary between $a4$ and $a5$, a boundary between $a5$ and $a6$, a boundary between $a6$ and $a7$ and a boundary between $a7$ and $a8$. In this case, it is found that $a4$ is most frequently used in the left window, and is the nearest to these reference points. It is also found that $a8$ is most frequently used in the right window, and is the nearest to these reference points. Accordingly, areas having the strongest relation with the moving average value are $a4$ and $a8$ for the left and right windows, respectively.

In the same way, $a4$ and $a7$ are selected for areas having the strongest relation with the moving average of three terms, of the left and right windows, respectively, and $a4$ and $a6$ are selected for areas having the strongest relation with the moving average of two terms, of the left and right windows, respectively. The number of times of use of these areas are marked with slash lines in FIG. 22.

Based on the consideration described above, the topic boundary candidate section detector unit 27 handles the moving average value of a cohesion degree as an index for both a forward cohesion force at the first reference point in a moving-averaged area and a backward cohesion force at the last reference point in the moving-averaged area. For example, the moving average value of four terms of c1 to c4 becomes both a forward cohesion force on a boundary between a4 and a5, and a backward cohesion force on a boundary between a7 and a8.

FIG. 23 is a flowchart showing the topic boundary candidate section detection process by the topic boundary candidate section detector unit 27. The topic boundary candidate section detector unit 27 first receives the interval width tic of a cohesion degree series, and then receives the number of terms n of a moving average from a user (step S51).

For example, the rough size of the interval width is ⅛ to ⅒ of a window width w, and the rough size of the number of terms n is a half of w/tic (4 to 5). The distance between the first and the last reference point of an area to be taken a moving-average of is calculated by an expression (n−1)*tic, which is designated as the width d (words) of the moving average.

Then, the moving average of cohesion degrees is calculated within the range from p to p+d for each position p of the document, and is stored in the forward cohesion force in a position p (step S52). This value is simultaneously stored as the backward cohesion force in the end position p+d of the moving-averaged range.

Then, a difference between the forward and backward cohesion forces at each position (forward cohesion force—backward cohesion force) is calculated from the beginning toward the end of the document based on the stored forward cohesion force, and a point where the difference turns from negative to positive is stored as a negative cohesion force equilibrium point (step S53).

A negative cohesion force equilibrium point means a point in the left part of which a backward cohesion force is dominant and in the right part of which forward cohesion force is dominant. Accordingly, the left and right parts of the point are considered to have a weak relation in meaning, and thereby the negative cohesion force equilibrium point becomes a candidate position of a topic boundary.

Then, a position mp where the forward cohesion force becomes a minimum within the range of d words immediately before the detected cohesion force equilibrium point is calculated, a section [mp, mp+d] is detected to be a topic boundary candidate section (step S53) and the process is terminated.

Here, the meaning of the detection of a topic boundary candidate section based on the difference between forward and backward cohesion forces is described with reference to FIG. 24. FIG. 24 shows the distribution of cohesion degrees, and forward and backward cohesion forces measured using a window with a 320-word width in the neighborhood of the position of 5,000 words (4,600 to 5,400 words) shown in FIG. 21. For an interval width tic ⅛ of a window width is used.

In FIG. 24, line charts plotted with a mark ◇, a mark ☐ and a mark x, indicate series of cohesion degrees C., forward cohesion force FC and backward cohesion force BC, respectively. The area shown by a doubled square for indicating a topic boundary candidate section and a cohesion force equilibrium point is described later.

bp1, bp2 and bp3 indicated by dotted lines indicate three points where the difference between forward and backward cohesion force becomes 0 (cohesion force equilibrium points). On the left side of the first point bp1 backward cohesion force is dominant over forward cohesion force, and in the range from the right side of the first point bp1 to the next point bp2 the forward cohesion force is dominant over the backward cohesion force. In the range from the right side of the next point bp2 to the last point bp3, the backward cohesion force is dominant over the forward cohesion force, and on the right side of the last point bp3 the forward cohesion force is dominant over the backward cohesion force.

Therefore, bp1 and bp3 are negative cohesion force equilibrium points-where the difference between the forward and backward cohesion force turns from negative to positive, and bp2 is a positive cohesion force equilibrium point where the difference turns from positive to negative.

It is found from these changes of cohesion force that the left side area of the first point bp1 has a rather strong cohesion with either of parts on the left side of the first point bp1, both the side areas of the middle point bp2 have a strong cohesion toward bp2, and the right side area of the last point bp3 has a rather strong cohesion with either of parts on the right side of the last point bp3. Actually, cohesion degrees plotted with both forward and backward cohesion forces becomes a minimum in the neighborhood of both bp1 and bp3, and becomes a maximum in the neighborhood of bp2. In this way, the change of forward and backward cohesion force and the change of cohesion degrees have a close relation with each other.

For example, a part P3 encircled with lines in the neighborhood of a cohesion force equilibrium point bp3 shown in FIG. 24 is one of parts of the minimal cohesion degree. Thus, the moving average value of this part P3 (four-item average) usually becomes a minimum as indicated by cohesion forces at both P4 and P5. However, when there are fine fluctuations in the range narrower than the area to be moving-averaged, the moving average value (cohesion forces) may not become a minimum due to the smoothing operation of a moving average.

Since forward cohesion force is an index for recording the moving average value in the start position of an area to be moving-averaged, the minimal position of the forward cohesion force is in the left of the minimal position of a cohesion degree. For the same reason, the minimal position of a backward cohesion force is in the right of the minimal position of a cohesion degree. Thus, if the fluctuations of the cohesion degree is sufficiently large, a cohesion force equilibrium point appears in an area where a moving average is calculated.

It is guaranteed as follows that the minimal point of forward cohesion force is within the range of d words immediately before a negative cohesion force equilibrium point. First, if forward and backward cohesion forces at a certain point p are FC (p) and BC (p), respectively, the following equation holds from the definition of the cohesion force.

$$FC(p-d)=BC(p) \quad (8)$$

Since in an equilibrium point bp3 forward and backward cohesion forces are equal, the following equation holds.

$$FC(bp3-d)(=BC(bp3))=FC(bp3) \quad (9)$$

Accordingly, if the forward cohesion force at a point immediately before an equilibrium point bp3 is less than the value at bp3, a minimal value of the forward cohesion force exists in the range from bp3−d to bp3, that is, within the range of d words toward the left of bp3.

If the forward cohesion force at a point immediately before an equilibrium point bp3 is not less than the value at bp3, on the left side of bp3 the following inequation holds.

$$FC(bp3-d-1) \equiv BC(bp3-1) \quad (10)$$
$$> FC(bp3-1)$$
$$\geq FC(bp3)$$

Furthermore, on the right side of bp3 the following inequation holds.

$$FC(bp3) < FC(bp3+1) \quad (11)$$

or $$FC(bp3) \geq FC(bp3+1) \quad (12)$$

When inequation (11) holds, the minimal value of forward cohesion force exists within the range from bp3–d to bp3 according to inequations (10) and (11). When inequation (12) holds, the following inequation holds.

$$FC(bp3-d+1) \equiv BC(bp3+1) \quad (13)$$
$$< FC(bp3+1)$$
$$\leq FC(bp3)$$

Accordingly, the minimal value of forward cohesion force exists within the range from bp3–d to bp3 according to inequations (10) and (13).

FIG. 25 is a flowchart showing the topic boundary detection process performed in step S45 shown in FIG. 17. The topic structure detector unit 26 first sorts and collects detected topic boundary candidate sections by way of both the window width of a cohesion degree series used to detect them and the used position in a document of the equilibrium point in the topic boundary candidate section, and generates a series B (i) [p] of topic boundary candidate section data (step S61).

Here, the control variable i is a series number for indicating that the data are detected by a cohesion degree series having a window width $w_i$, and the control variable p is a data number for indicating each topic boundary candidate section in the series. Actually, i and p take values such as 0, 1, 2, . . . in the descending order of the window width and values such as 1, 2, . . . in the appearance order of cohesion force equilibrium point, respectively. Each of data B (i) [p] includes the following element data.

B (i) [p]. level: A level of a topic boundary. The initial value is i.

B (i) [p]. range: A topic boundary candidate section. A set of (start position, end position).

B (i) [p].bp: cohesion force equilibrium point. A set of (start position, end position).

Here, although a cohesion force equilibrium point is theoretically a point, the cohesion force equilibrium point is indicated as a small section with points having negative and positive differences between forward and backward cohesion forces as start and end positions, respectively, since a point where the sign of the difference between forward and backward cohesion forces turn over is recognized as the equilibrium point, as described earlier. The width of this section usually matches the interval width tic used to detect the topic boundary candidate section.

For the B (i) [p].bp the following position data can also be used instead of the set of (start position, end position). In this case, the values of (forward cohesion force–backward cohesion force) in the start position lp and end position rp of a cohesion force equilibrium point are assumed to be DC (lp) and DC (rp), respectively. Then, a point bp where the difference between forward and backward cohesion forces becomes 0 are calculated by interpolation according to the following equation, and is assumed to be B (i) [p]. bp.

$$bp=(DC(rp)*lp-DC(lp)*rp)/(DC(rp)-DC(lp)) \quad (14)$$

Then, the topic structure detector unit 26 determines the range L of levels of topic boundaries to be outputted (step S62). When the topic boundaries to be outputted corresponds to topic candidate sections detected by three kinds of window widths, that is, a basic window width $w_1$, a window width a size larger than the basic window width (maximum window width) $w_0$ and a window width a size smaller than the basic window width $w_2$, L={0, 1, 2}.

The reason why not only topic boundaries detected by the basic window width $w_1$, but also topic boundaries detected by window widths $w_0$ and $w_2$ are output is because these topic boundaries are used when selecting words characteristic of the topic in a following keyword extracting process. When a window width ratio r and a basic window width are 2 and 1,280 words, respectively, topic boundaries detected by three kinds of window widths $w_0$=2,560 (words), $w_1$=1, 280 (words) and $w_2$=640 (words) become targets to be outputted.

Then, the topic structure detector unit 26 unifies topic boundary candidate section data based on different window widths. Here, the data B (i) [p] belonging to a series are collectively described as B (i). Further using the following notation the process is described below.

$w_i$: Window width corresponding to a series number i of B (i)

$d_i$: Width of a topic boundary candidate section (width of moving average) corresponding to B (i)

ie: Series number corresponding to minimum window width $w_{min}$

|B (i)|: Maximum value of data number p in B (i)

First, the series number i for indicating a target is initialized to 0 (step S63). Thus, each B(i) [p] in a series of topic boundary candidate section based on the maximum window width $w_0$ is marked as an output target. Then, data other than the output target out of data B (i) [p] included in a process target series B (i) are eliminated (step S64). That is, only data B (i) [p] with B (i) [p].level $\epsilon$ L are left and the other data are eliminated from B (i).

Then, the unification process with B (i+1) as a unification target series is performed while incrementally increasing i, as long as i+1$\leq$ie. In this unification process, data B (i+1) [q] in the unification target series having the same neighborhood as each topic boundary candidate section data B (i) [p] (p=1, . . . , |B (i)|) out of the process target series as a boundary candidate are detected and both the data are unified.

Although it is also possible to terminate this process on the way, the accuracy of the boundary position deteriorates, if this process is terminated in a series corresponding to a large window width. Since such a volume of calculation is not needed in this process, usually the process is repeated until a series corresponding to the minimum window width is used.

The detailed procedures are as follows. First, i+1 and ie are compared (step S65). If i+1$\leq$ie, 1 is assigned to p (step S66), and p and |B (i)| are compared (step S67). If p$\leq$|B (i)|, the unification process shown in FIG. 26 is performed (step S68), p=p+1 is designated (step S69), and the processes in steps S67 and after are repeated. Then, if in step S67 p exceeds |B (i)|, i=i+1 is designated (step S70), and the processes in steps S64 and after are repeated.

Then, if in step S65 i+1 exceeds ie, the unification process is terminated. Here, a position mp where the cohesion degree based on a window width $w_{ie}$ becomes minimal in the section of B (ie) [p]. range is calculated for each of data B (ie) [p] of a series B (ie), and the position mp is outputted with which B (ie) [p]. level are related (step S71). Thus, the topic boundary detection process is terminated.

Next, the unification process shown in FIG. 26 is described below. The topic structure detector unit 26 first selects data in which B (i+1) [q]. bp∩B (i) [p]. range≠φ and B (i+1) [q].bp is closest to B (i) [p]. bp out of data B (i+1) [q] (q=1, ..., |B (i+1)|) in a unification target series as unification target data (step S81).

Here, the condition of B (i+1) [q]. bp∩B (i) [p]. range≠φ indicates that the section of the cohesion force equilibrium point of B (i+1) [q] and the topic boundary candidate section of B (i) [p] at least partially overlap each other. When B (i+1) [q]. bp is designated as a point, the condition of B (i+1) [q]. bp∈B (i) [p]. range is used instead.

FIG. 27 shows a selection example of the unification target data. In FIG. 27, line charts plotted with marks ◊ and + indicate a series of forward and backward cohesion forces, respectively, based on a window with a 640-word width corresponding to a process target. Line charts plotted with marks □ and × indicate a series of forward and backward cohesion forces, respectively, based on a window with a 320-word width corresponding to a unification target.

Out of areas indicated by a double rectangle, large and small rectangular areas correspond to a topic boundary candidate section and a cohesion force equilibrium point, respectively. Here, when the topic boundary candidate section of a process target data B (i) [p] and the data B (i+1) [q] of a unification target series are collated, the width of the topic boundary candidate section of B (i) [p] is expanded horizontally by tic/2 than [mp, mp+d], described earlier, and is made [mp−tic/2, mp+d+tic/2]. tic/2 is the interval width of a cohesion degree corresponding to B (i+1) [q].

This is because the true position of mp is estimated to be in the range of (mp−tic, mp+tic), since the detection accuracy of the topic boundary candidate section depends on the interval width tic of a cohesion degree series. Accordingly, if the process-target topic boundary candidate section is rather expanded, the candidate section is designated as the range of (mp−tic, mp+d+tic).

Here, since the interval width of the cohesion degree of the unification target is tic/2, [mp−tic/2, mp+d+tic/2] is assumed to be the topic boundary candidate section of the process target data. If such a topic boundary candidate section is set, the width becomes d+tic=n*tic. At this point, since tic=w/8 and n=4, the width of the topic boundary candidate section becomes just a half of a window width w/2.

For example, if process target data are assumed to be B (2) [6], the topic boundary candidate section B (2) [6]. range includes the cohesion force equilibrium points B (3) [11]. bp and B (3) [12]. bp of two data in a unification target series. Thus, both B (3) [11] and B (3) [12] becomes candidates of unification target data. Since out of these, B (3) [12]. bp is closer to the cohesion force equilibrium point of the process target data B (2) [6]. bp, B (3) [12] is selected as unification target data.

Then, the topic structure detector unit 26 judges whether or not unification target data could be selected (step S82). If the unification target data are selected, a process in step S84 is performed. If in step S81 data meeting the conditions are not found, pseudo-unification target data are generated with a clue of the cohesion degree used to detect the process target data, and the pseudo-data is inserted in a series of B (i+1) (step S83). Then, the process in step S84 is performed.

In step S83, first, a position mp where the cohesion degree of a window width w becomes a minimum is calculated within the range of B (i) [p]. range. Then, new data B (i+1) [q] corresponding to mp are generated by setting B (i+1) [q]. bp=[mp, mp] and B (i+1) [q]. range=[mp−$d_{i+1}$/2, mp+$d_{i+1}$/2].

Then, the generated data B (i+1) [q] are inserted in the position of a series B (i+1) where B (i+1) [q−1]. bp<mp and B (i+1) [q+1]. bp>mp. Thus, the data number q of pseudo unification-target data is determined, and the data numbers of the existing data after that are rewritten. The reason why a pseudo-topic boundary candidate section data are generated is because in processes after this the range of the unification search is reduced and a precise boundary detection is performed.

For example, if B (2) [6] shown in FIG. 27 is assumed to be process target data, the width of the topic boundary candidate section B (3) [12]. range of usual unification target data is $d_3$ (160 words). In this case, if there is neither B (3) [11] nor B (3) [12], as shown in FIG. 28, a position mp where the cohesion degree of a window width $w_2$ (640 words) within the range of B (2) [6]. range becomes a minimum is calculated.

Then, pseudo-data B (3) [q] having the same width $d_3$ of B (3) [q]. range as ordinary topic boundary candidate section such as B (3) [10]. range are generated in the neighborhood of mp. Thus, in a process in step S84, the width $d_2$ (320 words) of B (2) [6]. range can be reduced to a width $d_3$ (160 words).

This operation is effective in most cases when the minimal point of cohesion degrees is clearly concentrated to one point in the topic boundary candidate section of process target data. Conversely, when there are hardly any fluctuations of cohesion degrees in the topic boundary candidate section, it is often better to use the topic boundary candidate section without reduction. However, empirically, there are few situations where cohesion degrees hardly fluctuate in the topic boundary candidate section.

In step S84 the topic boundary level B (i+1) [q]. level of unification target data is modified with the topic boundary level B (i) [p]. level of process target data, and the information of the process target data B (i) [p] and the unification target data B (i+1) [q] are unified. This process corresponds to that of reducing the topic boundary level of the unification target data B (i+1) [q]. For example, in the case of unification target data B (3) [12] of FIG. 27, B (3) [12]. level=B (2) [6]. level.

Thus, in the next process of step S64 out of data in a new process target series B (i+1) at least the unification target data B (i+1) [q] are left not eliminated. Accordingly, the topic boundary candidate section can be gradually reduced while process target data are replaced with unification target data.

Lastly, unification target data are selected from a series B (ie), and for each of the unification target data B (ie) [p] a process of step S71 is performed. A position mp outputted in this way is recognized as a topic boundary in the topic boundary level B (ie) [p]. level.

FIG. 29 shows the detection result of topic boundaries obtained in this way. In FIG. 29, out of areas indicated by double rectangles corresponding to each window width of 2,560 words, 1,280 words and 640 words, large rectangular areas correspond to topic boundary candidate sections, and small rectangular areas included in the large rectangular areas correspond to cohesion force equilibrium points. B (0), B (1) and B (2) indicate series corresponding to each window width of 2,560 words, 1280 words and 640 words, respectively, and numbers [1], [2], . . . attached to the double rectangles indicate the data number in each series.

The higher a certain rectangular area is located, the larger window width (the lower topic boundary level) the rectangular area corresponds to, and the lower a certain rectangular area, the smaller window width (the higher topic boundary level) the rectangular area corresponds to. Bar charts marked with * indicate the positions of topic boundaries finally calculated.

In a keyword extraction process described later, based on the cohesion degree of the larger window width a boundary is detected (the longer a bar chart is), as a boundary for the longer topic passage (a boundary having the lower topic boundary level) the boundary is recognized. Based on the depth of the smaller window width a boundary is detected (the shorter a bar char is), as a boundary for the shorter topic passage (a boundary having the higher topic boundary level) the boundary is recognized.

In the detection result shown in FIG. 29, a boundary P12 (corresponding to the beginning position of Section 4.2.2(3)) is recognized as a boundary for a longer topic passage than a boundary P11 located after P12 corresponding to the beginning position of Section 4.3. Although there are some discrepancies like this, in most cases a tendency that based on the larger window width a boundary is detected, a break for the larger topic the boundary corresponds to, can be found.

FIG. 30 shows the detection result of topic boundaries in the case where cohesion degrees calculated by cosine measure is used instead of cohesion degrees calculated by a common vocabulary ratio. In FIG. 30, almost the same tendency is found as in FIG. 29.

FIGS. 31 to 36 show the totalization results of data for indicating the characteristics of topic boundaries detected with a clue of the cohesion degree of each window width. Out of these, FIGS. 31 to 33 show the results based on the cohesion degrees calculated by a common vocabulary ratio obtained according to equation (7), and FIGS. 34 to 36 show the results based on the cohesion degrees calculated by a cosine measure.

FIGS. 31 and 34 show the intervals of boundaries detected based on a specific window width. From these totalization results it is found that topic boundaries are detected at intervals of approximately one or two times a window width.

FIGS. 32, 33, 35 and 36 show the accuracy of detected boundaries with reference to the existing sections in the input document described above. In FIGS. 32 and 35, an existing section boundary that separates existing sections both of which are larger than or equal to a specific window width is regarded as a correct boundary, and recall ratios and precision ratios are totalized for each window width. The recall ratios and precision ratios are calculated as follows.

$$\text{Recall ratio}=(\text{number of correct answers/number of section boundaries})*100\ (\%) \quad (15)$$

$$\text{Precision ratio}=(\text{number of correct answers/number of detected boundaries})*100\ (\%) \quad (16)$$

where the number of section boundaries is the number of correct data for each window width, the number of detected boundaries is the number of detected boundaries corresponding to the topic boundary level of each window width, and the number of correct answers is the number of detected boundaries that locate within a distance of four words or less from a correct boundary.

For example, the boundary at the beginning of Section 4.4 is located between Section 4.3 (6,067 words) and Section 4.4 (6,670 words), and the size of the smaller section is 6,067 words. Since this is greater than a maximum window width of 2,560 words, the boundary at the beginning of Section 4.4 is handled as correct data in all window widths.

The boundary at the beginning of Section 4.4.1 is located between a part between the beginning of Section 4.4 and the beginning of Section 4.4.1 (115 words), and Section 4.4.1 (2,643 words), and the size of the smaller section is 115 words. Therefore, the boundary at the beginning of Section 4.4.1 is handled as correct data only in the window widths of 80 words and 40 words.

In FIGS. 33 and 36, an existing section boundary that separates existing sections both of which are larger than or equal to a half of a specific window width is regarded as a correct boundary, and both the recall ratios and precision ratios are totalized using equations (15) and (16).

When these results are compared, the results calculated by a cosine measure have a slightly higher accuracy than the results calculated by a common vocabulary ratio. On the other hand, for cohesion degrees based on the same window width the results by a common vocabulary ratio have more detected boundaries. It is considered that this is because cohesion degrees calculated by a common vocabulary are more sensitive to the change of the number of repeated vocabulary than cohesion degrees calculated by cosine measure.

For this reason, the cohesion degrees calculated by a common vocabulary ratio are more easily affected by local singularities in a small window width, and thereby a slightly less favorable result is obtained in the accuracy of ±4 words (approximately one sentence in total). Conversely, it is considered that in a large window width the cohesion degrees calculated by a common vocabulary ratio can pick up changes which cannot be detected by the cohesion degrees calculated by cosine measure.

In the application of the present invention, it is desirable to choose or use together appropriate calculation methods of cohesion degrees taking into consideration these properties and the cost on the calculation of cohesion degrees. Generally speaking, since the cost on the calculation of cohesion degrees by a common vocabulary ratio is fairly low, the calculation of cohesion degrees by a common vocabulary ratio is recommended when importance is attached to calculation efficiency.

Next, a method of more accurately detecting topic boundaries using both cohesion degrees and document pattern is described below. As seen in FIG. 29, a topic boundary candidate section has a high probability of including an actual section boundary. Therefore, by finely adjusting the position of detected boundaries with a clue of simple features in the physical appearance of a document (document pattern) as shown in FIG. 37, the accuracy of the detection result can be improved.

FIG. 37 shows the relation between a document pattern to be used for this adjustment and a boundary level. For the document pattern a characteristic character string becoming a clue to detect a section boundary is expressed by the regular expression method used in general OSs. For example, "^\d+\.\d+\.[^ ○]+$" indicates a line beginning with two figures punctuated by a period like "4.1" and not including a Japanese period "○". Numbers of boundary level are assigned so that the smaller a number is, the larger topic boundary the number may correspond to, like the topic boundary level described above. For example, Section 4.1 is a boundary of level 1, and an empty line ("^$") becomes a boundary of level 4.

FIG. 38 is a flowchart showing the unification process using such a document pattern. This unification process is performed in step S68 shown in FIG. 25. The relation between a document pattern shown in FIG. 37 and a boundary level is predetermined by a user.

The topic structure detector unit 26 first scans within the topic boundary candidate section B (i) [p]. range of process-target data while referring to a given document pattern, and calculates a position hp of the section boundary at which the boundary level is a minimum, and which is the nearest to B (i) [p]. bp (step S91). Then, the topic structure detector unit 26 selects data B (i+1) [q] in which hp ∈ B (i+1) [q]. range out of data B (i+1) [q] (q=1, . . . , |B (i+1)|) in a unification-target series as unification-target data (step S92).

Then, the topic structure detector unit 26 judges whether or not unification-target data could be selected (step S93), and if the unification-target data could be selected, performs a process in step S95. If in step S92 data meeting conditions are not found, the topic structure detector unit 26 generates pseudo unification-target data using the section boundary hp, and inserts the data in a series of B (i+1) (step S94). Then, the topic structure detector unit 26 performs a process in step S95.

In step S94, B (i+1) [q]. bp=[hp, hp] and B (i+1) [q]. range=[hp−$d_{i+1}$/2, hp+$d_{i+1}$/2] are set, and new data B (i+1) [q] corresponding to hp are generated.

Then, the generated data B (i+1) [q] are inserted in a position in a series B (i+1) where B (i+1) [q1]. bp<hp and B (i+1) [q+1]. bp>hp. Thus, the data number q of the pseudo unification-target data is determined, and data existing data after the data are rewritten.

In step S95, like numbers of step S84 shown in FIG. 26, the topic boundary level B (i+1) [q]. level of unification-target data is modified with the topic boundary level B (i) [p]. level of process-target data, and the information of process-target data B (i) [p] and unification-target data B (i+1) [q] are unified.

When such a unification process is adopted, in step S71 shown in FIG. 25, the position hp of the minimum section boundary of a boundary level in B (ie) [p]. range is calculated instead of the minimum position mp of a cohesion degree in the same way as step S91 shown in FIG. 38. Then, hp and B (ie) [p]. level are related and outputted.

In the case of a unification process shown in FIG. 38, since a topic boundary is adjusted with a clue of a document pattern in the input document, the accuracy of the detection result is improved over the case of the unification process shown in FIG. 26.

Next, the process of a major part specifying unit 28 is described below. The major part specifying unit 28 removes topic sections having low cohesion degrees out of three levels of topic sections separated by topic boundaries detected by the topic structure detector unit 26, from targets to be processed in the following summarization process.

Here, three levels of topic sections are three kinds of topic sections: a section separated by topic boundaries calculated by the cohesion degree of a maximum window width $w_0$, a section separated by topic boundaries calculated by the cohesion degrees of a basic window width $w_1$ or a larger window width than the basic window width $w_1$, and a section separated by topic boundaries calculated by the cohesion degrees of a window width $w_2$ (=$w_1$/r) just below the basic window width or a larger window than the window width $w_2$. The reason why sections having a low cohesion degree are removed from process targets is because these sections are often parts without detailed information, for example, like parts where only items are listed.

Here, whether or not a topic section is a section having a low cohesion degree is judged by comparing the cohesion degree of the topic section with the mean value of the cohesion degree of a parent topic section in the hierarchical structure. Suppose that a topic section to be judged is b, the window width of b is $w_n$, the maximum value of cohesion degrees calculated by a window width $w_n$ around the center of the topic section is c, the parent topic section that is one of the sections calculated by a window width $w_{n-1}$ and includes the topic section b is a, and the mean value of cohesion degrees calculated by the window width $w_n$ in a is mc. If the following relation holds among them, the topic section b is judged to be a section having a low cohesion degree.

$$c < mc + \alpha \tag{17}$$

where α is a parameter for modifying the sensitivity of low cohesion degree judgement, and the greater the value is, the greater the number of sections are judged to be sections having low cohesion degree. It is desirable to use 0 or the standard deviation of $w_n$ in the parent topic section a for α.

FIGS. 39 and 40 are flowcharts showing the major part specifying process by the major part specifying unit 28. The major part specifying unit 28 first sets up the entire document as a parent topic section (step S101 shown in FIG. 39), and removes sections having a low cohesion degree from topic sections calculated by a maximum window width $w_0$ (step S102). The reason why the entire document is designated as a parent topic section here is because there is no higher-order topic boundary than a topic boundary based on $w_0$.

All topic sections of the basic window width $w_1$ included in the topic sections based on $w_0$ are also removed, when the topic sections based on $w_0$ are removed. Therefore, although the topic sections based on the maximum window width $w_0$ do not become direct targets for summarization processes later, the number of summarization-target topic sections decreases.

Then, the sections having a low cohesion degree are removed from the topic sections based on the basic window width $w_1$. Since the parent topic section of the topic sections based on the basic window width $w_1$ is the topic section based on a maximum window width $w_0$, the topic sections based on $w_0$ not removed by the process in step S102 are extracted one by one, and the topic sections based on $w_1$ included in the extracted topic sections based on $w_0$ are judged to be removed or not.

Here, first, a first topic section based on the maximum window width $w_0$ is extracted as a parent topic section (step S103), and sections having a low cohesion degree are removed from the topic sections based on the basic window width $w_1$ included by the parent section (step S104). Then, a next topic section based on the maximum window width $w_0$ is extracted and designated as a parent topic section (step S105). Then, it is judged whether or not the parent topic section could be extracted (step S106), and if the parent topic section could be extracted, the processes in step S104 and after are repeated.

If the parent topic section could not be extracted, the removal process of topic sections based on the basic window width $w_1$ is considered to be completed, and then the removal process of topic sections based on a window width $w_2$ of next size to the basic window width is performed.

Since the parent topic sections based on the window width $w_2$ is the topic section based on the window $w_1$, the topic sections based on $w_1$ not removed by the process in step S104 are extracted one by one, and the topic sections based on $w_2$ included in the extracted topic sections based on $w_1$ are judged to be removed or not.

The removal of the topic sections based on $w_2$ means the removal of parts where the content is scanty in meaning from the topic section based on the window width $w_1$ being summarization targets. Thus, unimportant content can be prevented from being extracted as the digest of the topic sections based on the basic window width $w_1$.

In this process, first, a first topic section based on the basic window width $w_1$ is extracted (step S107 shown in FIG. 40), and sections having a low cohesion degree are removed from the topic sections based on the window width $w_2$ (step S108) using the extracted topic section based on the basic window width $w_1$ as a parent topic section. Then, a next topic section based on the basic window width $w_1$ is extracted and designated as a parent topic section (step S109). Then, it is judged whether or not the parent topic section could be extracted (step S110), and if it could be extracted, the processes in step S108 and after are repeated.

If the parent topic section could not be extracted, it is considered that the removal process of the topic sections based on the window width $w_2$ is completed, and the process is terminated.

FIG. 41 is a flowchart showing a topic section removal process called up in steps S102 and 104 shown in FIG. 39 and step S108 shown in FIG. 40. The sub-module for the topic section removal process first receives the window width w of a topic section and the parent topic section a from a caller (step S111). Then, the sub-module calculates the mean value mc of the cohesion degrees based on a process-target window width w over the parent topic section a, and determines a reference cohesion degree c0 being a criterion for judgement as follows (step S112).

$$c0 = mc + \alpha \quad (18)$$

where $\alpha$ is the same parameter that is described in equation (17).

Then, in the parent topic section a first topic section based on a window width w is extracted and designated as a process-target topic section (step S113). Then, a maximum cohesion degree c around the center of the process-target topic section is calculated (step S114). Then, c and c0 are compared (step S115). If c<c0, the process-target topic section is removed from summarization targets (step S116). Then, in the parent topic section a next topic section based on a window width w is extracted, and designated as a process-target topic section (step S117). If c≧c0, the process in step S117 is performed while the process-target topic section is left as it is.

Then, it is judged whether or not the process-target topic section could be extracted (step S118), and if it could be extracted, the processes in step 114 and after are repeated. Then, if the process-target topic section is not be extracted, the process is terminated.

FIG. 42 is a flowchart showing a maximum cohesion degree calculation process called up in step S114 shown in FIG. 41. The sub-module for the maximum cohesion degree calculation process first receives a process-target topic section b and the window width w of the topic section from a caller (step S121), and compares the size of the topic section b and the window width w (step S122).

If the size of the topic section b is larger than w, the maximum cohesion degree in a section left after removing parts of w/2 on the both ends from the topic section b is calculated, the value is stored as c (step S123), and the process is terminated. If the size of the topic section is w or less than w, the cohesion degree in the center position of the topic section b is stored as c (step S124), and the process is terminated.

FIG. 43 shows the result of applying a major part specifying process to the above input document assuming $\alpha=0$. In FIG. 43, slashed parts P21, P22 and P23 indicate topic sections removed by the removal process of topic sections having a low cohesion degree based on a window width $w_1$ (1,280 words). The horizontal lines indicate the mean value mc of cohesion degrees based on a window width $w_1$ over each topic section based on a window width $w_0$, and arrow marks indicate a point corresponding to a maximum cohesion degree c around the center of each topic section based on the window width $w_1$.

For example, when looking at the slashed part P21 in the neighborhood of 4,000 words, it is found that a maximum value c indicated by the arrow mark is clearly less than the mean value mc. For this reason, this topic section is removed from the summarization targets. The same applies to the other slashed parts P22 and P23.

Dotted parts P24 and P25 indicate the topic sections removed by the removal process of low cohesion degree sections based on a window width $w_2$ (640 words). Parts not removed by this process, that is, parts other than P21, P22, P23, P24 and P25, are recognized as major parts being the summarization target.

Although in the major part specifying process shown in FIGS. 39 and 40 major topic sections are specified by removing topic sections having a cohesion degree lower than a threshold, by performing a process of extracting topic sections having a cohesion degree greater than the threshold instead, the same result can also be obtained.

Next, the process of a keyword extractor unit 29 is described below. The keyword extractor unit 29 selects the content words characteristically used in each of the topic sections based on the basic window width $w_1$ and a maximum window width $w_0$, which are detected by the topic structure detector unit 26 and reduced by the major part specifying unit 28, outputs the selected content words as a set of keywords for each topic section.

Here, if the use frequency (number of uses) of a certain content word t in a topic section b exceeds an expectation, and the logarithmic likelihood ratio L of the following equation exceeds a given threshold ($\chi^2$ value corresponding to a statistically significant standard), the content word t is judged to be characteristic of the topic section b.

$$L = 2\left(F_{bt}\log\frac{F_{bt}}{E(F_{bt})} + (F_{at} - F_{bt})\log F_{at} - \frac{F_{bt}}{F_{at} - E(F_{bt})}\right) \quad (19)$$

In equation (19), $F_{bt}$ indicates the use frequency of a word t in a topic section b, $F_{at}$ indicates the use frequency of the word t in the parent topic section a of the topic section b, and $E(F_{bt})$ indicates the expectation of the use frequency of the word t in the topic section b. $E(F_{bt})$ can be calculated by multiplying the use density (use probability) of the word t in the parent topic section a by the size of the topic section b. Here, the use density of a word in a certain section means a ratio between the use frequency of the word and the size of the section.

The L of the equation (19) is the value of a likelihood ratio test on whether or not the use probability of a word t is independent of a distinction between a topic section b and areas other than the topic section, which indicates that the greater this value is, the more the use probability of the word is dependent on the distinction. Since the degree of freedom v of L is 1, when the significant standard is 10%, 5% and 1%, it is sufficient that the threshold is set to 6.63490, 7.87994 and 10.8276, respectively. Instead of using a threshold, several higher-order words can also be extracted as keywords in the descending order of L.

However, if a topic section based on a maximum window width $w_0$ and a topic section based on the basic window width $w_1$ are identical, or if a topic section of the basic window width $w_1$ occupies most of a topic section based the window width $w_0$, such a test method cannot always work well. For this reason, when the size of the direct higher-order topic section of b (i.e., a topic section including b of a window width $w_0$) is less than twice the size of b, an entire document is used for the parent topic section.

FIGS. 44 and 45 are flowcharts showing the keyword extraction process by a keyword extractor unit 29. The keyword extractor unit 29 receives a threshold h corresponding to a statistical significance level from a user (step S131 shown in FIG. 44). Then, assuming an entire document as a parent topic section candidate a0, both the size of a0 and the use frequency of each content word w used in a0 are calculated, and are stored as S0 and $F_{0w}$, respectively (step S132).

Then, the leading topic section based on the maximum window width $w_0$ is extracted and designated as a parent topic section candidate al (step S133). Then, both the size of the parent topic section candidate al and the use frequency of each content word w used in the a1 are calculated, and are stored as S1 and $F_{1w}$, respectively (step S134).

Then, the logarithmic likelihood ratio of the use frequency of each content word stored in $F_1$ is calculated, and keywords are extracted by comparing the logarithmic likelihood ratio with the threshold h (step S135). Then, in al a first topic section based on the basic window width $w_1$ is extracted and designated as a keyword extraction target section b (step S136).

Then, both the size of the keyword extraction target section b and the use frequency of each content word w used in b are calculated, and are stored as Sb and $F_{bW}$, respectively (step S131 shown in FIG. 45). Then, S1 and 2Sb are compared (step S138). Here, if S1<2Sb, a0 is selected for a parent topic section (step S139), and if S1≧2Sb, a1 is selected for the parent topic section (step S140). Then, a process in step S141 is performed.

In step S141, the keyword extractor unit 29 calculates the logarithmic likelihood ratio of the use frequency of each content word stored as $F_{bw}$, and extracts keywords by comparing the logarithmic likelihood ratio with the threshold h. Then, in $a_1$ a next topic section based on the basic window width $w_1$ is extracted and designated as a keyword extraction target section b (step S142).

Then, it is judged whether or not b could be extracted (step S143), and if it could be extracted, processes in steps S137 and after are repeated. If it ceases to be able to be extracted, then a next topic section based on the maximum window width $w_0$ is extracted and designated as a parent topic section candidate a1 (step S144).

Then, it is judged whether or not a1 could be extracted (step S145), and if it could be extracted, processes in steps S134 and after shown in FIG. 44 are repeated. When it ceases to be able to be extracted, the process is terminated.

FIGS. 46 and 47 are flowcharts showing the likelihood ratio test process called up in steps S135 shown in FIG. 44 and S141 shown in FIG. 45. The sub-module for the likelihood ratio test process first receives a threshold h, the size Sa (S0 or S1) of a parent topic section, the list of the use frequency $F_{aw}$ ($F_{0w}$ or $F_{1w}$) of a word in the parent topic section, the size Sb of a test target topic section and the list of the use frequency $F_{bw}$ of a word in the test target topic section from a caller (step S151 shown in FIG. 46).

Then, a first word is extracted from the list of $F_{bw}$, and is designated as a test word t (step S152). Then, it is judged whether or not t could be extracted (step S153), and if it could be extracted, $F_{bt}$ is compared with 1 (step S154 shown in FIG. 47).

If $F_{bt}$ is greater than 1, the expectation $E(F_{bt})$ (theoretical value) of $F_{bt}$ is calculated as follows (step S155), which is compared with $F_{bt}$ (step S156).

$$E(F_{bt})=F_{at}*S_b/S_a \qquad (20)$$

Here, if $F_{bt}$ is greater than $E(F_{bt})$, the likelihood ratio L of t is calculated according to equation (19) (step S157), which is compared with the threshold h (step S158). If L is greater than or equal to h, t is extracted as a keyword (step S159). Then, a next word is extracted from the list of $F_{bw}$, is designated as the test word t (step S160), and processes in steps S153 and after shown in FIG. 46 are repeated.

If in step S158 L is greater than or equal to h, the use frequency of the word t in a topic section b is considered to be singularly greater than the use frequency in a parent topic section a, and t is extracted as a keyword.

If in steps S154, S156 and S158 the judgement result is NO, t is not extracted as a keyword, and processes in steps S160 and after are performed. If t could not be extracted in step S153, the test of all words is considered to be completed, and the process is terminated.

FIG. 48 shows the headings in the leading keyword extraction target section (topic section based on a window width $w_1$=1,280 words) out of the headings in the above input document, and FIG. 49 shows keywords extracted from the section. Here, a threshold corresponding to a significant standard 5% is used.

Next, the process of a sentence selector unit 30 is described below. The sentence selector unit 30 extracts key sentences becoming a part of a digest utilizing a technology disclosed in the previous application of this applicant, Japanese Patent Application number 9-006777 "Digest Generator and the Method".

The features of the sentence selection process in this embodiment are that keywords are assigned to both a topic section based on a basic window width $w_1$, which is a unit for generating a digest, and a topic section based on the maximum window width $w_0$, positioned in the immediate higher-order of the topic section based on a basic window width $w_1$ in a topic structure. In this way, this sentence selection process differs from the previous application in that keywords are assigned to each of topic sections hierarchically constituted and key sentences are selected by using keywords for different levels together.

Keywords assigned to a topic section based on a basic window width $w_1$ are local keywords used to extract sentences only from the topic section. On the other hand, keywords assigned to a topic section based on the maximum window width $w_0$ are global keywords used to extract sentences from each of a plurality of summarization-target topic sections positioned in the lower-order of the topic section based on the maximum window width $w_0$.

The Japanese Patent Application Number 9-006777 discloses a method capable of widely including keywords in a digest even with a small extraction volume. By using this method a digest containing many kinds of keywords can be generated. This is because every time one sentence is selected, words contained in the selected sentence are eliminated from a list of keywords.

Since this list contains words in inquiries from a user, the list is called a list of focused words. Focused words contain both keywords for indicating the content which a document writer intends to write (specifically, headings and emphasis phrases) and keywords for indicating document items which a user want to read (specifically, inquiries inputted by a user in a document retrieval).

Since it is considered in this embodiment to summarize a document of several tens of pages to a document of approximately one page, the method of updating the list of focused words every time a key sentence is selected is adopted.

FIGS. 50 and 51 are flowcharts showing a sentence selection process by the sentence selector unit 30. The sentence selector unit 30 first extracts the leading topic section based on the maximum window width $w_0$ as a parent topic section a (step S161 shown in FIG. 50), and registers keywords corresponding to a in the focused word list kwla for the parent topic section (step S162). Then, it is judged whether or not a heading exists in the leading part of a (step S163). For the judgement on headings, for example, document patterns shown in FIG. 37 are used.

When there are headings, the headings are marked and designated as indispensable output sentences (sentences should be taken into a digest without fail), and content words contained in the headings are extracted and added to the focused word list (step S164). Thus, sentences related to headings are also automatically extracted for a digest.

Then, each summarization target topic section contained in a is assumed to be bn, and the focused word list kwln of bn is generated. In the focused word list kwln, first, keywords peculiar to each topic section bn are registered (step S165), and then focused words in the focused word list kwla in the parent topic section a are merged (step S166). If there is no heading word in step S163, processes in steps S165 and after are performed.

Then, all bn of which the parent topic section is a are processed at one time, and one sentence to be outputted to a digest is selected from each bn (step S167 shown in FIG. 51). The reason why all child topic sections bn having the same parent topic section a are processed at one time is because it is intended to extract sentences related to a focused word in a from as many bn as possible. At this time, the selected sentences are attached with a mark indicating that they are already selected.

Then, every kwln corresponding to the topic section bn where no sentence is selected is deleted, and the selection process of the sections is terminated (step S168). For the topic sections where a sentence is selected, focused words contained in the selected sentence are deleted from the corresponding focused word list kwln (step S169). Furthermore, if focused words which derive from a focused word list kwla for the parent topic section a and are not peculiar to the topic section bn are contained in sentences selected in another topic section bx, the focused words are deleted from the focused word list kwln of bn (step S170).

Then, it is judged whether or not a focused word list kwln still exists, that is, topic sections bn having room for sentences to be selected are still left (step S171). If such a focused word list still exists, the processes in steps S167 and after are repeated. In this case, in focused word lists kwln emptied by the processes in steps S169 and S170 a focused word list peculiar to bn and a focused word list of a are merged, and the focused word lists kwln are restored to the initial state (step S172).

If in step S171 no focused word list kwln is left, a next topic section based on the maximum window width $w_0$ is extracted as a parent topic section a (step S173). Then, whether or not the parent topic section a could be extracted is judged (step S174), and if it could be extracted, the processes in steps S162 and after are repeated.

If the parent topic section could not be extracted, the indispensable output sentence marked in step S164 and the sentence selected in step S167 are merged and arranged in the use order, a digest is generated (step S175), and the process is terminated. By inserting a mark indicating the existence of an unselected sentence, a paragraph boundary, etc. in the generated digest, the readability can also be improved.

For the case where no sentence can be selected in step S167, there is a case where sentence selection is terminated due to the restriction of extraction volume and a case where no sentence containing focused words (keywords) contained in the focused word list exist at that time. In the latter case, by restoring the focused word list to the initial state once more and trying another sentence selection, the range of the sentence selection can be expanded.

Although the use of inquiry sentences from a user is not described, for example, inquiry sentences can easily be processed by extracting content words from the inquiry sentences and adding the content words to the focused word list in step S162.

Alternatively, instead of targeting all topic sections bn having the same parent topic section a for the key sentence selection in steps S165 and S166 shown in FIG. 50, one major topic section can be selected as bn, and key sentences can be selected only from the topic section. When a digest as short as possible is intended, this method is effective.

For example, when a very short digest is intended, if key sentences are selected from a plurality of topic sections, the volume which can be extracted from each topic section is sometimes less than the understandable volume. In such a case, by restricting summarization target topics and summarizing them, sentences of an understandable volume can be extracted for the restricted topics. Thus, a more preferable digest can be generated instead of a digest which covers all topics, but is difficult to understand.

FIG. 52 is a flowchart showing such a sentence selection process. In FIG. 52, the processes ranging from step S161 to step S164 are the same as those in FIG. 50. The sentence selector unit 30 selects a section where focused words contained in the focused word list kwla for a are most frequently used out of topic sections based on a basic window width $w_1$ having a parent topic section a, which is assumed to be b0n (step S165a). Then, the sentence selector unit 30 registers keywords peculiar to b0n in a focused word list kwln of b0n.

Then, the sentence selector unit 30 merges keywords in the focused word list kwla for the parent topic section a in kwln (step S165b). Then, the sentence selector unit 30 selects a section where focused words contained in the focused word list kwln for b0n are most frequently used out of topic sections based on a window width $w_2$ having a parent topic section b0n, which is handled as a summarization-target topic section bn (step S165c). After in this way one summarization-target topic section bn is selected from one parent topic section a, the process shown in FIG. 51 is performed.

Here, instead of selecting one summarization-target topic section bn from one parent topic section a, an appropriate number of topic sections bn can also be selected in the descending order of the use frequency of focused words. If a sufficient volume of sentences cannot be extracted from the topic sections selected as summarization targets, sentences can also be selected from topic sections where focused words are second most frequently used. Furthermore, in steps S161 and S173 only a specific parent topic section a can also be selected based on the content words of the inquiry sentence inputted by a user.

FIGS. 53 and 54 are flowcharts showing the selection process called up in step S167 shown in FIG. 51. First, the sub-module for the selection process receives both the upper limit U1 of the size of the entire digest and the upper limit U2 of the extraction volume of each topic section from a user (step S181 shown in FIG. 53). Usually U1 is set larger than the desirable size $S_a$ of the digest described earlier, and U2 is set larger than the desirable extraction volume St of the topic described earlier. These parameters can also automatically calculated based on both $S_a$ and $S_t$.

Then, each sentence existing in bn and focused words in a focused word list kwln are compared for each topic section bn, and the use frequency of the focused words (both the number of different words and the total number) are stored for each sentence (step S182). Then, one sentence in which the use frequency of the focused words is the maximum out of unselected sentences having a length less than or equal to U2 is selected for each topic section bn (step S183).

In this case, if there are already selected sentences in bn, a new sentence is selected in such a way that the total of the sum of the lengths of the selected sentences (extraction volume of bn) and the length of the newly selected sentence may not exceed U2. For the use frequency of focused words, either the number of different words or the total number of words can be used, or the total of both can be used. Then, a mark indicating that they are already selected is attached to a selected sentence, and the length of the sentence is added to the extraction volume of bn.

Then, a mark indicating the termination of selection is attached to topic sections bn where no sentence is selected (step S184), and the total s of the lengths of all the selected sentences is calculated (step S185). Then, s is compared with U1 (step S186 shown in FIG. 54), and if s is less than or equal to U1, the process is terminated.

If s>U1, a mark indicating the completion of selection is attached to all topic sections bn (step S187), a sentence where the use frequency of focused words is the minimum of all the selected sentences is removed, and the length of the sentence is subtracted from both s and the extraction volume bn (step S188). Then, s is compared with U1 again (step S189), and if still s>U1, the process in step S188 is repeated until s becomes less than or equal to U1.

By adopting such a selection process, the size of a digest finally outputted is guaranteed to be within the designated upper limit U1. In the case of the above input document, a digest as shown in FIGS. 55, 56 and 57 is outputted. Here, one digest is divided into and shown in three diagrams due to the restriction of the size of the diagram. In this digest a symbol " . . . " inserted before and after each sentence indicates that there are unselected sentences.

Next, a case where a specification draft for U.S. application (23,000 words) is used for an English input document is described below, where the following process methods and parameters are adopted.

(1) Word detection method: a method of using a stop word list (2) Window widths for cohesion degree calculation:
maximum window width $w_0$=2,560 (words)
basic window width $w_1$=1,280 (words)
window width $w_2$=640 (words)

(3) Topic boundary detection method: a method of using document patterns (4) Sensitivity α for low cohesion degree judgement in major part specifying process:
For $w_0$: α=−σ0/2 (σ0 is the standard deviation of a cohesion degree based on a window width $w_0$)
For $w_1$ and $w_2$: α=0

(5) Threshold for keyword extraction: h=6.63490 (significant standard 10%)

(6) Upper limit of extraction volume in sentence selection:
U1=3,000 (bytes)
U2=600 (bytes)

Since it is not appropriate to attach the entire input document, for reference a list of headings in the input document is shown in FIG. 58. In FIG. 58, expressions inside ( ) are the abbreviations of headings attached for explanation, which are not contained in the input document.

FIG. 59 shows the leading part of an input document, and FIG. 60 shows the tokenization process result of the part. In FIG. 60, parts bracketed by [ ] correspond to detected words. Words having a capital letter only for the first character are replaced with words having all small letters in [ ].

Here, words are extracted with a clue of a blank and punctuation such as ",", ".", ":", ";", etc., and out of those, words contained in a stop word list shown in FIG. 61 are removed. A stop word list is a list in which words not desired to be extracted as keywords such as articles, prepositions, etc are defined in advance.

FIG. 62 shows document patterns used to calculate section boundaries in the unification process shown in FIG. 38 and the boundary levels. Here, a line beginning with a capital alphabetical letter is considered as a section boundary of boundary level 0, and a line in which the first character is "[" except for a blank is considered as a section boundary of boundary level 1.

In a topic boundary detection process, if there is a line coinciding with these document patterns in a topic boundary candidate section, the unification process shown in FIG. 38 is adopted, and if not, the unification process shown in FIG. 26 is adopted. As a result, a detection result as shown in FIG. 63 is obtained.

In FIG. 63, (Bg), <1>, etc. described near section boundaries indicate the abbreviations of the headings shown in FIG. 58. Out of topic boundary candidate section data B (i) [p], B (0) [1] corresponding to the section boundary P31 of <1>are data to be unified with B (1) [3], unless document patterns are not used. Here, as a result of using document patterns, a section boundary P31 is detected. However, since data including the position of P31 are not included in a series of B (1) and B (2), pseudo unification-target data such as B (1) [2] and B (2) [3] are generated.

FIG. 64 shows the result of a major part specifying process. In FIG. 64, slashed parts P41 and P42 indicate topic sections removed by the removal process of a low cohesion degree section based on a window width $w_1$ (1,280 words). A horizontal line indicates the mean value of the cohesion degree based on a window width $w_1$ in each topic section based on a window width $w_0$, and an arrow mark indicates a point corresponding to a maximum cohesion degree around the center of each topic section based on a window width $w_1$. Dotted parts P43, P44 and P45 indicate topic sections removed by the removal process of a low cohesion degree section based on a window width $w_2$ (640 words).

The reason why the sensitivity parameter α of the removal process of a low cohesion degree section is adjusted regarding topic sections based on a window width $w_0$ as described earlier is because the cohesion degree of a section corresponding to (claims) of the input document is abnormally high compared with the cohesion degrees of other sections. This corresponds to the fact that the standard deviation of the cohesion degree of a window width $w_0$ is large. Actually, the mean value of the cohesion degree of a window width $w_0$ is 0.43, while the standard deviation is 0.11. Based on this detection result a digest shown in FIGS. 65, 66 and 67 is generated.

Although in the above embodiments a summarization process is described with reference to both Japanese and English documents, besides these documents the present invention can apply to an arbitrary language and an arbitrary document pattern, and a similar result can be obtained.

An input document is not necessarily limited to a digitized electronic document, and for example, a document printed on a medium of paper, etc. can also be used. In this case, by reading document images using an opto-electronic converter device such as an image scanner, etc. and recognizing the characters, document data in which a tokenization is possible can be generated.

By adopting the present invention, for a long document of several tens of pages, the hierarchical structure of topic passages of an arbitrary size, ranging from approximately ½ to ¼ of the entire document size to an approximate size of a paragraph (several tens of words to 100 words) can be detected based on a phenomenon generally seen in sentences called lexical cohesion.

Further, by extracting an appropriate content from each topic passage a digest corresponding to the hierarchical structure of topics can also be generated. Thus, the digest of a complex document which is composed of several parts of text concerning different topics can also be generated, which is conventionally unavailable.

By automatically determining the size of a topic passage being a unit of summarization and condensing a summarization target to a major topic passage, a digest containing balanced topics having appropriate grading can be generated, depending on a required size of a digest.

What is claimed is:

1. A digest generator apparatus comprising:

a structure detecting unit, by detecting a set of topic boundaries of a document based on a lexical cohesion degree, to detect a hierarchical structure of topic passages in the document, in which each of the topic passages corresponds to a part of the document describing a common topic, the hierarchical structure includes a plurality of levels, the topic passages in each of the levels compose the document, and each topic passage in a higher level includes one or more shorter topic passages in a lower level;

a keyword extracting unit extracting a plurality of keywords using the hierarchical structure;

a sentence selecting unit selecting a plurality of key sentences from one of the topic passages in the hierarchical structure depending on a use condition of the keywords; and an outputting unit outputting the key sentences as a digest.

2. The digest generator apparatus according to claim 1, wherein said keyword extracting unit evaluates whether or not a term used in a range of one of the topic passages in the hierarchical structure is characteristic of said one of the topic passages, and extracts one of the plurality of keywords from said one of the topic passages based on an evaluation result.

3. The digest generator apparatus according to claim 2, wherein said keyword extracting unit obtains said evaluation result using both a use frequency of an evaluation target term in said one of the topic passages and a use frequency of the evaluation target term in a long topic passage including said one of the topic passages.

4. The digest generator apparatus according to claim 1, wherein said keyword extracting unit extracts a local keyword from a summarization-target topic passage, and extracts a global keyword from a longer topic passage including the summarization-target topic passage; and said sentence selecting unit selects said plurality of key sentences from the summarization-target topic passage based on the use condition of the local keyword and the global keyword.

5. The digest generator apparatus according to claim 1, further comprising:

a determining unit determining the number of topics to be extracted for the digest from both a size of the document and a desired size of the digest.

6. A digest generator apparatus comprising:

a structure detecting unit detecting a hierarchical structure of topic passages in a document, in which each of the topic passages corresponds to a part of the document describing a common topic, the hierarchical structure includes a plurality of levels, the topic passages in each of the levels compose the document, and each topic passage in a higher level includes one or more shorter topic passages in a lower level, wherein said structure detecting unit calculates a lexical cohesion degree in a vicinity area of each position in said document, detects a set of the topic boundaries that separate said document into the topic passages of almost the same size based on the cohesion degree, and by repeating detection of the set of the topic boundaries while reducing the size of the vicinity area, detects the hierarchical structure of the topic passages, wherein the topic passages range from a size of about a fraction of the document to about one paragraph;

a keyword extracting unit extracting a plurality of keywords using the hierarchical structure;

a sentence selecting unit selecting a plurality of key sentences from one of the topic passages in the hierarchical structure depending on a use condition of the keywords; and an outputting unit outputting the key sentences as a digest.

7. The digest generator apparatus according to claim 6, wherein said structure detecting unit calculates said cohesion degree in the vicinity area of said each position based on a similarity of a vocabulary included in two windows set up before and after said each position, and repeats the detection of the set of the topic boundaries while reducing a window width.

8. The digest generator apparatus according to claim 6, wherein said structure detecting unit comprises a candidate section detecting unit handling a moving average of said cohesion degree as both a forward cohesion force at the beginning of a moving average zone and a backward cohesion force at the end of the moving average zone, recognizing the vicinity area of a position where the forward cohesion force and the backward cohesion force balance each other as a candidate section of one of the topic boundaries, and identifying the one of the topic boundaries using the candidate section.

9. The digest generator apparatus according to claim 6, further comprising:

a major part specifying unit removing a document portion having a lower cohesion degree and extracting a document portion having a higher cohesion degree as a major part, and wherein said sentence selecting unit selects said key sentences from a topic passage corresponding to the major part.

10. A digest generator apparatus, comprising:
a keyword extracting unit evaluating whether or not a word is characteristic of a process target topic passage in a document by calculating a likelihood ratio based on a comparison of a use frequency of the word in the process target topic passage with a use frequency of the word in a longer topic passage including the process target topic passage and comparing the likelihood ratio to a predetermined threshold value, and extracting a keyword from the process target topic passage when the likelihood ratio is greater than the predetermined threshold value;
a generating unit generating a digest according to a use condition of said keyword; and
an outputting unit outputting said digest.

11. A digest generator apparatus, comprising:
a unit repeatedly calculating a lexical cohesion degree in a vicinity of each position in a document to define topic passages in the document while varying a size of the vicinity;
a major part specifying unit specifying a major part of the document to be summarized by removing one or more topic passages having a lower cohesion degree from the document;
a generating unit generating a digest using said major part; and
an outputting unit outputting said digest.

12. A computer-readable storage medium for storing a program which enables a computer to perform:
detecting a set of topic boundaries of a document based on a lexical cohesion degree to detect a hierarchical structure of topic passages in the document, in which each of the topic passages corresponds to a part of the document describing a common topic, the hierarchical structure includes a plurality of levels, the topic passages in each of the levels compose the document, and each of the topic passages in a higher level includes one or more shorter topic passages in a lower level;
extracting a plurality of keywords using the hierarchical structure;
selecting a plurality of key sentences from one of the topic passages in the hierarchical structure depending on a use condition of the keywords; and
generating a digest which includes of the key sentences.

13. The computer-readable storage medium according to claim 12, wherein said program enables the computer to perform:
extracting local keywords from a summarization target topic;
extracting global keywords from a longer topic passage including said summarization-target topic passage;
selecting both sentences regarding a local topic and sentences regarding a global topic based on a use condition of said local keywords and said global keywords; and
generating a digest in which the sentences regarding the local topic and the sentences regarding the global topic are balanced.

14. A computer-readable storage medium for storing a program which enables a computer to perform:
calculating a likelihood ratio based on a comparison of a use frequency of a word in a process target topic passage in a document with a use frequency of said word in a longer topic passage including said process target topic passage;
evaluating whether or not said word is characteristic of said process target topic passage by comparing the likelihood ratio to a predetermined threshold value;
extracting a keyword from the process target topic passage when the likelihood ratio is greater than the predetermined threshold value ; and
generating a digest according to a use condition of said keyword.

15. A computer-readable storage medium for storing a program which enables a computer to perform:
specifying a major part of the document to be summarized by removing
repeatedly calculating a lexical cohesion degree in a vicinity of each position in a document to define topic passages in the document while varying a size of the vicinity;
specifying a major part of the document to be summarized by removing one or more topic passages having a lower cohesion from the document; and
generating a digest using said major part.

16. A method of generating a digest, comprising:
detecting a set of topic boundaries of a document based on a lexical cohesion degree to detect a hierarchical structure of topic passages in the document, in which each of the topic passages corresponds to a part of the document describing a common topic, the hierarchical structure includes a plurality of levels, the topic passages in each of the levels compose the document, and each of the topic passages in a higher level includes one or more shorter topic passages in a lower level;
extracting a plurality of keywords using the hierarchical structure;
selecting a plurality of key sentences from one of the topic passages in the hierarchical structure depending on a use condition of the keywords; and
generating a digest which includes the key sentences.

* * * * *